United States Patent
Wang et al.

(10) Patent No.: US 9,014,544 B2
(45) Date of Patent: Apr. 21, 2015

(54) USER INTERFACE FOR RETIMING IN A MEDIA AUTHORING TOOL

(71) Applicant: Apple Inc., Cupertino, CA (US)

(72) Inventors: Xiaohuan C. Wang, Sunnyvale, CA (US); Brian Meaney, San Jose, CA (US); Michael P. Stern, San Francisco, CA (US); Vijay Sundaram, San Ramon, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/720,988

(22) Filed: Dec. 19, 2012

(65) Prior Publication Data

US 2014/0169765 A1    Jun. 19, 2014

(51) Int. Cl.
  *H04N 5/93* (2006.01)
  *H04N 9/79* (2006.01)
  *H04N 5/76* (2006.01)
  *G11B 27/00* (2006.01)
  *G11B 27/031* (2006.01)
  *G11B 27/34* (2006.01)

(52) U.S. Cl.
  CPC . *H04N 9/79* (2013.01); *H04N 5/76* (2013.01); *G11B 27/005* (2013.01); *G11B 27/031* (2013.01); *G11B 27/34* (2013.01)

(58) Field of Classification Search
  CPC .... G11B 27/005; G11B 27/34; G11B 27/036; G11B 27/034
  USPC .................................. 386/241, 248, 343, 350
  See application file for complete search history.

(56) References Cited

U.S. PATENT DOCUMENTS

| | | | |
|---|---|---|---|
| 5,519,828 A | 5/1996 | Rayner | |
| 5,521,841 A | 5/1996 | Arman et al. | |
| 5,659,539 A | 8/1997 | Porter et al. | |
| 5,659,793 A | 8/1997 | Escobar et al. | |
| 5,664,216 A | 9/1997 | Blumenau | |
| 5,682,326 A | 10/1997 | Klingler et al. | |
| 5,732,184 A | 3/1998 | Chao et al. | |
| 5,760,767 A | 6/1998 | Shore et al. | |

(Continued)

FOREIGN PATENT DOCUMENTS

WO    WO 2010/106586    9/2010

OTHER PUBLICATIONS

Portions of prosecution history of U.S. Appl. No. 13/109,989, Oct. 12, 2011 Wang, Xiaohuam C., et al.

(Continued)

*Primary Examiner* — Thai Tran
*Assistant Examiner* — Jose Mesa
(74) *Attorney, Agent, or Firm* — Adeli LLP

(57) ABSTRACT

A novel method for creating multimedia presentations in a media editing application is provided. The method selects a portion of a media clip and retimes the selected portion of the media clip from a first playback speed to a second playback speed. The method defines a transition interval for a discontinuity between a first section of the media clip with the first playback speed and a second section of the media clip with the second playback speed. The media clip is played back according to a smoothed curve that is constrained by the transition interval, the first playback speed, and the second playback speed. The smoothed curve transitions gradually from the first playback speed at the start of the transition interval to the second playback speed at the end of the transition interval.

27 Claims, 28 Drawing Sheets

(56) References Cited

U.S. PATENT DOCUMENTS

| | | | |
|---|---|---|---|
| 5,826,102 A | 10/1998 | Escobar et al. |
| 5,892,506 A | 4/1999 | Hermanson |
| 5,892,507 A | 4/1999 | Moorby et al. |
| 5,893,062 A | 4/1999 | Bhadkamkar et al. |
| 5,930,446 A | 7/1999 | Kanda |
| 5,999,173 A | 12/1999 | Ubillos |
| 6,154,601 A | 11/2000 | Yaegashi et al. |
| 6,172,675 B1 | 1/2001 | Ahmad et al. |
| 6,184,937 B1 | 2/2001 | Williams et al. |
| 6,188,396 B1 | 2/2001 | Boezeman et al. |
| 6,204,840 B1 | 3/2001 | Petelycky et al. |
| 6,262,776 B1 | 7/2001 | Griffits |
| 6,324,335 B1 | 11/2001 | Kanda |
| 6,392,710 B1 | 5/2002 | Gonsalves et al. |
| 6,404,978 B1 | 6/2002 | Abe |
| 6,414,686 B1 | 7/2002 | Protheroe et al. |
| 6,477,315 B1 | 11/2002 | Ohomori |
| 6,539,163 B1 | 3/2003 | Sheasby et al. |
| 6,542,692 B1 | 4/2003 | Houskeeper |
| 6,546,188 B1 | 4/2003 | Ishii et al. |
| 6,559,868 B2 | 5/2003 | Alexander et al. |
| 6,573,898 B1 | 6/2003 | Mathur et al. |
| 6,631,240 B1 | 10/2003 | Salesin et al. |
| 6,658,194 B1 | 12/2003 | Omori |
| 6,714,216 B2 | 3/2004 | Abe |
| 6,744,968 B1 | 6/2004 | Imai et al. |
| 6,848,117 B1 | 1/2005 | Emura |
| 6,965,723 B1 | 11/2005 | Abe et al. |
| 6,967,599 B2 | 11/2005 | Choi et al. |
| 7,020,381 B1 | 3/2006 | Kato et al. |
| 7,043,137 B2 | 5/2006 | Slone |
| 7,073,127 B2 | 7/2006 | Zhao et al. |
| 7,103,260 B1 | 9/2006 | Hinson |
| 7,194,676 B2 | 3/2007 | Fayan et al. |
| 7,313,755 B2 | 12/2007 | Rahman et al. |
| 7,325,199 B1 | 1/2008 | Reid |
| 7,336,264 B2 | 2/2008 | Cajolet et al. |
| 7,437,674 B2 | 10/2008 | Chen |
| 7,518,611 B2 | 4/2009 | Boyd et al. |
| 7,623,755 B2 | 11/2009 | Kuspa |
| 7,623,756 B2 * | 11/2009 | Komori et al. ............ 386/343 |
| 7,720,349 B2 | 5/2010 | Ogikubo |
| 7,725,828 B1 * | 5/2010 | Johnson ............ 715/726 |
| 8,209,612 B2 | 6/2012 | Johnson |
| 2001/0020953 A1 | 9/2001 | Moriwake et al. |
| 2001/0036356 A1 | 11/2001 | Weaver et al. |
| 2002/0023103 A1 | 2/2002 | Gagne |
| 2002/0101368 A1 | 8/2002 | Choi et al. |
| 2002/0140719 A1 | 10/2002 | Amir et al. |
| 2002/0154140 A1 | 10/2002 | Tazaki |
| 2002/0154156 A1 | 10/2002 | Moriwake et al. |
| 2002/0168176 A1 | 11/2002 | Iizuka et al. |
| 2003/0016254 A1 | 1/2003 | Abe |
| 2003/0117431 A1 | 6/2003 | Moriwake et al. |
| 2003/0164845 A1 | 9/2003 | Fayan et al. |
| 2004/0001079 A1 | 1/2004 | Zhao et al. |
| 2004/0001694 A1 | 1/2004 | Evans et al. |
| 2004/0012594 A1 | 1/2004 | Gauthier et al. |
| 2004/0027369 A1 | 2/2004 | Kellock et al. |
| 2004/0088723 A1 | 5/2004 | Ma et al. |
| 2004/0151469 A1 | 8/2004 | Engholm et al. |
| 2004/0267952 A1 | 12/2004 | He et al. |
| 2004/0268224 A1 | 12/2004 | Balkus et al. |
| 2005/0042591 A1 | 2/2005 | Bloom et al. |
| 2005/0201724 A1 | 9/2005 | Chu |
| 2005/0216840 A1 | 9/2005 | Salvucci |
| 2006/0008247 A1 | 1/2006 | Minami et al. |
| 2006/0059426 A1 | 3/2006 | Ogikubo |
| 2006/0168521 A1 | 7/2006 | Shimizu et al. |
| 2006/0253781 A1 | 11/2006 | Pea et al. |
| 2007/0189708 A1 | 8/2007 | Lerman et al. |
| 2008/0044155 A1 | 2/2008 | Kuspa |
| 2008/0072166 A1 | 3/2008 | Reddy |
| 2008/0152297 A1 | 6/2008 | Ubillos |
| 2008/0253735 A1 | 10/2008 | Kuspa et al. |
| 2009/0129479 A1 | 5/2009 | Yellamraju |
| 2010/0005397 A1 | 1/2010 | Lanahan et al. |
| 2010/0153395 A1 | 6/2010 | Hannuksela et al. |
| 2012/0210228 A1 | 8/2012 | Wang et al. |
| 2012/0301114 A1 | 11/2012 | Johnson |

OTHER PUBLICATIONS

Author Unknown, "Using Adobe Premiere Elements 8 Editor," last updated Aug. 12, 2010, 313 pages, Adobe Systems Incorporated, San Jose, CA, USA.

Author Unknown, "Adobe Premiere Pro CS3: User Guide," Apr. 1, 2008, 455 pages, Adobe Systems Incorporated, San Jose, California, USA.

Author Unknown, "iMovie '08 Getting Started," Month Unknown, 2008, pp. 1-50, USA.

Author Unknown, "Apple Announces Final Cut Pro 4," NAB, Apr. 6, 2003, 3 pages, Apple Inc., Las Vegas, Nevada, USA.

Brenneis, Lisa, "Final Cut Pro 3 for Macintosh: Visual QuickPro Guide," Apr. 2002, 288 pages, Peachpit Press, Berkeley, California, USA.

Martin, Steve, "Final Cut Express System Requirements, OS 10.2 or Higher," Jan. 13, 2003, 8 pages, Ripple Training.

Sauer, Jeff, "Review: Apple Final Cut Pro 4," Oct. 3, 2003, 7 pages.

Stone, Ken, "Basic Keyframing in Final Cut Express", Jan. 27, 2003, 14 pages, V. 1.0.1, Ken Stone.

Stone, Ken, "Motion Paths and the Bezier Handle in FCP," Aug. 13, 2001, 11 pages, Ken Stone.

Portions of prosecution history of U.S. Appl. No. 10/686,990, Apr. 15, 2010, Johnson, Gary.

Portions of prosecution history of U.S. Appl. No. 12/762,747, May 25, 2012, Johnson, Gary.

Updated portions of prosecution history of 13/109,989, Aug. 14, 2014, Wang, Xiaohuan C., et al.

* cited by examiner

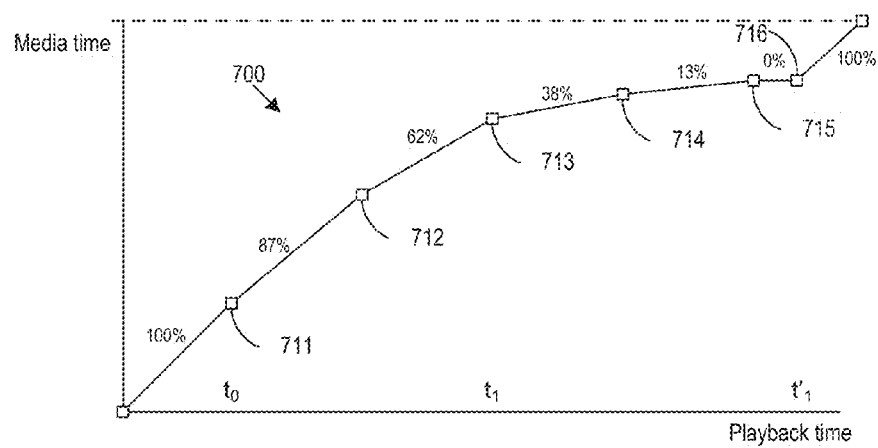
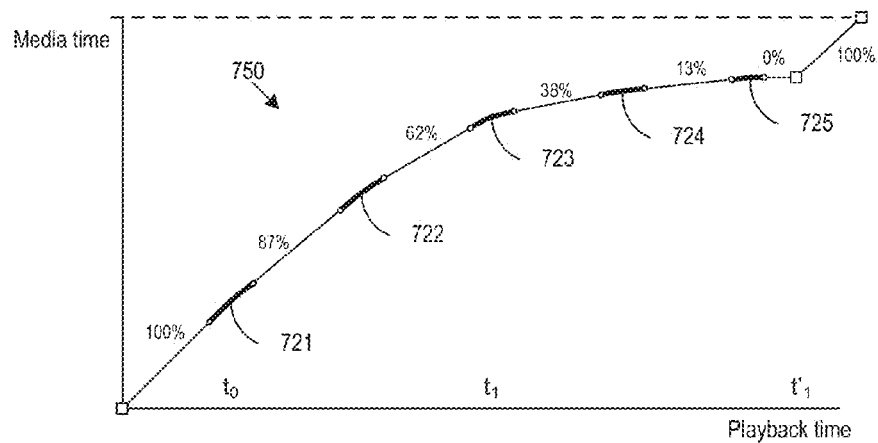
*Figure 7*

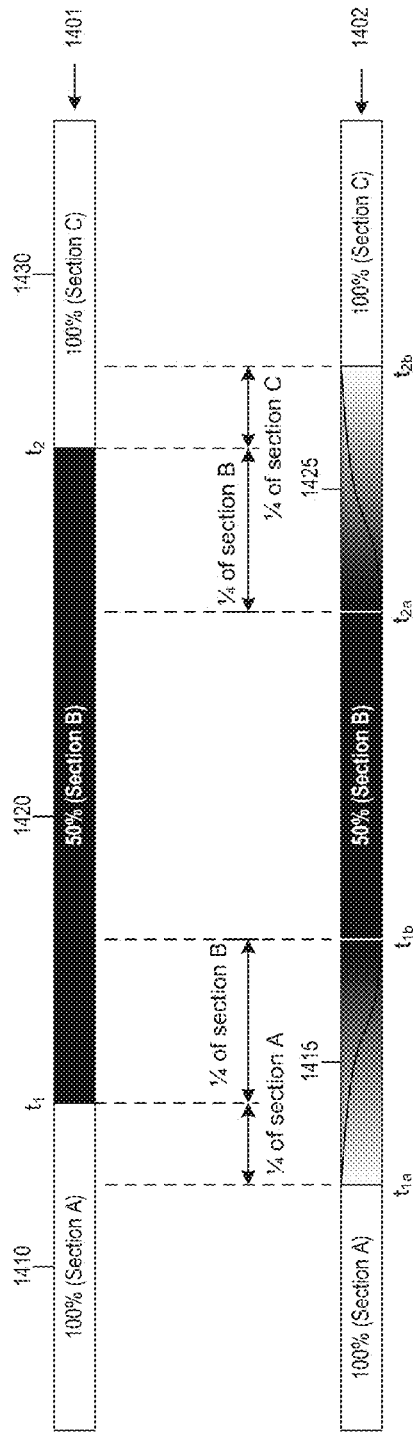
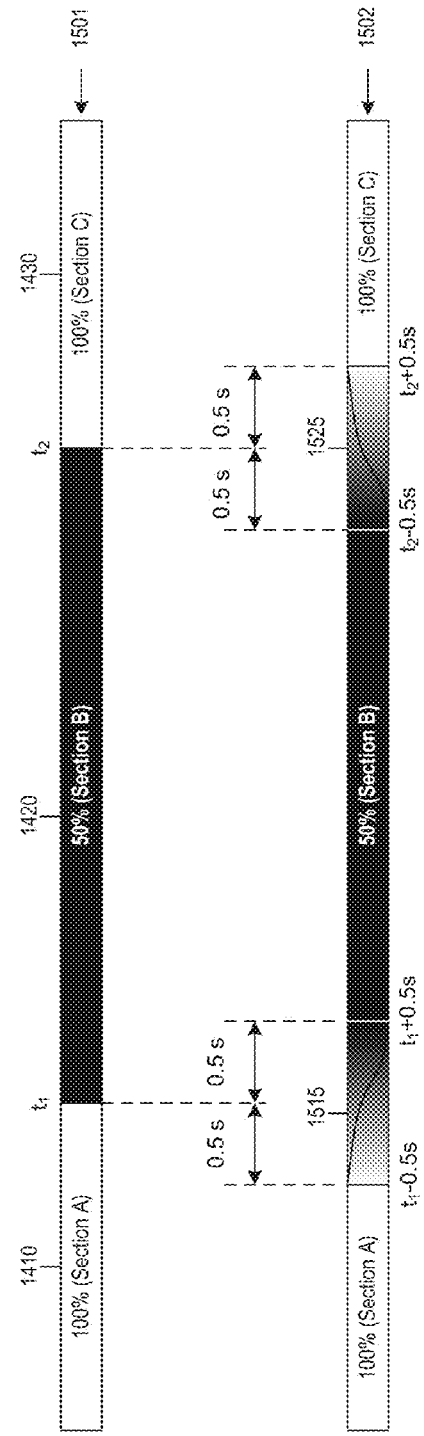
Figure 14
Figure 15

USER INTERFACE FOR RETIMING IN A MEDIA AUTHORING TOOL

BACKGROUND

Digital graphic design, image editing, audio editing, and video editing applications (hereafter collectively referred to as media content editing applications or media editing applications) provide graphical designs, media artists, and other users with the necessary tools to create a variety of media content. Examples of such applications include Final Cut Pro® and iMovie®, both sold by Apple Inc. These applications give users the ability to edit, combine, transition, overlay and piece together different media content in a variety of manners to create a resulting media project. The resulting media project specifies a particular sequenced composition of any number of text, audio clips, images, or video content that is used to create a media presentation.

Various media editing applications facilitate such compositions through electronic means. Specifically, a computer or other electronic device with a processor and a computer readable storage medium executes the media content editing applications. In so doing, the computer generates a graphical interface whereby designers digitally manipulate graphical representation of the media content to produce a desired result.

One difficulty in media editing is that a user cannot easily and intuitively alter the timing of media clips in the graphical interface. For example, the user may wish to graphically specify that media content within a particular range to be played back at a particular playback speed (e.g., slow motion or accelerated motion). The user may also wish to apply other speed or timing effects (e.g., instant replay or rewind) to the particular range of media content.

Some existing media editing applications facilitate the application of speed or timing effect by providing a playback curve. A playback curve is an abstract representation of a media content that specifies the relationship between the media content and the playback time. A user can graphically manipulate the playback curve in order to adjust the playback timing of the media content. Unfortunately, such a timing adjustment is based on manipulations of an abstract representation of the media content that does not intuitively relate to the user what has happened to the media content. Worse yet, allowing direct user manipulation of the playback curve in some instances can cause unintended visual effects (such as playback speed overshoot).

BRIEF SUMMARY

Some embodiments of the invention provide a media editing application for creating multimedia presentations. The media editing application selects a portion of a media clip and retimes the selected portion of the media clip from a first playback speed to a second playback speed. The media editing application defines a transition interval for a discontinuity between a first section of the media clip with the first playback speed and a second section of the media clip with the second playback speed. The media clip is played back according to a smoothed curve that is constrained by the transition interval, the first playback speed, and the second playback speed. The smoothed curve transitions gradually from the first playback speed at the start of the transition interval to the second playback speed at the end of the transition interval. The smoothed curve does not exceed or overshoot the second playback speed before the end of the transition interval.

In some embodiments, the media editing application sets the start and end of the transition interval based predefined fractions of the section before the discontinuity and of the section after the discontinuity. In some other embodiments, the media editing application sets the start of the transition interval based on a fixed time interval.

A retiming operation changes the timing characteristics of a portion of a piece of media content such as a composite presentation or a media clip. In some embodiments, the media editing application includes a user interface for defining a range in order to select the portion of the media content. The media editing application then performs a retiming operation by applying a preset speed effect to the portion of the media content selected by the defined range.

In some embodiments, the timing of the playback of a piece of media content is determined by a playback curve associated with the piece of media content. The playback curve is for mapping each video frame that needs to be played back at a particular instant in time to one or more video frame in the source media clips. In some embodiments, the same playback curve is also used to map audio playback such that the slope of the playback curve at a particular instant in time that corresponds to the audio playback speed at that particular instant in time. Each retiming operation is implemented based on adjustments of the playback curve.

Some embodiments define a playback curve by keyframes. Each keyframe specifies a particular point in the media content (i.e., a specific media time) that is to be played back at a particular playback time. In some embodiments, keyframes are used to anchor different sections of the playback curve by specifying the start and the end of the section. These different sections of the playback curve are created by retiming operations, which applies speed effects to portions of the media content to cause sections of the playback back curve to have different speeds. In some of these embodiments, the adjustment of the playback curve (and hence the playback timing of the media content) is accomplished by moving one or more keyframes to a different point in playback time and/or media time.

The initially created speed effect sections can be used as a template for further adjustments and refinements by the user for desired result. In some embodiments, the adjustment of the speed effect is accomplished by adjusting individual speed effect sections (including transition intervals) that have been created by the earlier preset speed effects. In some of these embodiments, effects bars associated with each speed effect section have graphical handles that can be manipulated by the user to adjust the speed effect. After each speed effect adjustment, some embodiments examine each transition interval. Based on such examination of the transition intervals, some embodiments eliminate one or more transition intervals, adjust one or more of the transition intervals, and/or perform new curve smoothing operation based on the remaining transition intervals.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 7 illustrates a playback curve that is maintained by the media editing application while performing the ramp retiming operation of FIG. 6.

FIG. 14 illustrates an example media clip for which the start and the end of the transition intervals are initially defined according to a predefined fraction.

FIG. 15 illustrates an example media clip for which the start and the end of the transition intervals are initially defined based on fixed time intervals.

DETAILED DESCRIPTION

Figure 1:
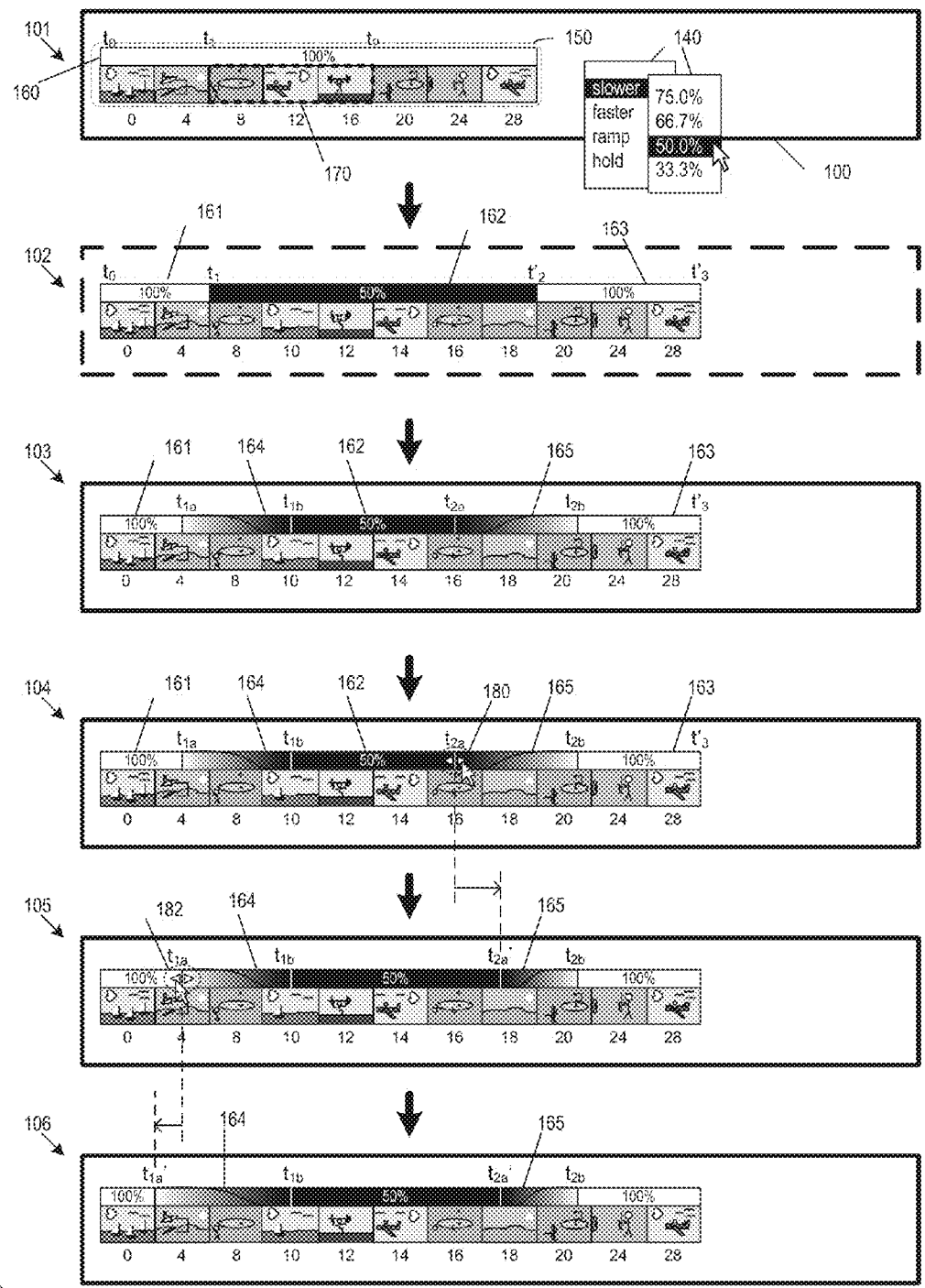
FIG. 1 illustrates a retiming operation of a media clip that is followed by a curve smoothing operation.

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments of the invention provide a media editing application for creating multimedia presentations. The media editing application selects a portion of a media clip and retimes the selected portion of the media clip from a first playback speed to a second playback speed. The media editing application defines a transition interval for a discontinuity between a first section of the media clip with the first playback speed and a second section of the media clip with the second playback speed. The media clip is played back according to a smoothed curve that is constrained by the transition interval, the first playback speed, and the second playback speed. The smoothed curve transitions gradually from the first playback speed at the start of the transition interval to the second playback speed at the end of the transition interval. The smoothed curve does not exceed or overshoot the second playback speed before the end of the transition interval.

A retiming operation changes the timing characteristics of a portion of a piece of media content such as a composite presentation or a media clip. In some embodiments, the media editing application includes a user interface for defining a range in order to select the portion of the media content. The media editing application then performs retiming by applying a speed effect to the portion of the media content selected by the defined range.

In some embodiments, the timing of the playback of a piece of media content is determined by a playback curve associated with the piece of media content. The playback curve is for mapping each video frame that needs to be played back at a particular instant in time to one or more video frame in the source media clips. In some embodiments, the same playback curve is also used to map audio playback such that the slope of the playback curve at a particular instant in time that corresponds to the audio playback speed at that particular instant in time. Each retiming operation is implemented based on adjustments of the playback curve. In some embodiments, a playback curve has playback time as its x-axis and media time as its y-axis. Media time is the time native to a piece of media content. An instant in the media time associated with a video frame specifies the time that the video frame is captured or intended to be displayed. Playback time is the time that the piece of media content is actually being played back as part of the composite presentation. As such, each point in the playback curve maps a particular instant in playback time with a particular instant in media time. The slope of the playback curve at any particular instant in playback time indicates the playback speed at that particular instant. A slope of 100% in a playback curve indicates that the playback time is elapsing at the same rate as the media time, or that the playback speed is the same as the normal speed of the media content.

Some embodiments define a playback curve by keyframes. Each keyframe specifies a particular point in the media clip (i.e., a specific media time) that is to be played back at a particular playback time. In some embodiments, keyframes are used to anchor different sections of the playback curve by specifying the start and the end of each section. These different sections of the playback curve are created by retiming operations, which applies speed effects to portions of the media content to cause sections of the playback back curve to have different speeds. These keyframes therefore, in addition to anchoring the start and end of each section, also marks the discontinuity in playback speed between the different sections. In some of these embodiments, the adjustment of the playback curve (and hence the playback timing of the media content) is accomplished by moving a discontinuity keyframe to a different point in playback time and/or media time while the discontinuity keyframe is still anchoring the end of one section and the start of another section.

In some embodiments, the media application performs a curve smoothing operation after a retiming operation. Application of speed effect changes playback speed on a portion of a media clip, which results in one or more discontinuities in playback speed of the media clip. Such speed discontinuity can be visually distracting to a viewer. Some embodiments thus adjust the playback curve in order to ameliorate the playback speed discontinuity. A curve smoothing operation adjusts the playback curve near the discontinuities such that the slope or tangent (i.e., playback speed) of the smoothed playback curve is continuous throughout the curve. Some embodiments introduce a transition interval to allow the playback curve to smoothly transition from a first section with one playback speed to a second section with another playback speed. In some embodiments, the smoothed curve is not constrained to go through the discontinuity keyframe between the two speed sections.

For some embodiments, FIG. 1 illustrates a retiming operation of a media clip that is followed by a curve smoothing operation. The curve smoothing operation is based on transition intervals between different playback speeds. FIG. 1 illustrates a timeline 100 in a GUI of a media editing application. Within the timeline 100 is a representation of a media clip 150. The representation of the media clip displays a series of thumbnail images sampled at regular intervals of the playback time from the media clip 150. Each thumbnail image is labeled with an index that reflects the position of the thumbnail image in media time for purpose of illustration. The media clip representation 150 also includes an effects bar 160 that indicates the playback speed of the media content in the media clip.

Figure 2:
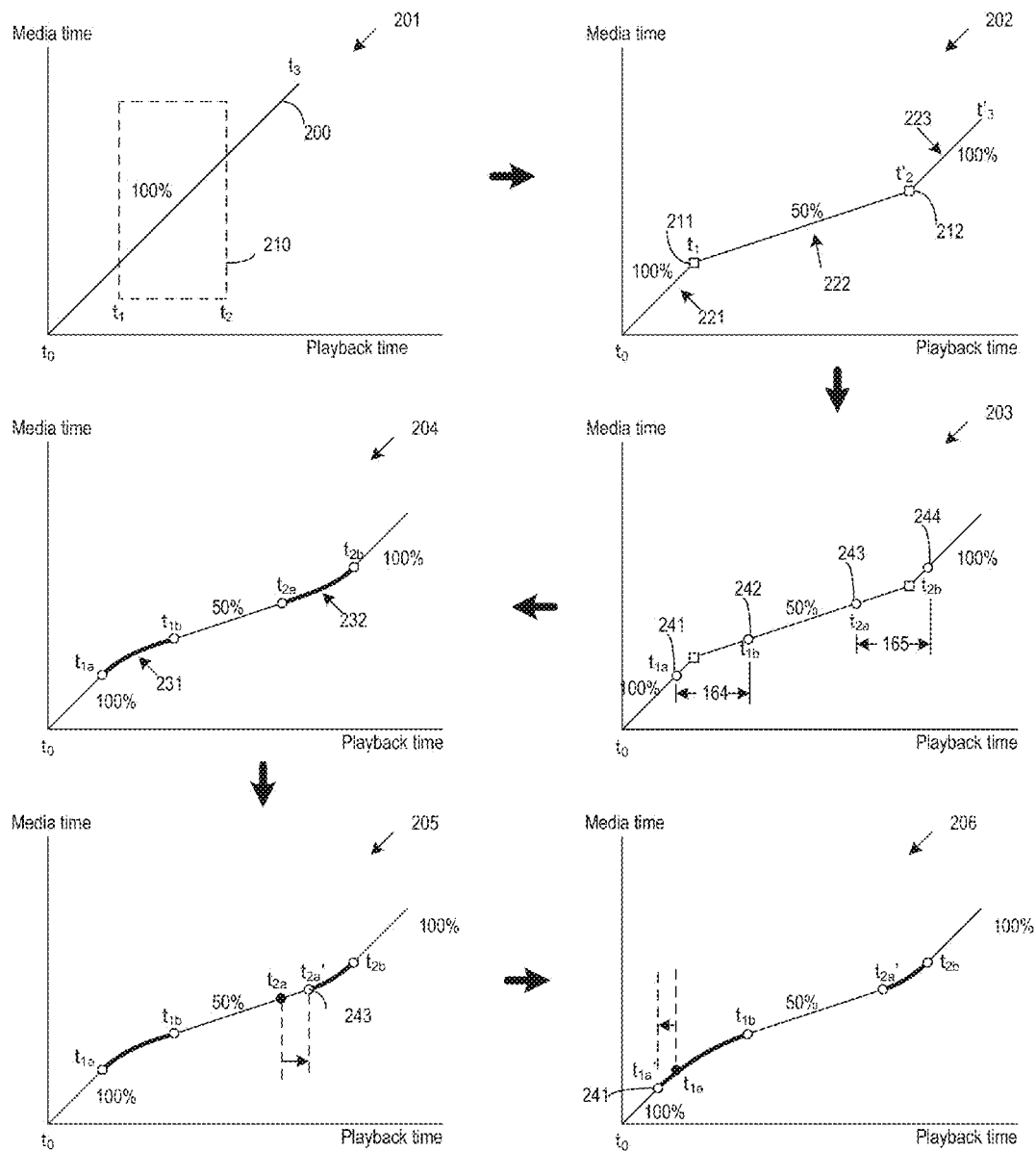
FIG. 2 illustrates a retiming operation and a curve smoothing operation from the perspective of a playback curve.

FIG. 1 will be described by reference to FIG. 2. FIG. 2 illustrates the retiming operation and the curve smoothing operation from the perspective of a playback curve 200 that controls the playback timing of the media clip 150. The curve smoothing operation is based on transition intervals with specified start and end times. FIG. 2 illustrates the playback curve 200 during the retiming operation and the subsequent curve smoothing operation of FIG. 1. As the retiming operation and curve smooth operations alter the playback curve 200, the playback speed of the media clip 150 are also accordingly altered. FIG. 2 illustrates the changes to the playback curve 200 in six stages 201-206.

FIG. 1 illustrates the creation and adjustment of transition intervals following the retiming operation in six stages 101-106 of the timeline 100. The first stage 101 correspond to the playback curve stage 201 of FIG. 2. The stage 101 shows the selection of a range 170 for retiming operation that corresponds to the selection of range 210. At the first stage 101, the effects bar 160 of the content media clip 150 indicates that the entire media clip is at 100% of normal speed. The thumbnails are indexed at increments of 4 (0, 4, 8, 12 ...) at the current zoom level, which correspond to playing back the media content at the standard frame rate. The first stage 101 also illustrates the selection of a range 170 that starts at playback time $t_0$ and ends at playback time $t_1$. The user is illustrated as selecting the "slower" "at 50% playback rate" retiming operation preset from an effects menu 140. The "slower" preset retiming operation will be applied to the media content in the selected range 170 between the playback times $t_0$ and $t_1$. Some embodiments provide preset speed effects so a user can quickly achieve an initial retiming effect on a selected range in the composite presentation. The initial retiming effect can then be used as a template for further adjustments and refinements by the user for desired result. The second stage 102 corresponds to the playback curve stage 202 of FIG. 2. The stage 102 shows the results of the slower speed retiming operation in the GUI. A new section 162 has appeared in the effects bar 160 that correspond to the selected range 170. The new section 162 ends at $t'_1$ instead of $t_1$ because its duration is twice as long as the selected range 170. Since the source frame rate of the media content is twice the playback frame rate, the playback speed of the section 162 is effectively reduced to 50% of normal. The thumbnail images under the section 162 reflect the reduced playback speed, as they are indexed at increments of 2 (8, 10, 12, 14, 16, etc.). The retiming operation also creates sections 161 and 163 in the effects bar 160. The new effects bar section 162 has a different appearance (e.g., different color) than the sections 161 and 163 to indicate that the playback speed of the section 162 (50%) is different from the playback speed of the sections 161 and 163 (both at 100%).

In some embodiments that introduce transition intervals for smoothing playback curves, the second stage 102 is not shown to the user. For these embodiments, the second stage 102 is for illustrative purpose only, and the GUI of the media editing application proceeds directly from the first stage 101 to the third stage 103 without displaying the second stage 102.

The third stage 103 corresponds to the playback curve stages 203 and 204 of FIG. 2. The stage 103 illustrates the introduction of transition intervals 164 and 165 in the timeline 100. In some embodiments, the transition interval is initially defined by the media editing application. The transition interval 164 spans over a portion of the 100% speed section 161 and a portion of the 50% speed section 162. The transition interval 164 starts at the time $t_{1a}$ and ends at the time $t_{1b}$, where $t_{1a}$ is before $t_1$ and $t_{1b}$ is after $t_1$ ($t_1$ is the end of the 100% playback speed section 161 and also the start of the 50% playback speed section 162). The transition interval 165 spans over a portion of the 50% speed section 162 and a portion of the 100% speed section 163. The transition interval 165 starts at the time $t_{2a}$ and ends at the time $t_{2b}$, where $t_{2a}$ is before $t_2$ and $t_{2b}$ is after $t'_2$ ($t'_2$ is the end of the 50% playback speed section 162 and also the start of the 100% playback speed section 163).

In some embodiments, the sections of the effects bar 160 that correspond to the transition intervals 164 and 165 also have visual features that indicate transition between speeds. For example, for embodiments that uses color to indicate speed in the effects bar, the transition interval shows a color gradient that gradually transition from the color of one speed to the color of another speed. In the example of FIG. 1, the color rendering of the transition interval 164 gradually transition from the color of the section 161 to the color of the section 162, and the color rendering of the transition interval 164 gradually transition from the color of the section 162 to the color of the section 163. In some embodiments, the color gradient in the transition intervals is based on the playback speed (as determined by the smoothed playback curve) within the transition intervals. In some embodiments, other indicia of transition appear in sections of effects bars that correspond to transition intervals. For example, some embodiments depict a curve in the effects bar section that corresponds to the playback speed during the transition interval (as illustrated in effects bar section 164 and 165). Some embodiments depict transition intervals as slightly opaque rectangles that transparently superimposed on top of the effect bar. This type of representation of transition intervals allows the features of the effects bar to be still visible and accessible to the user. One of ordinary skill would understand that other visual depictions of speed transitions are also possible, such as hash pattern with density gradients that shows a transition from one speed to another.

As mentioned, the stage 103 corresponds to the playback curve stages 203 and 204. In other words, at the end of the stage 103, the media editing application has not only defined the transition intervals 164 and 165 as illustrated in playback curve stage 203, but it has also completed a curve smoothing operation that corresponds to the playback curve stage 204.

The fourth stage 104 illustrates the start of an operation to adjust the duration of the transition intervals. The stage 104 illustrates a cursor (or another form of user selection) being placed over a handle GUI item 180 in order to adjust the transition interval 165. The handle 180 is positioned at the right edge of transition interval 165 over the speed section 162. In some embodiments, the proximity of the cursor to the edge of the transition interval causes the appearance of the handle 180. The cursor drags the handle 180 to the right from the time $t_{2a}$ to the time $t_{2a}'$.

The fifth stage 105 correspond to the playback curve stage 205 of FIG. 2 as it illustrates the result of the adjustment to the transition interval 165. The transition interval 165 has been shortened by the adjustment operation as it now spans from $t_{2a}'$ to $t_{2b}$. The smoothing of the playback curve 200 follows this shortened transition interval is shown in the playback curve stage 205.

The stage 105 also illustrates the start of another transition interval adjustment operation. As illustrated, a cursor (or another form of user selection) is being placed over a handle GUI item 182 in order to adjust the transition interval 164. The handle 182 is positioned at the left edge of the transition interval 164 over the 100% speed section. In some embodiments, the proximity of the cursor to the edge causes the appearance of the handle 182. The cursor drags the handle 180 to the left, from the time $t_{1a}$ to the time $t_{1a}'$.

The sixth stage 106 corresponds to the playback curve stage 206 of FIG. 2. The stage 106 illustrates the result of the adjustment to the transition interval 164. The transition interval 164 has been lengthened by the adjustment operation as it now spans from $t_{1a}'$ to $t_{1b}$. The smoothing of the playback curve follows this shortened transition interval as shown in the playback curve stage 206.

The six stages 201-206 of FIG. 2 will now be described. At the first stage 201, the media clip has not experienced any retiming operations. Correspondingly, the playback curve 200 is a straight line with constant slope of 1:1 to indicate that the playback speed of the media clip has not been altered and will play at 100% of the original speed from the beginning to the end. The first stage 201 also shows a range of the media clip being selected by the range selector for a retiming operation (conceptually illustrated by a box 210). The selected range 210 of the media clip starts at playback time $t_1$ and ends at playback time $t_2$.

The second stage 202 shows the result of the retiming operation. The example retiming operation alters the playback curve 250 by slowing the playback speed of the selected range 210 to 50% of the original playback speed. The discontinuity in speed thereby divides the playback curve 200 into three sections 221 (at 100% playback speed), 222 (at 50% playback speed), and 223 (at 100% playback speed). The retiming operation also creates two keyframes 211 and 212. The keyframe 211 is at playback time $t_1$ and the keyframe 212 is at playback time $t_2'$. The keyframe 211 is at the end of the 100% playback speed section 221 and at the start of the 50% playback speed section 222. The keyframe 212 is at the end the 50% playback speed section 222 and at the start of the second 100% playback speed section 223.

The third stage 203 shows the introduction of the transition intervals between different playback speeds. Specifically, FIG. 2 at stage 203 illustrates the two transition intervals 164 and 165 being defined by the media editing application. The transition interval 164 is for the transition from 100% speed to 50% playback speed around the playback time $t_1$, while the transition interval 165 is for the transition from 50% playback speed to 100% playback speed around the playback time $t_2'$. The transition interval 164 is anchored by two keyframes 241 and 242, while the transition interval 165 is anchored by two keyframes 243 and 244. The keyframe 241 is at playback time $t_{1a}$ and the keyframe 242 is at playback time $t_{1b}$, $t_{1a}$ being before $t_1$ and $t_{1b}$ being after $t_1$. The keyframe 243 is at playback time $t_{2a}$ and the keyframe 244 is at playback time $t_{2b}$, $t_{2a}$ being before $t_2'$ and $t_{2b}$ being after $t_2'$. In other words, the transition interval 164 starts before the speed discontinuity at $t_1$ (50% to 100%, or the keyframe 211) and ends after $t_1$. Likewise, the transition interval 165 starts before the speed discontinuity at $t_2$ (100% to 50%, or the keyframe 212) and ends after $t_2$.

The fourth stage 204 illustrates curve smoothing by using transition intervals. The stage 204 does not illustrate the key frames 211 and 212, because the curve smoothing operation is not based on those keyframes, which were the original keyframes that separates the different playback speeds. The curve smoothing operation is instead based on the keyframes 241-244, which defines that start and ends of the transition intervals 164 and 165. The curve smoothing operation produces smooth Bezier curves 231 and 232 that go through the keyframes 241-244 while maintaining continuity in playback speed. The smoothed curves 231 and 232 that fall within transition intervals 164 (between $t_{1a}$ and $t_{1b}$) and 165 (between $t_{2a}$ and $t_{2b}$) are illustrated as darkened. In some embodiments, only the portions of the media clip that fall within transition intervals are Bezier curves, while media clips that are outside of transition intervals remain straight (i.e., constant playback speed). A Bezier curve of a transition interval starts with a slope (i.e., playback speed) that is identical to the slope of the section before the transition interval and ends with a slope that is identical to the slope of the section after the transition interval.

The keyframes 241-244 are therefore transition interval keyframes that define the start and the end of the transition intervals. In some embodiments, the transition interval keyframes are automatically set by the media editing application. Some of these embodiments let the user of the media editing application adjusts the start and end time of the transition intervals (e.g., by moving the transition interval keyframes.) The automatic setting of the transition interval keyframes is discussed above by reference to FIG. 1 and below by reference to 13-14.

The fifth stage 205 illustrates the adjustment of the transition interval 165. As illustrated, the user has moved the start of the transition interval 165 later, from playback time $t_{2a}$ to playback time $t_{2a}'$, which shortens the transition interval 165 to between $t_{2a}'$ and $t_{2b}$. In some embodiments, this adjustment is accomplished by moving the keyframe 243 from the playback time $t_{2a}$ to playback time $t_{2a}'$ along the 50% playback speed slope of the section 222, since the move does not alter the playback speed in the section 222. This adjustment of the transition interval 165 also causes some embodiments to regenerate the smoothed curve 232 in order to maintain the continuity in speed.

Figure 3:
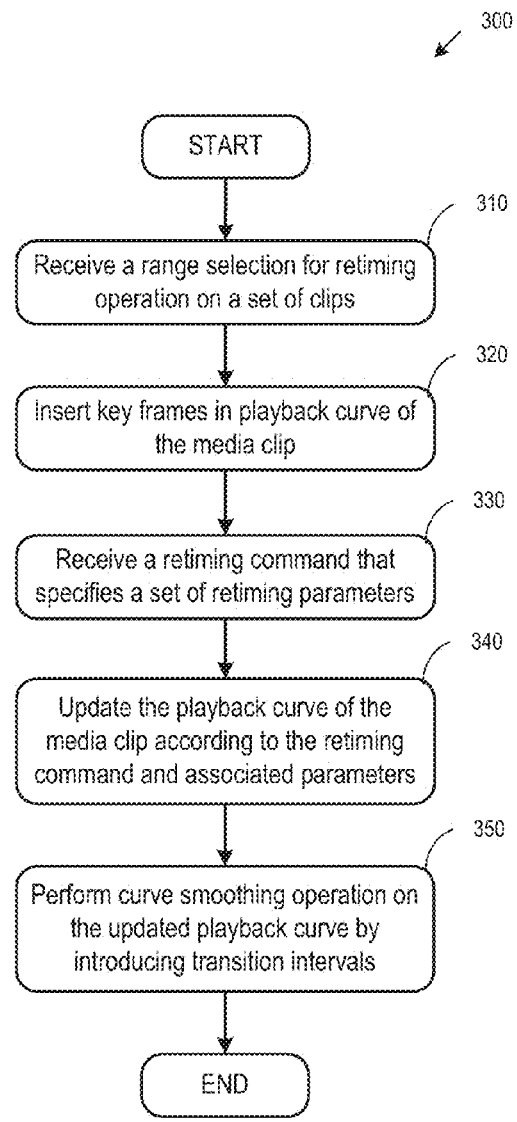
FIG. 3 conceptually illustrates a process for performing a retiming operation that is followed by a curve smoothing operation.

The sixth stage 206 illustrates the adjustment of the transition interval 164. As illustrated, the user has moved the start of the transition interval 164 earlier, from playback time $t_{1a}$ to playback time $t_{1a}'$, which lengthen the transition interval 164 to between $t_{1a}'$ and $t_{1b}$ while shortening the first 100% playback speed section to between $t_0$ and $t_{1a}'$. In some embodiments, this adjustment is accomplished by moving the keyframe 241 from the playback time $t_{1a}$ to playback time $t_{1a}'$ along the 100% playback speed slope of the section 221, since the move does not alter the playback speed in the section 221. This adjustment of the transition interval 164 also causes some embodiments to regenerate the smoothed curve 231 in order to maintain the continuity in speed For some embodiments, FIG. 3 conceptually illustrates a process 300 for performing a preset retiming operation that is followed by a curve smoothing operation. The process 300 will be described by reference to FIGS. 1 and 2. Preset retiming operations will be further described below by reference to FIG. 4 and Section I. The process 300 receives (at 310) a range selection (such as the range 170 in FIG. 1) for the preset retiming operation on a set of media clips.

Next, the process 300 inserts (at 320) one or more keyframes in the playback curve associated with the clip or a set of clips according to the selected range. In some embodiments, such keyframes are inserted at locations that correspond to the start and end points of the selected range (such as keyframes 211 and 212 in the stage 202 of FIG. 2).

The process 300 next receives (at 330) a retiming command that specifies a set of retiming parameters. In the example of FIG. 1, such retiming command is received after the user uses the effects menu 140 to select one of the preset retiming operations (such as "slower" and "faster").

Next, the process updates (at 340) the playback curve of the clip or set of clips in the media clip according to the retiming command and associated parameters. In the example of FIG. 2, the playback curve 200 is updated according to the retiming preset commands by moving the inserted keyframes along the playback curve in order to create the speed effect specified by the retiming commands.

The process next performs (at 350) a curve-smoothing operation on the updated playback curve. The curve-smoothing operations make changes to the curve to minimize or eliminate playback speed discontinuities as described above in stage 204 of FIG. 2. In some embodiments, the curve smoothing operation is based on transition intervals that are introduced to encompass discontinuities between sections of the playback curve with different playback speeds (such as the transition interval 231 between the section 221 and the section 222). Curve smoothing operations will be described further in Section II below. After performing the curve smoothing operation, the process 300 ends.

Some embodiments provide user with an option to turn off/on the transition interval between segments. In some of these embodiments, the curve smoothing operation will not be performed and the GUI will not display the graphical representations of the transition intervals when the user elects to not introduce transition intervals between different speed sections.

Several more detailed embodiments of the invention are described below. Section I describes various preset retiming operations. Section II describes in further detail curve smoothing operations for smoothing discontinuities between sections of different playback speeds. Section III describes user adjustment of speed effects. Section IV describes the mapping of playback time using the playback curve. Section V describes the software architecture of a media editing application that performs retiming and curve smoothing. Section VI describes in detail an example media editing application. Finally, Section VII describes an electronic system with which some embodiments of the invention are implemented.

I. Preset Retiming Operations

The media editing application in some embodiments provides tools for performing retiming operations on a piece of media content, media content such as a composite presentation or a media clip. A retiming operation changes the timing characteristics (e.g., playback speed) of the portion of a piece of media content. In some embodiments, the media editing application includes a user interface for defining a range in order to select the portion of the media content. The media editing application then performs retiming by applying a preset speed effect to the portion of the media content selected by the defined range.

Figure 4:
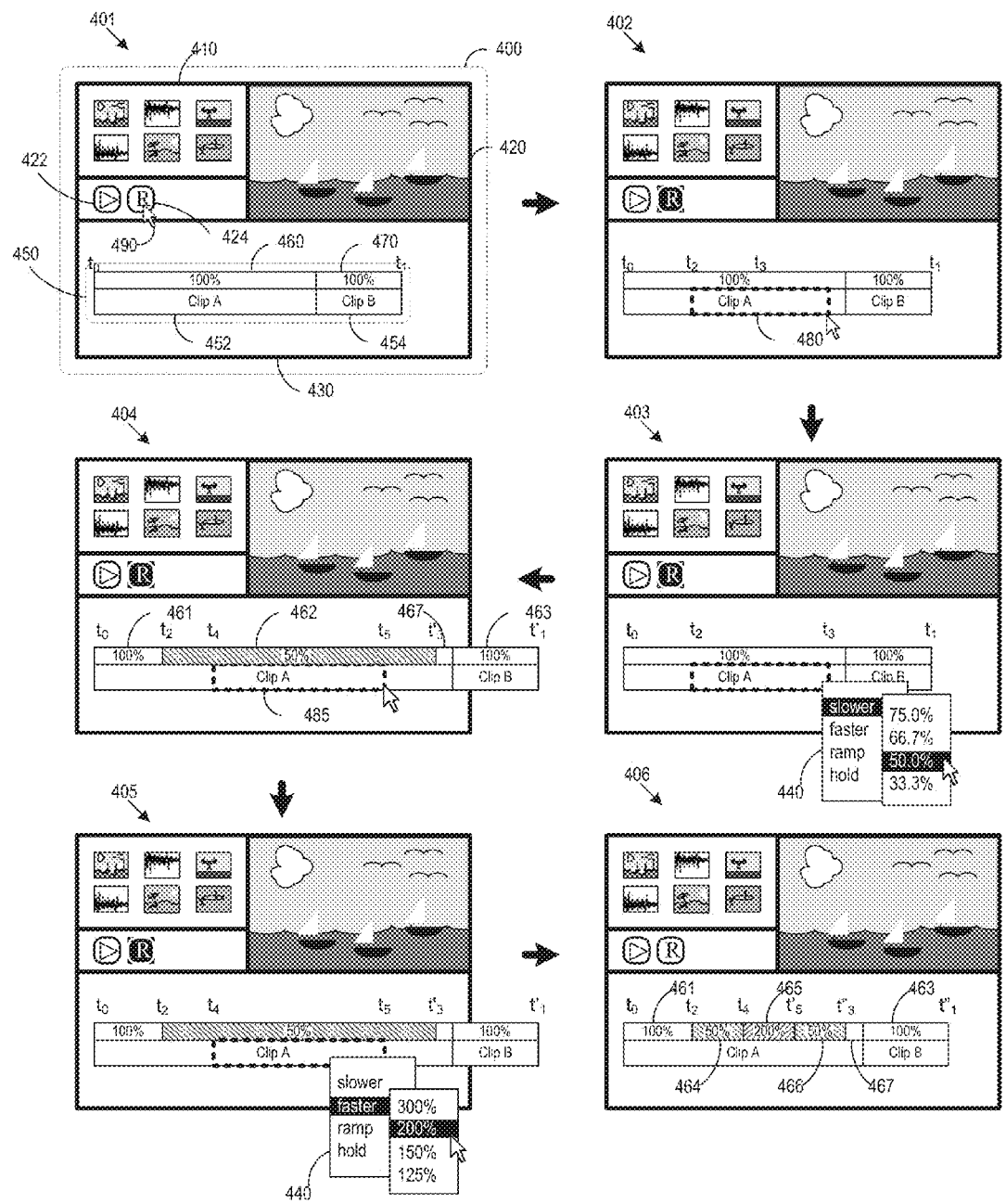
FIG. 4 illustrates an example of a media editing application that performs retiming operation on portions of a media clip.

For some embodiments, FIG. 4 illustrates an example of a media editing application that performs retiming operation on portions of a media clip. FIG. 4 illustrates the retiming operation in six different stages 401-406 of a graphical user interface (GUI) 400 of the media editing application. As shown in this figure, the GUI 400 includes a media library area 410, a preview display area 420, a timeline 430, an effects menu 440, a playback activation item 422 and a retiming tool activation item 424. In some embodiments, the GUI 400 also includes a user interaction indicator such as a cursor 490.

The media library 410 is an area in the GUI 400 through which the application's user can select media clips (video or audio) to add to a media presentation that the user is compositing with the application. In the example of FIG. 4, the clips in the media library 410 are presented as thumbnails that can be selected and added to the timeline 430 (e.g., through a drag-and-drop operation or a menu selection operation). The clips in the media library may also be presented as a list, a set of icons, or some other visual representations that allows a user to view and select the various clips in the library. In some embodiments, the media library 410 may include audio clips, video clips, text overlays, pictures, and/or other media. The preview display area 420 provides a preview of the actual playback of the composite presentation.

The timeline 430 provides a visual representation of a composite presentation being created by the user. In some embodiments, a composite presentation in the timeline 430 includes one or more containers of media clips. Media clips such as video and/or audio clips can be brought into one of the containers in the timeline 430 from the media library 420 for creating the composite presentation.

Figure 6:
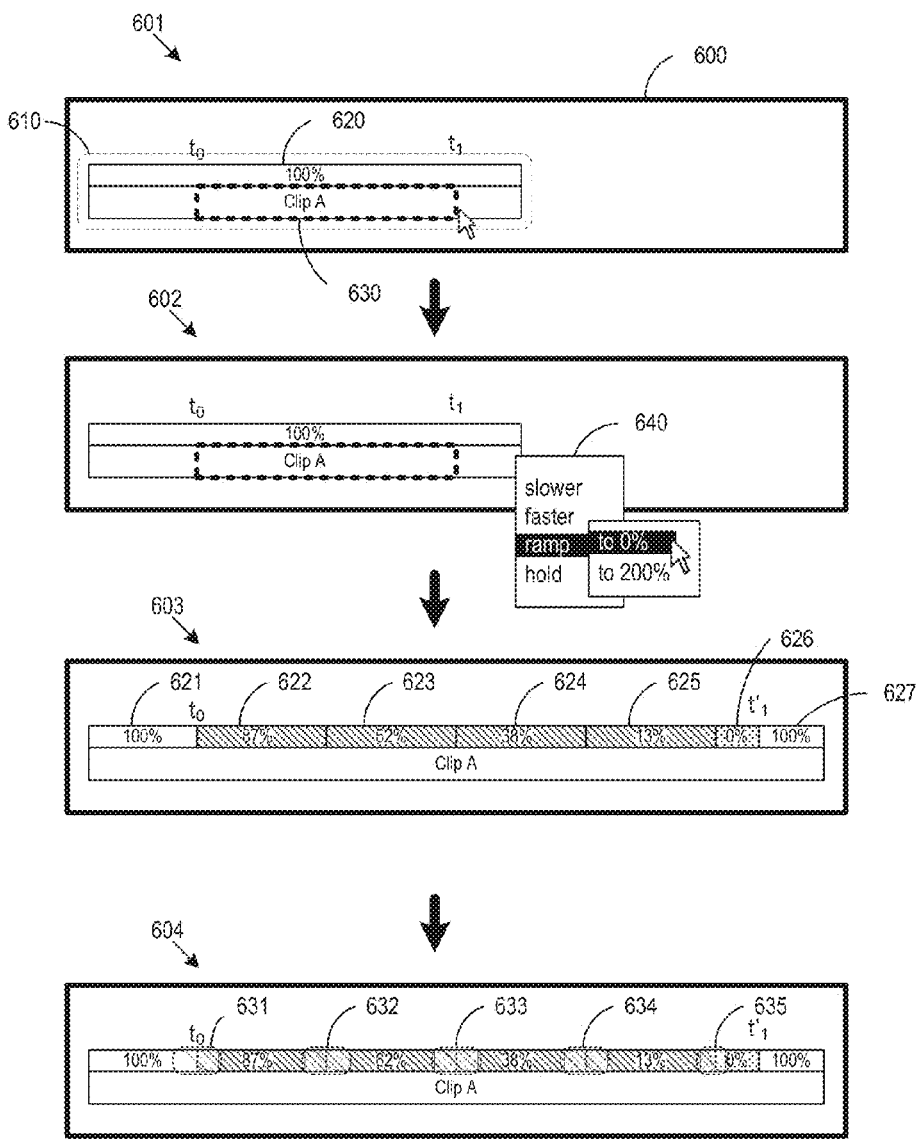
FIG. 6 illustrates an example ramp retiming operation in a timeline.
Figure 8:
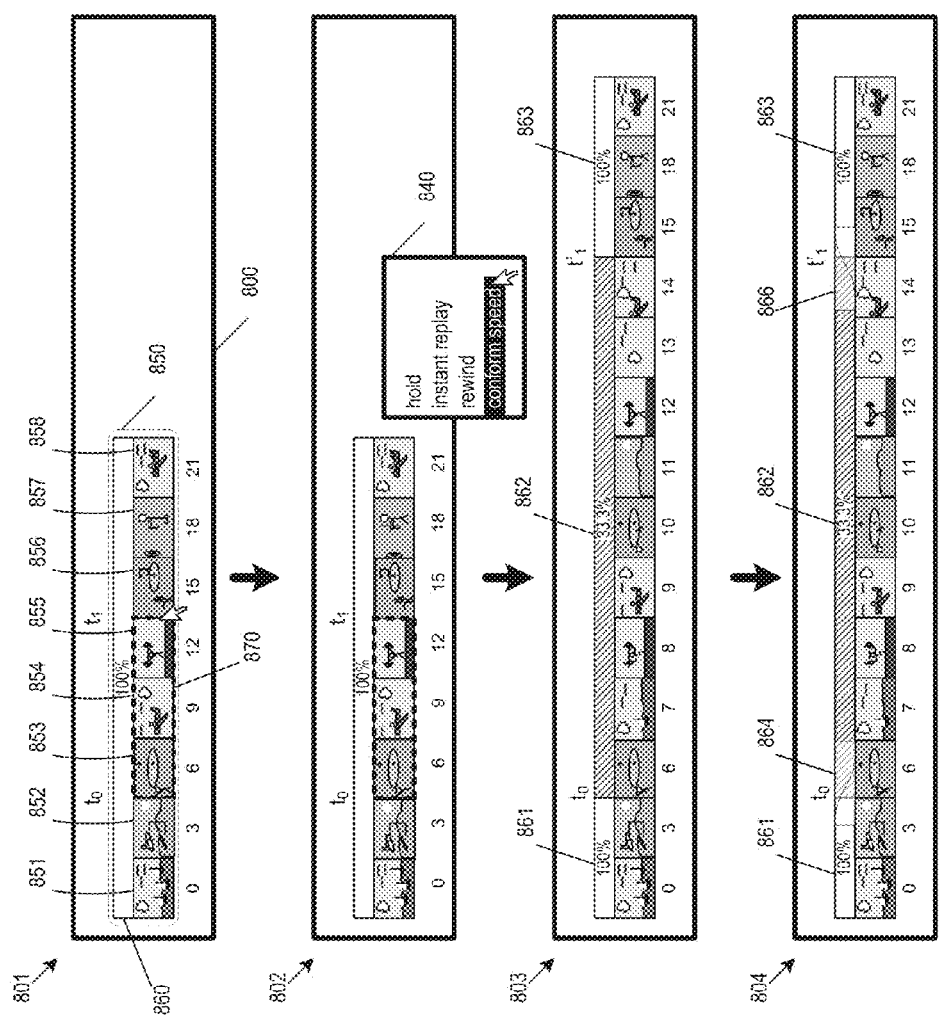
FIG. 8 illustrates an example "conform speed" retiming operation.

In some embodiments, the media editing application provides preset speed effects so a user can quickly achieve an initial retiming effect on a selected range in the composite presentation. The initial retiming effect can then be used as a template for further adjustments and refinements by the user for desired result. FIG. 4 above illustrates two such preset speed effect, namely "slower" and "faster" playback speed for a selected range. In addition to playing a portion of a media clip faster or slower, the media editing application in some embodiments also supports other speed effect or retiming operations. FIGS. 6-8 below illustrate the operation of several such speed effects.

The timeline 430 includes a central compositing lane 450 that includes clips 452 (clip A) and 454 (clip B). The inclusion of clips A and B are graphically indicated by graphical representation of the clips in the central compositing lane 450. A clip can contain a single piece of media content from a single source. A clip can also be a compound clip that includes several pieces of media content from multiple sources. A clip in the timeline is therefore referred to as a media container in some embodiments. A central compositing lane in some embodiments is the main track of the composite presentation, upon which other video clips and audio clips can be overlaid. In some embodiments, the timeline 430 has only one track and the central compositing lane 450 is that only track of the timeline. In some other embodiments, the timeline has multiple tracks and the central compositing lane 450 is one of the tracks.

Clip 452 includes an effect bar 460 that indicates the status of an effect being applied to the clip A. Clip 454 includes an effect bar 470 that indicates the status of an effect being applied to clip B. In the example of FIG. 4, the effect bars 460 and 470 indicate the playback speeds of the clips 452 and 454. In some embodiments, clips in the central compositing lane can include one or more additional effect bars for indicating the status of other effects being applied. An effect bar can also be broken into multiple sections or portions to indicate the status of effects being applied to different sections or portions of a clip.

The effects menu 440 provides a menu of effects that can be selected and applied to the composite presentation. One of ordinary skill in the art would recognize that the effects menu can be implemented in the GUI 400 as a fixed panel or as a pop menu that appears only when specifically invoked by the user (e.g., by a mouse click or a selection of a particular GUI item). The effects menu 440 includes speed effects such as "slower", "faster", "ramp" and "hold", which are described in more detail further below. In some embodiments, the effects menu 440 also includes other speed effects such as "hold", "instant replay", "rewind", and "conform speed", which are described in more detail further below. In addition to speed effects that affect the playback time of the composite presentation, the effects menu in some embodiments also includes one or more other visual or audio effects that do not affect the playback time of the composite presentation. In some embodiments, the effects in the effects menu 440 are "preset" effects. A preset effect is an effect that, once selected by the user, is automatically applied to a range of media contents. A user can then use the GUI to further manipulate the resultant composite presentation and adjust the applied speed effect.

In some embodiments, operations of the media editing application that changes the timing relationship between playback and content (such as applying a preset speed effects or adjusting a previously applied speed effects) are performed by a retiming engine of the media editing application. In some embodiments, the media editing application translates selection of preset speed effect and/or user adjustment of speed effect of a media clip into one or more retiming commands for the retiming engine, which generates, maintains, and adjusts a playback curve for the media clips according to the retiming command. Retiming engine or retiming module will be further described by reference to FIG. 23 below.

The playback activation item 422 is a conceptual illustration of one or more UI items that allow the media editing application to activate its video and audio playback. The retiming tool activation item 424 is a conceptual illustration of one or more UI items that allow the media editing application to activate its retiming tool. Different embodiments of the invention implement these UI items differently. Some embodiments implement them as a selectable UI button, others as a command that can be selected in a pull-down or drop-down menu, and still others as a command that can be selected through one or more keystroke operations. Accordingly, the selection of the playback activation item 422 and retiming tool activation item 424 may be received from a cursor controller (e.g., a mouse, touchpad, trackball, etc.), from a touchscreen (e.g., a user touching a UI item on a touchscreen), or from a keyboard input (e.g., a hotkey or a key sequence), etc. Yet other embodiments allow the user to access the retiming tool feature through two or more of such UI implementations or other UI implementations.

Figure 5A:
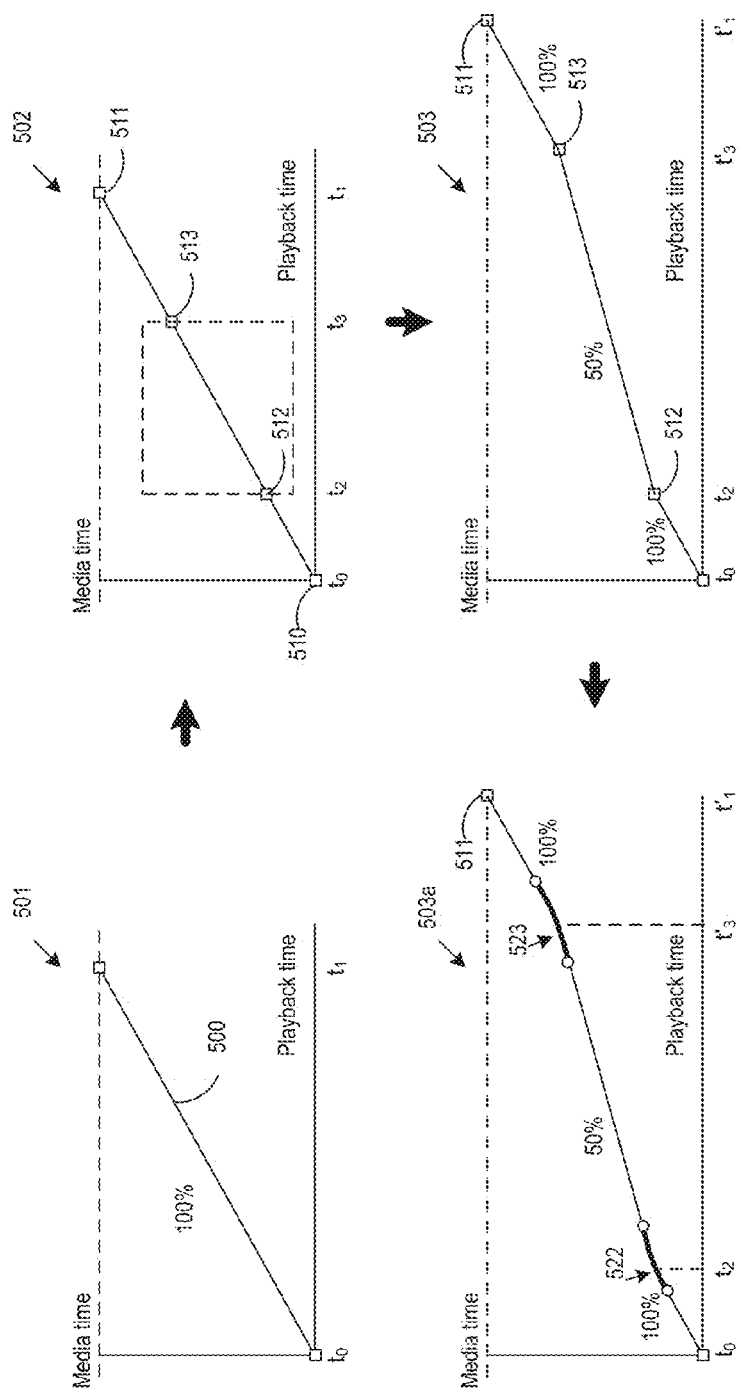
FIGS. 5a-b illustrates a playback curve at different stages of the retiming operations described in FIG. 4.
Figure 5B:
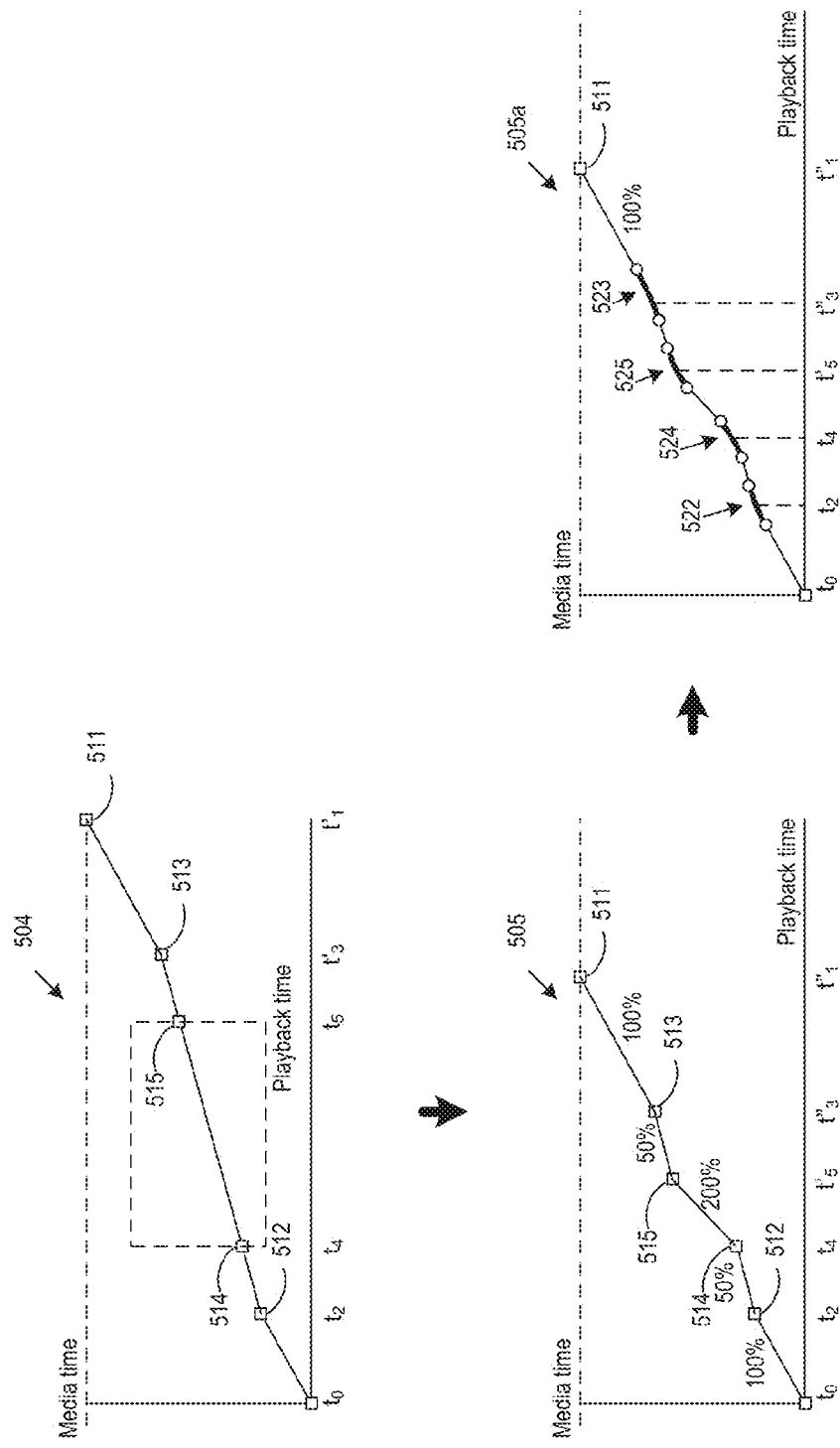

The retiming operation of FIG. 4 will be described by reference to FIGS. 5a-b. FIGS. 5a-b illustrate a playback curve 500 at five different stages 501-505 of the retiming operations described in FIG. 4. The playback curve 500 has playback time as its x-axis and media time as its y-axis. Media time is the time native to a piece of media content. In some embodiments, an instant in the media time associated with a video frame specifies the time that the video frame is captured or intended to be displayed. The dashed line 510 marks the end of the media content and hence the end of media time. Playback time is the time that the piece of media content is actually being played back as part of the composite presentation. As such, each point in the playback curve 500 maps a particular instant in playback time with a particular instant in media time. The slope of the playback curve at any particular instant in playback time indicates the playback speed at that particular instant. A slope of 100% in a playback curve indicates that the playback time is elapsing at the same rate as the media time, or that the playback speed is the same as the normal speed of the media content. FIGS. 5a-b also illustrate the keyframes 510-514 along the playback curve 500. The keyframes 510-514 are points along the playback curve 500 that define the speed changes in the playback of the central compositing lane 450. Each keyframe specifies a particular point in the media clip (i.e., a specific media time) that is to be played back at a particular playback time.

In some embodiments, the media editing application performs a curve smoothing operation after each retiming operation, because each application of speed effect changes the playback speed on a portion of the media clip and results in discontinuity in playback speed. A discontinuity in playback speed can be visually distracting to a viewer. Some embodiments thus adjust the playback curve in order to ameliorate the playback speed discontinuity. Some embodiments introduce a transition interval to allow the playback curve to smoothly transition from one playback speed to another playback speed. Hence, in addition to retiming operation stages 501-505, FIG. 5 also illustrates two curve smoothing operation stages 503a and 505a. The stage 503a is the curve smoothing stage for the retiming stage 503 and the stage 505a is the curve smoothing stage for the retiming stage 505. The smoothing of the playback curve will also be further described below in Section II.

The stages 401-406 of FIG. 4 will now be described by reference to stages of FIG. 5. The first stage 401 of FIG. 4 shows the GUI 400 before the retiming operation. The cursor 490 is placed over the retiming activation item 424 in order to activate the retiming tool. At the stage 401, the effect bar 460 has only one section, indicating that the playback speed of the clip A is at 100% of the normal speed. The stage 501 of FIG. 5a corresponds to the stage 401 and illustrates the playback curve 500 before the retiming operation. The playback curve 500 is a straight line at a slope that corresponds to a playback speed at 100% of the normal speed. The corresponding period for the two clips in the central compositing lane 450 starts at playback time t0 and ends at playback time t1, which also maps to the start and the end of the media time according to the playback curve 500.

The second stage 402 of FIG. 4 shows the selection of a range for selecting a portion of the central compositing lane from $t_2$ to $t_3$. In some embodiments, the user is able to graphically define the range (e.g., by clicking and dragging on the range indicator 480) after the selection of the retiming activation item 424. Some embodiments also allow the user to determine the range textually by directly inputting numerical values for defining the start and end of the selection range. The selection of the range 480 corresponds to stage 502 of FIG. 5*a*. At stage 502, keyframes 512 and 513 are inserted at $t_2$ and $t_3$ to mark the start and end time of the selection range 480 on the playback curve 500. In some embodiments, range selection is performed by a range selector module that is part of a UI interaction module that handles user inputs for the media editing application. In this example, the range selector module receives user definition of the range (i.e., from the retiming activation item 424 and from the click and drag operation) and translates this range definition into commands for the retiming engine.

The third stage 403 of FIG. 4 shows the selection of a preset effect to be applied to the portion of the central compositing lane 450 within the selected range 480. Specifically, the cursor 490 is used to select from the effects menu 440 a "slower" speed effect that slows the playback speed down to 50% of the normal playback speed. The sub-menu of the effects menu 440 displays playback speed options 75%, 66.7%, 50% and 33.3%. One of ordinary skill in the art would recognize that the "slower" speed effect preset can have other playback speed options. For example, the "slower" speed effect preset includes playback speed options 50%, 25% and 10% in some embodiments.

The fourth stage 404 of FIG. 4 shows the result of the application of the "slower" speed effect. The effect bar 460 of clip A is now partitioned into four sections 461, 462, 463 and 467, each section of the effect bar specifies a playback speed for a portion of the clip 452 that falls under the section. The first section 461 specifies that the portion of the clip 452 from $t_0$ to $t_2$ is to be played back at 100% of the normal speed. The second section 462 specifies that the portion of the clip 452 from $t_2$ to $t'_3$ is to be played back at 50% of the normal speed. The third section 463 specifies that the portion of the central compositing lane from $t'_3$ to $f_1$ is to be played back at 100% of the normal speed. The fourth section remains at 100% playback speed.

The second section 462 corresponds to the selected range 480 after the application of the "slower" preset speed effect. The duration of second section 462 ($t'_3-t_2$) is longer than the duration of the selected range 480 ($t_3-t_2$) because the portion of the second section 462 is being played back at 50% of the normal speed (thus the duration of the section is twice as long as before the speed effect). The section 462 of the effects bar is also marked with a visual indication (i.e., diagonal hash pattern) to indicate that this section is to be played back at a speed slower than normal. In some embodiments, each section of the effects bar is associated with a visual indication of the effect being applied. For example, some embodiments color code each section of the effect bar according to the speed of the playback (e.g., green for normal speed, orange for speed slower than normal, blue for speed faster than normal, and red for stoppage or pause during playback.) Some of these embodiments use different color intensity levels to indicate different levels of speed. Some embodiments use different patterns and or different texts on the effect bar to provide visual indications of effects being applied.

The application of the "slower" speed effect preset is illustrated by stage 503 of FIG. 5*a*. At stage 503, the "slower" speed effect has caused the keyframes 513 and 511 to both shifted to the right (from $t_3$ and $t_1$ to $t'_3$ and $t'_1$) because of the longer duration of the second section 462. The longer duration of the second section 462 also results in a slower playback speed (50%) between $t_2$ and $t'_3$, as the same duration of media time is being stretched out for longer playback time. The speed effect also created one speed discontinuity $t_2$ that corresponds to the keyframe 512 and another speed discontinuity $t'_3$ that corresponds to the keyframe 513. A curve smoothing operation is then performed at these two discontinuities after the stage 503. The stage 503*a* illustrates this curve smoothing operation: a smoothed curve based on a transition interval 522 is introduced around time $t_2$ (i.e., the discontinuity at keyframe 512) and another smoothed curve based on a transition interval 523 is introduced around time $t'_3$ (i.e., the discontinuity at the keyframe 513).

The fourth stage 404 of FIG. 4 also illustrates the selection of a second range 485 by the cursor 490. The second range 485 starts at playback time $t_4$ and ends at playback time $t_5$. The selection of the range 485 corresponds to the stage 504 of FIG. 5*b*, in which additional keyframes 514 and 515 are defined along the playback curve at the playback time $t_4$ and $t_5$.

The fifth stage 405 of FIG. 4 shows the selection of another effect preset from the effects menu 440. Specifically, the "faster" speed effect is selected to accelerate the playback speed within the range 485 to 200% of the normal speed. The sub-menu of the effects menu 440 displays playback speed options 125%, 150%, 200% and 300%. One of ordinary skill in the art would recognize that the "faster" speed effect preset can have other playback speed options. For example, the "faster" speed effect preset includes playback speed options 200%, 400%, 800% and 2000% in some embodiments.

The last stage 406 of FIG. 4 illustrates the result of the "faster" speed effect on the composite presentation and the central compositing lane 450. The effects bar 460 is now partitioned into six sections 461, 463, 464, 465, 466 and 467. The section 461 remains unchanged because it falls outside of the selected range 485. The section 463 also falls outside the selected range, but has shifted to the left (from $t'_3$ to $t''_3$). What was once section 462 with playback speed 50% is partitioned into sections 464-466 by the retiming operation performed on the selected range 485. The section 465 corresponds to the selected range 485, and its duration has been shrunk because its playback speed has been accelerated to 200% of normal speed. The 50% speed section before the selected range 485 becomes the newly created section 464, which starts at $t_2$ and ends at $t_4$. The 50% speed section after the selected range 485 becomes the newly created section 466, which starts at $t'_5$ and ends at $t''_3$.

The application of the "faster" speed effect corresponds to the stage 505 of FIG. 5. At the stage 505, keyframes 515, 513 and 511 have all shifted to the left (from $t_5$, $t'_3$ and $t'_1$ to $t'_5$, $t''_3$ and CO, corresponding to the shorter duration of the section 465. The shorter duration of the section 465 also corresponds to a faster playback speed (200%) between $t_4$ and $t'_5$, as the same duration of media time is being compressed for shorter playback time. The "faster" speed effect has created two additional speed discontinuities: one at $t_4$ between 50% and 200% playback speeds anchored by the keyframe 514, and another at $t'_5$ between 200% and 50% playback speeds anchored by the keyframe 515. Some embodiments then perform a curve smoothing operation for all discontinuities in the playback curve.

The stage 505a of FIG. 5 shows the curve smooth operation on all of the discontinuities after the stage 505. At this stage, the playback curve 500 is anchored by keyframes 512, 514, 515, 513, 511, which represents discontinuities at $t_2$, $t_4$, $t'_5$, $t''_3$, and ending time $t''_1$, respectively. The curve smooth operation introduces sections of smoothed curves based on the transition intervals around the discontinuities at $t_2$, $t_4$, $t'_5$, and $t''_3$. Specifically the smoothed curve 522 is for the discontinuity at $t_2$ (the keyframe 512), the smoothed curve, the smoothed curve 524 is for the discontinuity at $t_4$ (the keyframe 514), the smoothed curve 525 is for the discontinuity at $t'_5$ (the keyframe 515), and the smoothed curve 523 is for the discontinuity at $t''_3$ (the keyframe 513).

In some embodiments, media clips do not necessarily start at time 0 (e.g., a media clip can start at 1 minute after time 0). In these instances, the retiming operations that change playback speeds of specific sections (such as the "faster" and "slower" speed effect presets discussed above) perform the retiming operation by pivoting on time 0 rather than the actual start time of the media clip. For example, if a media clip starts at 5 s and ends at 15 s, a retiming operation that slows the entire media clip to 50% playback speed would change the start time of the media clip to 10 s and the end time to 30 s (instead of leaving the start time at 5 s and changing the end time to 25 s.)

In addition to "slower" and "faster" preset retiming operations, some embodiments includes other preset retiming operations such as "ramp", "conform speed", "hold", "instant replay", and "rewind". Each of these preset retiming operations changes the playback speed on a selected range or section of a media clip. Since an operation that changes the playback speed of a section of a media clip almost always create one or more discontinuities in playback speeds, some embodiments perform curve smoothing operation by introducing transition intervals on some or all of the created discontinuities.

These various other retiming presets will now be described. A "ramp" operation is a retiming operation that automatically divides a selected range of a clip or a set of clips in a media clip of a timeline into multiple sections of increasing or decreasing playback speed. For some embodiments, FIG. 6 illustrates an example ramp retiming operation in a timeline 600 that is similar to the timeline 430 of the GUI 400 in FIG. 4. The timeline 600 includes a media clip 610 (clip A) that has an effects bar 620.

FIG. 6 illustrates the ramp retiming operation in four stages 601-604. The first stage 601 of FIG. 6 shows the selection of a range of media content. A cursor 690 is used to graphically select a range 630 of media content in the media clip 610 from playback time t0 to playback time t1.

The second stage 602 illustrates the selection of a ramp retiming operation from an effects menu 640. Specifically, the selection specifies that the ramp operation gradually decreases the speed of the selected range 630 toward 0% of normal playback speed. The effects menu 640 also includes other options for the ramp retiming operation. For example, the user can select to gradually increase playback speed toward 200% of normal playback speed.

The third stage 603 illustrates the result of the ramp retiming operation. The effects bar 620 and the media clip 610 have been partitioned into seven different sections 621-627. Sections 621 and 627 correspond to portions of the media clip 610 that falls outside of the range 630 and thus remain at 100% of normal playback speed. Section 627 starts at a playback time t'1 instead of t1 because the selected ramp retiming operation slows down playback speed and increases playback time. Sections 622-626 are assigned playback speed at 87%, 62%, 38%, 13% and 0% respectively. To complete the speed ramp toward 0%, some embodiments include the 0% playback speed section 626. In some of these embodiments, the 0% playback speed portion of the speed ramp is shorter than other sections (622-625) in the ramp.

The fourth stage 604 shows the introduction of transition intervals on discontinuities created by the ramp retiming operation. The stage 604 shows the graphical representations of the transition intervals over the effects bar 620. Specifically, the transition interval 631 is introduced around the discontinuity between 100% and 87% playback speeds, the transition interval 632 is introduced around the discontinuity between 87% and 62% playback speeds, the transition interval 633 is introduced around the discontinuity between 62% and 38% playback speeds, the transition interval 634 is introduced around the discontinuity between 38% and 13% playback speeds, and the transition interval 635 is introduced around the discontinuity between 13% and 0% playback speeds. In this example, the transition intervals are illustrated as being transparently superimposed over the effects bar. However, one of ordinary skill would realize that are many other possible ways of graphically illustrating transition intervals in the GUI of a media editing application.

One of ordinary skill in the art would also recognize that many different possible implementations of the ramp retiming operation is possible than what is illustrated in FIG. 6. For example, instead of having five speed ramp sections, the media editing application can provides six or more speed ramp sections.

FIG. 7 illustrates a playback curve 700 that is maintained by the media editing application while performing the ramp retiming operation of FIG. 6. FIG. 7 also illustrates a smoothed playback curve 750 that is the result of a curve smoothing operation being performed on the playback curve 700.

As illustrated, the playback curve 700 is partitioned into sections of different playback speed (i.e., different slopes) corresponding to the sections of the effects bar 620. Keyframes 711-716 are inserted along the playback curve 700 corresponding to the speed transitions. The keyframes 711-715 are equally spaced in playback time such that the different sections of the speed ramp have nearly equal durations. The keyframe 716 is inserted for one short duration of playback time before t'1 during which the playback speed is 0%.

The smoothed playback curve 750 includes sections of smoothed curves 721-725 in place of speed discontinuities. Specifically, the discontinuities anchored by the keyframes 711-715 are replaced by the smooth curve sections 721-725. The sections of the smoothed curves 721-725 are created based on the transition intervals 631-635, respectively. With these sections of the smoothed curves, the playback speed of the clip changes smoothly and gradually without any discontinuity from 100% to 0%.

In some embodiments, the video playback of a composite presentation being composited by the media editing application is conducted at a particular frame rate. However, the source media content (e.g., source video clips in the media library) that is used to construct the composite presentation may not have the same frame rate. In such cases, some embodiments construct interpolated frames in order to convert frames from a native frame rate to the particular frame rate of the composite presentation. The interpolation of video frames will be discussed further below in Section IV.

In some embodiments, the media editing application provides a retiming speed effect preset that plays every frame of a video clip at a rate that conforms with the particular frame rate of the media editing application. For example, a media editing application in some embodiments plays at a standard frame rate of 24 frames per second, while a piece of high resolution media content produced by a high speed camera may have 60 frames per second. Playing such high resolution piece of media at 100% normal speed requires down sampling of the frames (e.g., playing back only two frames for every five available.) Some embodiments provide a "conform speed" preset that plays every frame of the piece of high resolution media within a selected range at the standard 24 frames per second. The result is a section that plays every frame of the high resolution media content, albeit at a slower rate of 40% of normal speed (i.e., 24/60).

One of ordinary skill in the art would recognize that the "conform speed" retiming operation is applicable regardless of the source frame rates and the playback frame rates. For some embodiments, FIG. 8 illustrates an example "conform speed" retiming operation performed on a piece of media content that has a source frame rate that is three times the playback frame rate of the composite presentation.

FIG. 8 illustrates a timeline 800 in a GUI of a media editing application that is similar to the GUI 400. Within the timeline 800 is a media clip 850. The media clip displays a series of thumbnail images sampled at regular intervals of the playback time from the media clip 850. Each thumbnail image is labeled with an index that reflects the position of the thumbnail image in media time for purpose of illustration. The media clip 850 also displays an effects bar 860 that indicates the playback speed of the media content in the container.

FIG. 8 illustrates the example "conform speed" retiming operation in four stages 801-804. At the first stage 801, the effects bar 860 of the content media clip 850 indicates that the entire media clip is at 100% of normal speed. The thumbnails 851-858 are indexed at increments of 3 (0, 3, 6, 9 . . . ) at the current zoom level, which correspond to playing back the media content at the standard frame rate. The first stage 801 also illustrates the selection of a range 870 that starts at playback time t0 and ends at playback time $t_1$. In some embodiments, the range selection function is activated after the user has chosen to activate a retiming tool such as by selecting the retiming activation item 424 of the GUI 400.

The second stage 802 shows the selection of the "conform speed" retiming operation preset from an effects menu 840. The "conform speed" retiming operation will be applied to the media content in the selected range 870 between the playback times t0 and $t_1$.

The third stage 803 illustrates the result of the retiming operation. A new section 862 has appeared in the effects bar 860 that correspond to the selected range 870. The new section 862 ends at $t'_1$ instead of $t_1$ because its duration is three times as long as the selected range 870. This section corresponds to a portion of media content that is to be played back at 33.3% normal speed because every frame of the source media content is being played back. Since the source frame rate of the media content is three times the playback frame rate, the playback speed is effectively reduced to 33.3% of normal. The thumbnail images under the section 862 reflect the reduced playback speed, as they are thumbnails indexed at increments of 1 (6, 7, 8, 9, 10, 11 . . . ).

By changing the playback speed of section 862 from 100% to 33%, the "conform speed" retiming operation preset has created two discontinuities at time $t_0$ and at time $t'_1$. The fourth stage 804 shows the introduction of transition intervals on the discontinuities created by the "conform speed" operation. The stage 804 shows the graphical representations of the transition intervals over the effects bar 860. Specifically, the transition interval 864 is introduced around the discontinuity at $t_0$ between 100% and 33% playback speeds, and the transition interval 866 is introduced around the discontinuity at $t'_1$ between 33% and 100% playback speeds. In this example, the transition intervals are illustrated as being transparently superimposed over the effects bar 860. However, one of ordinary skill would realize that are many other possible ways of graphically illustrating transition intervals in the GUI of a media editing application.

Figure 9:
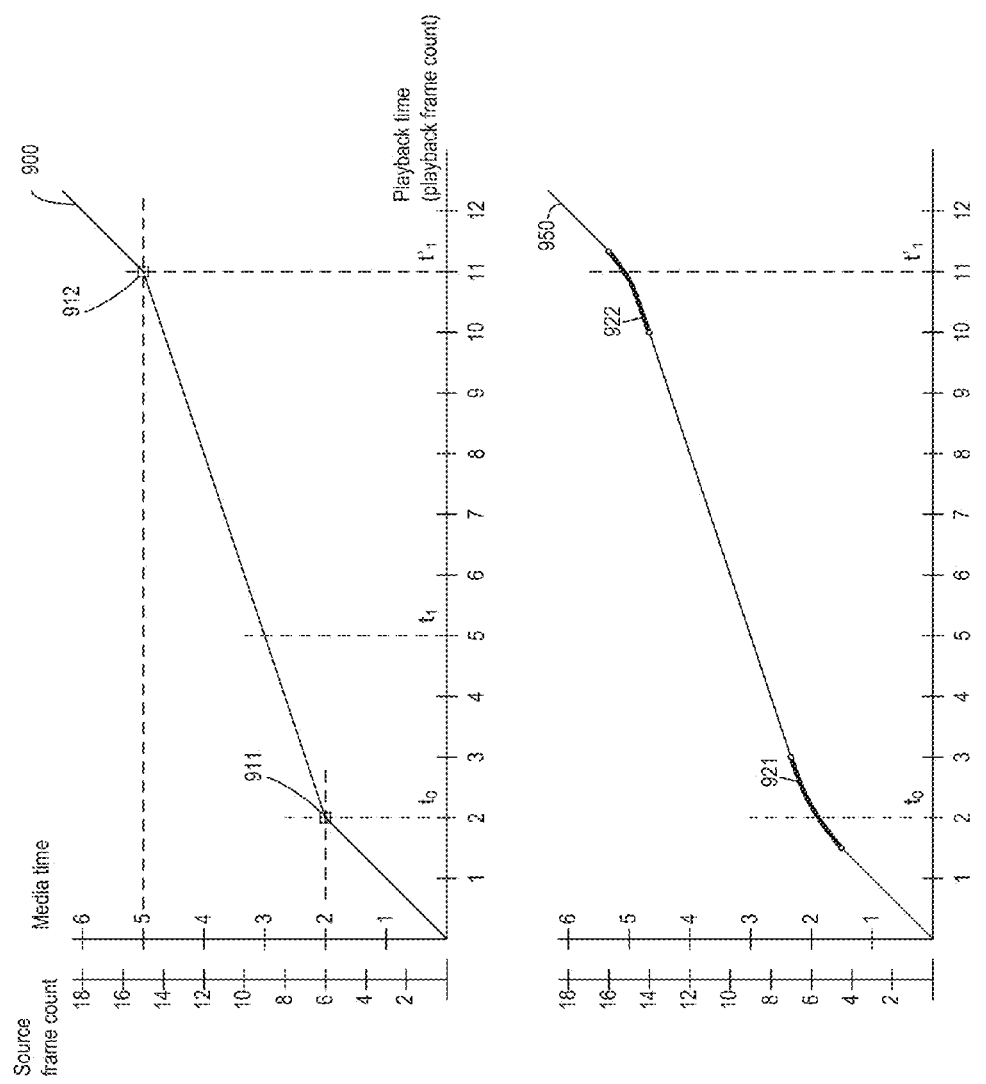
FIG. 9 illustrates a playback curve that corresponds to the "conform speed" retiming operation of FIG. 8.

FIG. 9 illustrates a playback curve 900 that corresponds to the "conform speed" retiming operation of FIG. 8. FIG. 9 also illustrates a smoothed playback curve 950 that is the result of a curve smoothing operation being performed on the playback curve 900.

The playback curve 900 has two keyframes 911 at $t_0$ and 912 at $t'_1$. The section of the playback curve 900 before the first keyframe 911 has a playback speed of 100% normal, meaning that the playback time is elapsing at the same rate as media time. During this section of the curve, only one out of every three frames from the media content is being played back. The section of the curve 900 after $t_0$ and before $t'_1$ corresponds to the section with the "conform speed" retiming speed effect. During this section of the playback curve 900, every frame of the media content is played, but the media time is elapsing at only ⅓ of previous rate, showing a 33% playback speed.

The smoothed playback curve 950 includes sections of smoothed curves 921 and 922 in place of speed discontinuities. Specifically, the discontinuities anchored by the keyframes 911 and 912 are replaced by the smooth curves 921 and 922. The sections of the smoothed curves 921 and 922 are created based on the transition intervals 864 and 866, respectively. With these sections of the smoothed curves, the playback speed of the clip changes smoothly and gradually without any discontinuity from 100% to 33% and from 33% back to 100%.

Some embodiments of the media editing application include other retiming operation presets. For example, some embodiments of the media editing application include "hold" operation that cause playback to pause or hold at a particular video frame. This preset retiming operations creates a 0% playback speed section in the playback curve and results in speed discontinuities between the 0% section and other sections of the playback curve.

In some embodiments, the media editing application includes preset operations that repeat a selected section of a media clip or a composite presentation. An "instant replay" preset retiming operation repeats the media content in the selected range in a forward direction. A "rewind" preset retiming operation repeats the media content in the selected range in a reverse direction. Some of these preset retiming operations repeat the selected sections in the playback curve at either the same playback speed or reverse playback speed. The playback curve after these repeat retiming operations would have speed discontinuities at the start and at the end of the repeated section. The description of "instant replay", "rewind", and "hold" retiming operation presets can be found in U.S. Patent Application Publication No. 20120210228. U.S. Patent Application Publication No. 20120210228 is hereby incorporated by reference.

In some embodiments, the media editing application will not introduce transitional intervals and will not perform curve smoothing for some of the discontinuities. Specifically, some embodiments do not perform curve smoothing operations on discontinuities created by rewind and instant replay operations. Some other embodiments apply curve smoothing on all speed discontinuities unless the media content is discontinuous. For example, some discontinuities created by instant replay operations are also discontinuous in content; some embodiments therefore would not apply curve smoothing on these discontinuities. On the other hand, some discontinuities created by hold or rewind operations are continuous in content; some embodiments therefore apply curve smoothing on these discontinuities even though these speed discontinuities are between positive playback speed and negative (or zero) playback speeds.

II. Transitions Between Different Playback Speeds

As mentioned earlier by reference to stage 506 of FIG. 5, some embodiments perform curve smoothing operation on the playback curve in order to prevent abrupt changes in playback speed. Any of the speed effect operations described above in Section I can create one or more speed discontinuities in the playback curve. For example, a "ramp" retiming operation as described above by reference to FIG. 6 creates several different sections 621-627 with different playback speeds. The intersection joining two of these different sections with different playback speeds necessarily creates a speed discontinuity. The curve smoothing operation adjusts the playback curve near the playback speed discontinuities such that the slope or tangent (i.e., playback speed) of the smoothed playback curve is continuous throughout the curve. In some embodiments, the curve smoothing operation is entirely handled by the media editing application and is not visible to a user nor is it accessible by the user.

Some embodiments introduce transition intervals between different playback speeds. Such transition intervals has a specified start time and a specified end time in order to further constrain the smoothed playback curve. In some embodiments, the smoothed playback curve is constrained to curve (i.e., change speed) only within the transition intervals. This allows the smooth curve to immediately settle into a straight line remain a straight line before the start of the transition interval and after the end of the transition interval. Such a smoothed curve goes through keyframes that anchor the start and the end of the transition intervals, but would not necessarily go through the discontinuity keyframes that were created by the retiming operations (e.g., the keyframes 211 or 212 that marks the speed discontinuities between the sections 221, 222, and 223 in FIG. 2).

Figure 10:
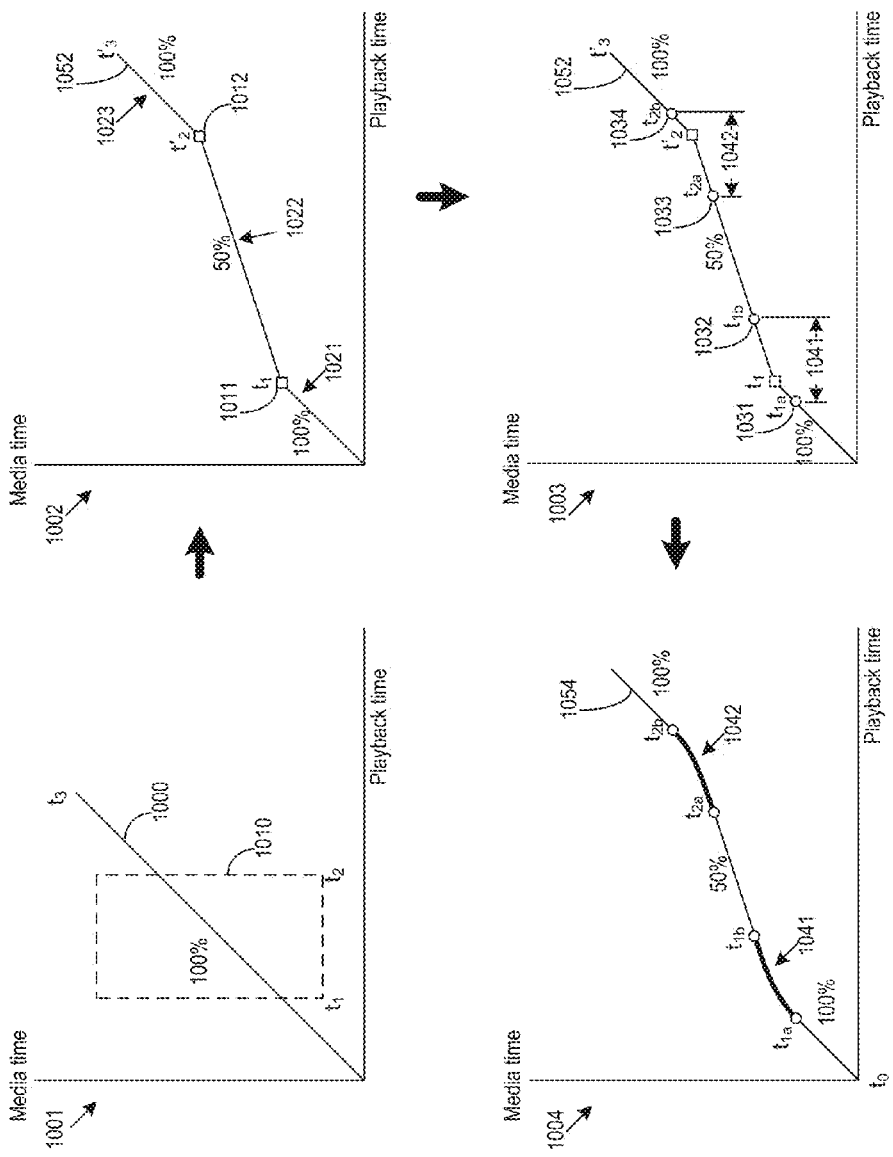
FIG. 10 illustrates a curve smoothing operation that uses transition intervals between different playback speeds in some embodiments.

FIG. 10 illustrates a curve smoothing operation that uses transition intervals between different playback speeds in some embodiments. The smoothed curve created by this curve smoothing operation goes through keyframes that anchor the start and the end of the transition intervals but not the discontinuity keyframes that were created by retiming operations to mark the start or end of a particular playback speed. FIG. 10 illustrates the curve smooth operation in four stages 1001-1004 for a playback curve 1000.

At the first stage 1001, the media clip associated with the playback curve 1000 has not experienced any retiming operations. A section of the media clip has been selected by a range selector for a retiming operation (conceptually illustrated by a box 1010). The selected range 1010 (or section) of the media clip starts at playback time $t_1$ and ends at playback time $t_2$.

The second stage 1002 shows the creation of a new playback curve 1052 that includes sections 1021-1023. The retiming operation creates the two keyframes 1011 and 1012. The keyframe 1011 anchors at $t_1$ the end of the 100% playback speed section 1021 and the start of the 50% playback section 1022. The keyframe 1012 anchors at $t'_2$ the end of the 50% playback speed section 1022 and the start of the 100% playback section 1023.

The third stage 1003 shows the introduction of transition intervals 1041-1042 and the keyframes that anchors the transition intervals. The transition interval 1041 is around $t_1$ and serves to transition from 100% playback speed to 50% playback speed. The transition interval 1042 is around $t_2'$ and serves to transition from 50% playback speed to 100% playback speed. In addition, keyframes 1031-1032 are added to anchor the start and end of the transition interval 1041, and keyframes 1033-1034 are added to anchor the start and end of the transition interval 1042. The keyframe 1031 falls on the playback curve 1052 at $t_{1a}$ before the discontinuity keyframe 1011 (at $t_1$). The keyframe 1032 falls on the playback curve 1052 at $t_{1b}$ after the discontinuity keyframe 1011. The keyframe 1033 falls on the playback curve 1052 at $t_{ea}$ before the discontinuity keyframe 1012 (at $t_2'$). The keyframe 1034 falls on the playback curve 1052 at $t_{2b}$ after the discontinuity keyframe 1012.

The fourth stage 1004 shows the result of a curve smoothing operation that is based on the transition intervals. The curve smoothing operation produced a new playback curve 1054 that goes through the keyframes 1031-1034 but not the keyframes 1011 and 1012. In other words, the new playback curve is based only on the keyframes that anchors the transition intervals rather than the keyframes that were created by retiming operations to delineate between different playback speeds. Playback speed changes without discontinuity within the transition intervals 1041 and 1042. Specifically, the smoothed curve within the transition interval 1041 start with the playback speed of the section 1021 (100%), gradually and continuously changes toward the playback speed of the section 1022 (50%), and the smoothed curve within the transition interval 1042 start with the playback speed of the section 1022 (50%), gradually and continuously changes toward the playback speed of the section 1023 (100%). Playback speed settles quickly into constant speed outside of transition intervals without any discontinuity in playback speed. In some embodiments, the sections of the playback curve 1054 that lies outside of the transition intervals remain at constant speed. Thus, the playback speed is at constant 100% before $t_{1a}$ and after $t_{2b}$. The playback speed is at constant 50% between $t_{1b}$ and $t_{2a}$.

Figure 11:
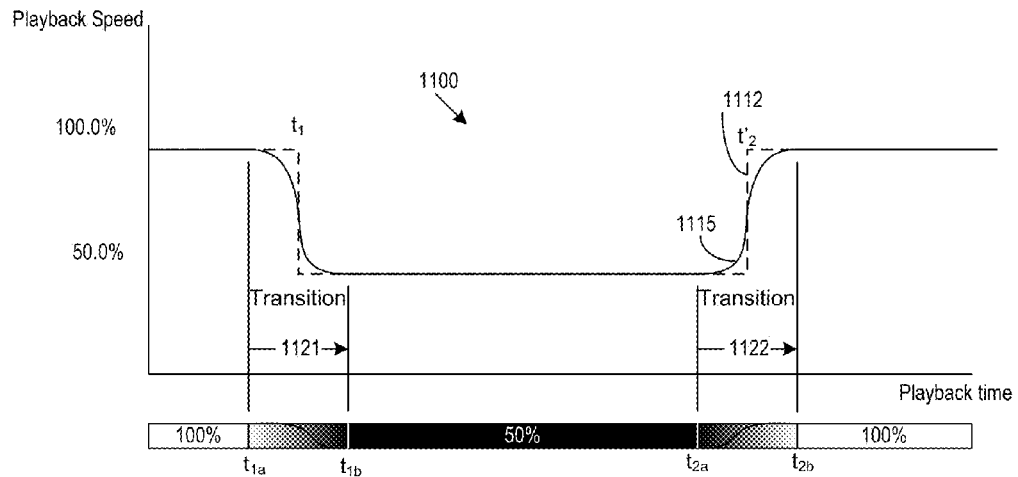
FIG. 11 illustrates a playback speed plot that is based on the smoothed playback curve that is constrained by specified start and end times of the transition intervals.

FIG. 11 illustrates a playback speed plot 1100 that is based on the smoothed playback curve 1054 of FIG. 10, which is constrained by specified start and end times of the transition intervals. As illustrated, the plot 1100 includes a dashed line 1112 and a solid curve 1115. The dashed line 1112 starts at 100% playback speed, transitions to 50% playback speed at $t_1$, and then transitions back to 100% playback speed at $t_2'$. Instead of specifying only that the 100% playback speed shall switch over to 50% playback speed at $t_1$ and that 50% playback speed shall switch over to 100% playback speed at $t_2'$, some embodiments use transition interval 1121 to specify that the transition from 100% to 50% is starts at $t_{1a}$ and ends at $t_{1b}$, and use transition interval 1122 to specify that the transition from 50% back to 100% is starts at $t_{2a}$ and ends at $t_{2b}$.

The solid curve 1115 corresponds to playback speed that is based on a smoothed curve that is constrained by the start and end times of the transition intervals. As shown in the figure, the solid curve 1115 coincides with the dashed line 1112 in regions outside of the transition intervals. The solid curve 1115 starts its transition to 50% playback speed at the start of the first transition interval at $t_{1a}$ and complete the transition at the end of the first transition interval at $t_{1b}$. The solid curve 1115 starts its transition to 100% playback speed at the start of the second transition interval at $t_{2a}$ and complete the transition at the end of the second transition interval at $t_{2b}$.

The retiming operation illustrated in FIGS. 10-11 is a retiming operation that slows the playback speed of a portion of the media clip (from 100% to 50% in this instance). In some embodiments, the curve smooth operation operates equally well for any speed transitions, such as speed transitions to/from 0% playback speed (e.g., "hold" retiming operation) or even negative speed (e.g., "rewind retiming operation").

Figure 12:
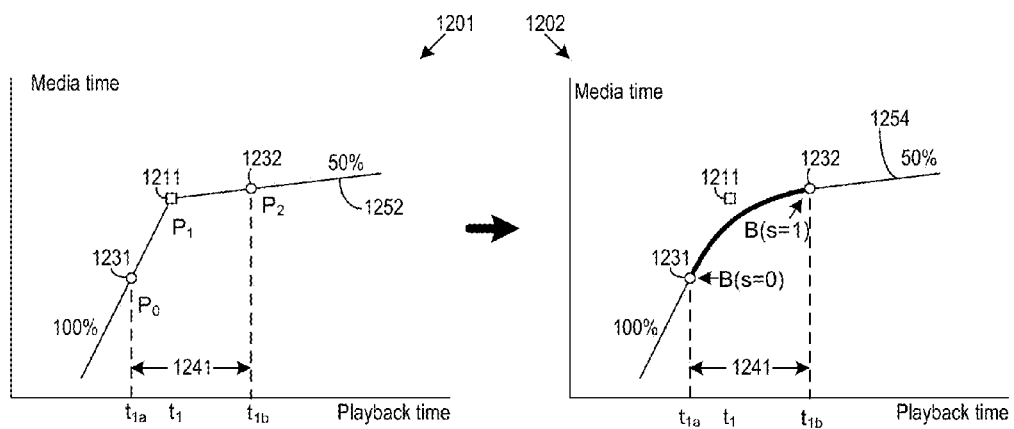
FIG. 12 illustrates the creation of a smoothed curve that is based on a Bezier curve.

In some embodiments, a smoothed curve within a transition interval is constrained to gradually transition from the first playback speed at the start of the transition interval to the second playback speed at the end of the transition interval, the first speed being the playback speed of the media clip before the speed discontinuity and the second speed being the playback speed of the media clip after the speed discontinuity. In some embodiments, the smoothed curve is a Bezier curve that fulfills these constraints. In some embodiments, the smoothed Bezier curve is a Quadratic Bezier Curve that is produced according to the following equation:

$$B(s) = (1-s)^2 P_0 + 2(1-s)sP_1 + s^2 P_2, s \in [0,1] \quad (1)$$

where B(s) is the parametric curve based on the parameter s that varies from 0 to 1, $P_0$ is the start of the transition interval, $P_1$ is the discontinuity, $P_2$ is the end of the transition interval. FIG. 12 illustrates the creation of a smoothed curve that is based on a Bezier curve. FIG. 12 shows the creation of the Bezier curve in two stages 1201 and 1202.

The first stage 1201 shows a portion of a playback curve 1252, which has a discontinuity at playback time $t_1$ between playback speed 100% and playback speed 50% created by an earlier retiming operation. The discontinuity is anchored by a discontinuity keyframe 1211. The first stage 1201 also shows the introduction of a transition interval 1241, which is anchored at its start by a keyframe 1231 at the playback time $t_{1a}$ and at its end by a keyframe 1232 at the playback time $t_{1b}$. Each of the keyframes 1211, 1231, and 1232 specifies a specific point in time in the media content (i.e., media time) that is to be played back at a particular playback time. For the purpose of creating a quadratic Bezier Curve, the start keyframe 1231, the discontinuity keyframe 1211, and the end keyframe 1232 correspond to $P_0$, $P_1$, and $P_2$ of the equation (1), respectively.

The second stage 1202 shows the computed Bezier curve for the transition interval 1241. The Bezier curve B(s) starts at $P_0$ (i.e., the start keyframe 1231) with the parameter s=0, and ends at $P_2$ (i.e., the end keyframe 1232) with the parameter s=1. The Bezier curve does not go through the discontinuity keyframe 1211, but it fulfills the constraints by gradually transitioning from the playback speed 100% at the start of the transition interval 1241 to the playback speed 50% at the end of the transition interval 1241. The smoothed playback curve 1254 is continuous. Its derivative (playback speed) is also continuous.

To specify a smoothed playback curve, some embodiments store the start and the end of the transitional intervals along with keyframes that defines the start and the end of the different speed sections of the media clip. The actual smoothed curve is not stored in some embodiments. To playback a media clip according to a smoothed playback curve, some embodiments use the stored information of the transitional intervals (i.e., their start and end) to construct the actual smoothed playback curve for media clip playback. In some other embodiment, the data structure of the playback curve stores the actual smoothed curve in addition to the keyframes and the transition intervals such the playback engine can retrieve the actual smoothed playback curve without having to create the smoothed curve.

Figure 13:
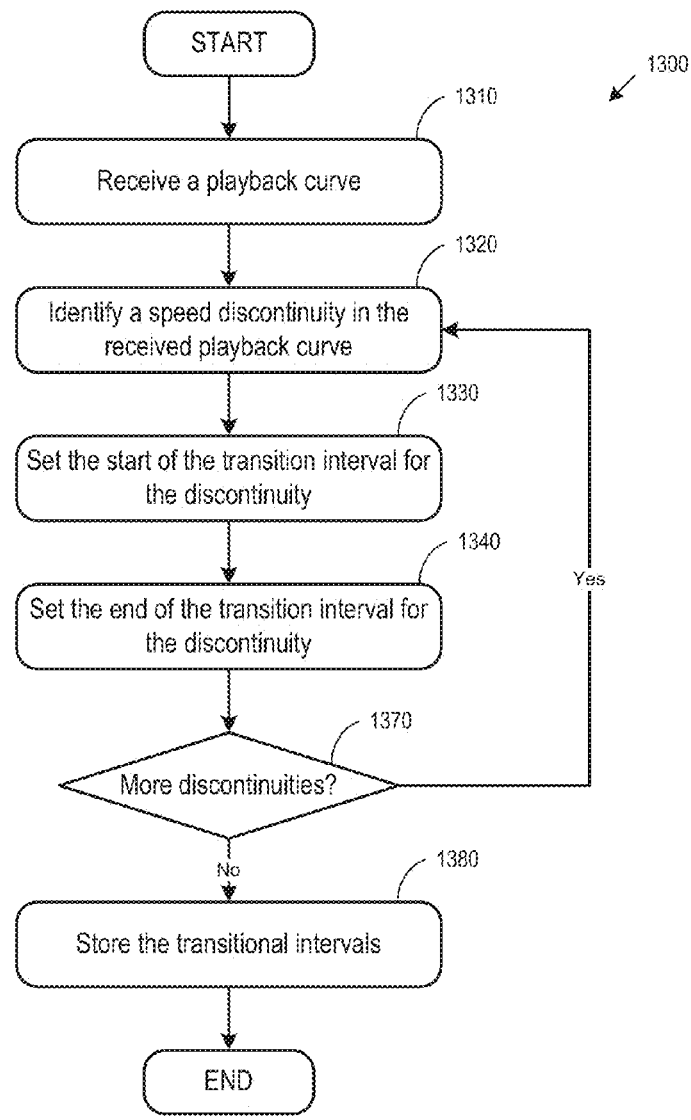
FIG. 13 conceptually illustrates a process for specifying a smoothed playback curve following a retiming operation by using transition intervals.

FIG. 13 conceptually illustrates a process 1300 for specifying a smoothed playback curve following a retiming operation by using transition intervals. In some embodiments, this process is performed by the media editing application as part of the operation 350 in the process 300 as discussed above by reference to FIG. 3.

The process 1300 starts when the media editing application has just performed a retiming operation on a media clip. The process receives (at 1310) the playback curve that controls the timing of the playback of the media clip. The retiming operation has altered the playback curve of the media clip based on the type of retiming operation that was performed and also based on the range of media clip that was selected for the retiming operation. As the retiming operation changes the playback speed in selected sections of the media clip, speed discontinuities will occur between sections designated to be played at different speeds. In addition to the playback curve itself, some embodiments also receive keyframes that anchor the start and the end of the retimed section(s) of the media clip. Some of these keyframes are created or defined by the retiming operation and the range selection. Some of these keyframes are discontinuity keyframes because they mark the speed discontinuities and serve as border between different sections of the media clip.

Next, the process identifies (at 1320) a speed discontinuity in the playback curve. In some embodiments, the identification of the speed discontinuities is based on discontinuity keyframes stored in the data structure of the playback curve. Instead or in addition to relying on keyframes to identify speed discontinuities in the playback curve, some embodiments process the playback curve to identify locations where discontinuities are (e.g., by taking a first derivative of the playback curve).

Next, the process sets (at 1330) the start of the transition interval for the identified discontinuity. The process then sets (at 1340) the end of the transition interval for the identified discontinuity. In some embodiments, the media editing application sets the start and end of the transition interval based on a predefined fraction of the section before the discontinuity and of the section after the discontinuity. In some other embodiments, the media editing application sets the start of the transition interval based on a fixed time interval. Defining the start and end of transition will be further described below by reference to FIG. 14.

At 1370, the process determines if there are more discontinuities in the received playback curve. If yes, the process returns to 1320 to identify another speed discontinuity in the playback curve. Otherwise, the process proceeds to 1380;

At 1380, the process stores the transition intervals. In some embodiments, the transition intervals are stored as part of the data structure of the playback curve. In some of these embodiments, the data structure of the playback curve stores the start playback time and the end playback time of the transition intervals. Data structures of playback curves will be further described below by reference to FIG. 24. After storing the transition intervals, the process 1300 ends. Having specified the transition intervals for curve smoothing, the user is free to change the start and the end of the transition intervals as discussed above by reference to FIGS. 1 and 2.

As mentioned, immediately after a retiming operation, some embodiments automatically set a start and an end for each of the transition intervals. The automatically set start and end of the transition intervals can then be adjusted by the user as discussed above by reference to FIG. 1. FIGS. 14-15 illustrate the automatic setting of the start and the end of transition intervals for some embodiments.

FIG. 14 illustrates an example media clip for which the start and the end of its transition intervals are initially defined according to a predefined fraction. The figure illustrates the initial definition of the transition interval in two stages 1401 and 1402. The example media clip is represented by its corresponding effects bar 1400, which includes indications of the playback speed at different playback times. At the first stage 1401, the effects bar 1400 is partitioned into three sections (by a retiming operation) into three speed sections 1410, 1420, and 1430 (labeled section A, B, and C respectively) with speed discontinuity at $t_1$ and $t_2$.

At the second stage 1402, the effects bar 1400 shows the introduction of transition intervals 1415 and 1425. The transition interval 1415 is for transitioning from the playback speed of section A to the playback speed of section B around the playback time $t_1$, while the transition interval 1425 is for transitioning from the playback speed of section B to the playback speed of section C around playback time $t_2$.

The transition interval 1415 is defined to start one quarter of the duration of the original section A (1410) before $t_1$, and to end of one quarter of the duration of the original section B (1420) after $t_1$. Likewise, the transition interval 1425 is defined to start one quarter of the duration of the original section B (1420) before $t_2$, and to end of one quarter of the duration of the original section C (1430) after $t_2$. In other words, the last quarter of section A and the first quarter of section B join together to become the transition interval 1415, while the last quarter of section B and the first quarter of section C join together to become the transition interval 1425. This leaves sections A, B, and C shorter than before, but the duration of the media clip when played back would not change.

FIG. 15 illustrates an example media clip for which the start and the end of the transition intervals are initially defined based on fixed time intervals. The figure illustrates the initial definition of transition intervals in two stages 1501 and 1502 for the same media clip that is represented by the effects bar 1400. The first stage 1501 is the same as the stage 1401 of FIG. 14, in which the effects bar 1400 is partitioned into three sections (by a retiming operation) into three speed sections 1410, 1420, and 1430 (labeled section A, B, and C respectively) with speed discontinuity at $t_1$ and $t_2$.

At the second stage 1502, the effects bar 1400 shows the introduction of transition intervals 1515 and 1525. The transition interval 1515 is for transitioning from the playback speed of section A to the playback speed of section B around the playback time $t_1$, while the transition interval 1525 is for transitioning from the playback speed of section B to the playback speed of section C around playback time $t_2$.

The transition interval 1515 is defined to start 0.5 second before $t_1$ and end 0.5 second after $t_1$. Likewise, the transition interval 1525 is defined to start 0.5 second before $t_2$ and end 0.5 second after $t_2$. In other words, the last 0.5 second of section A and the first 0.5 second of section B join together to become the transition interval 1515, while the last 0.5 second of section B and the first 0.5 second of section C join together to become the transition interval 1525. This leaves sections A, B, and C shorter than before, but the duration of the media clip when played back would not change.

In some embodiments, the media editing application defines the initial start and the end (hence the initial duration) of transition intervals differently. For example, some embodiments define the duration of a transition interval based on a fraction of the entire duration of the media clip rather than of a particular speed section.

Once a transition interval has been initially defined, its duration (i.e., its start and end) can be adjusted by the user as discussed above by reference to FIGS. 1 and 2. In some embodiments, a transition interval is just like any other speed effect sections that are created by retiming operations and can be likewise manipulated by users. Section III below describes the user manipulation of speed effect sections.

Figure 16:
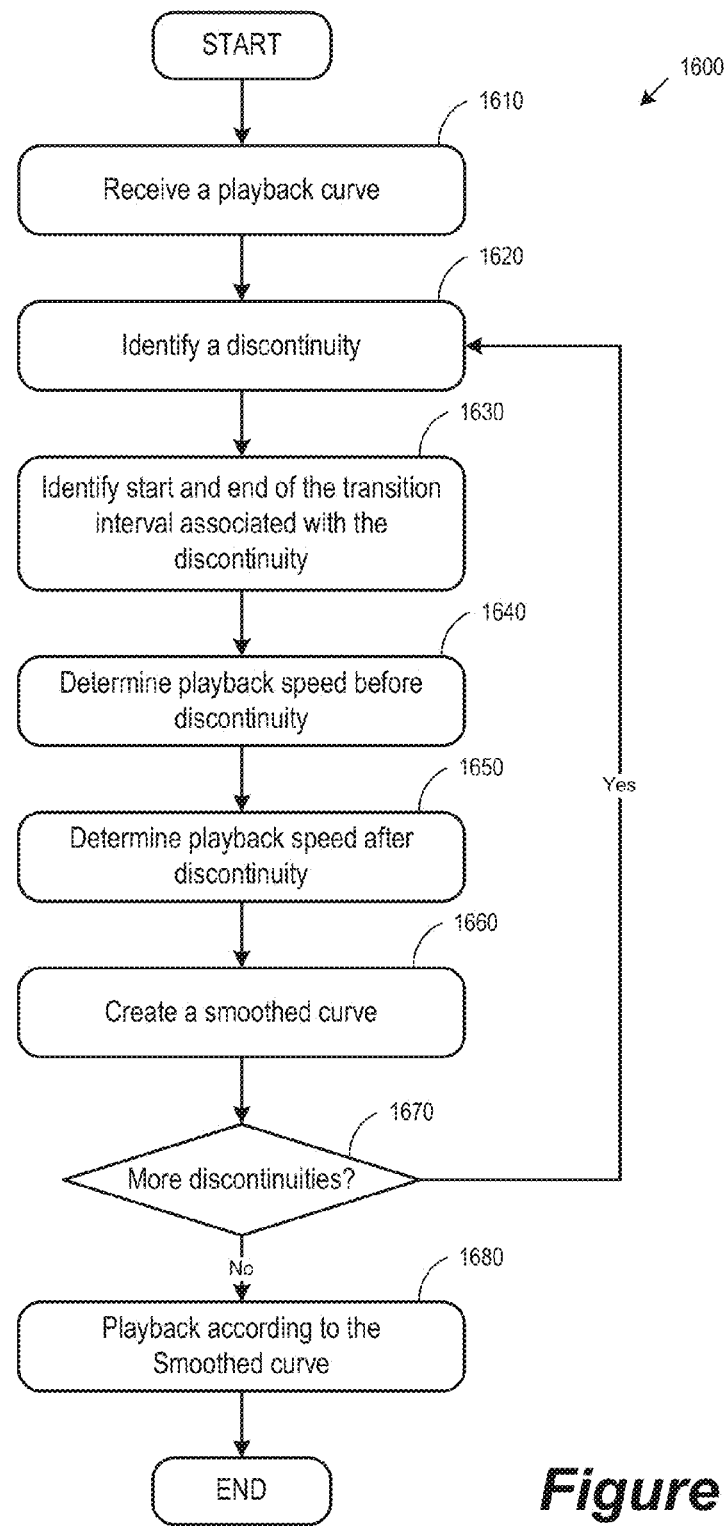
FIG. 16 conceptually illustrates a process that uses the stored information of the transitional intervals to construct the actual smoothed playback curve for media clip playback.

For some embodiments, FIG. 16 conceptually illustrates a process 1600 that uses the stored information of the transitional intervals (i.e., their start and end) to construct the actual smoothed playback curve for media clip playback. The process 1600 is performed by a playback engine of the media editing application in some embodiments. The process 1600 starts when the media editing application has received a user command to playback a particular a media clip associated with a particular playback curve.

The process receives (at 1610) the playback curve that controls the timing of the playback of the media clip. In some embodiments, the playback curve is in a data structure that includes keyframes that anchor the start or the end of retimed section(s) of the media clip. In addition, the retrieved playback curve also includes specification of the transitional intervals.

Next, the process identifies (at 1620) a discontinuity in the playback curve, and identifies (at 1630) the start and end of the transition interval that is associated with the discontinuity. In some embodiments, the data structure of the playback curve maintains a list of all the discontinuity keyframes, and each transition interval is associated with a discontinuity keyframe. Some embodiments identify the discontinuities and the transition intervals by tracing through the list of keyframes in the data structure.

The process then determines (at 1640) the playback speed before the discontinuity. In some embodiments, the speed before the discontinuity is determined by calculating the slope of the playback curve before the discontinuity. The process likewise determines (at 1650) the playback speed after the discontinuity. In some embodiments, the speed after the discontinuity is determined by calculating the slope of the playback curve after the discontinuity.

Based on the transition interval associated with the discontinuity as well as the playback speed before and after the discontinuity, the process creates (at 1660) a smoothed curve. The start and the end of the transition interval serve as anchoring keyframes that constrains the smoothed curve. The smoothed curve is further constrained by the playback speeds before and after the discontinuity such that the slope of the smoothed curve transition gradually and continuously from the playback speed before the discontinuity to the playback speed after the discontinuity. The creation of smoothed curve based on Bezier curves is described above by reference to FIG. 12.

At 1670, the process determines if there more discontinuities in the received playback curve. If yes, the process returns to 1620 to identify another speed discontinuity in the playback curve. Otherwise, the process proceeds to 1680 to playback the media clip based on the timing specified by the smoothed playback curve. After the playback, the process 1600 ends.

III. User Adjustment of Speed Effects

As mentioned above, the media editing application of some embodiments provides preset speed effects so a user can quickly achieve an initial retiming effect on a selected range in the composite presentation or media clip. These retiming effects create different sections in the playback curve with different playback speeds. In addition, some embodiments introduce transition intervals between the different speed effects sections created by the retiming effects. These initially created speed effect sections can then be used as a template for further adjustments and refinements by the user for desired result. FIGS. 1-2 above illustrate examples of such further adjustments and refinements of speed effects. In some embodiments, the adjustment of the speed effect is accomplished by adjusting individual speed effect sections that have been created by the earlier preset speed effects. In some of these embodiments, effects bars associated with each speed effect section have graphical handles that can be manipulated by the user to adjust the speed effect. After each speed effect adjustment, some embodiments examine each transition interval. Based on such examination of the transition intervals, some embodiments eliminate one or more transition intervals, adjust one or more of the transition intervals, and/or perform new curve smoothing operation based on the remaining adjusted transition intervals.

Figure 17A:
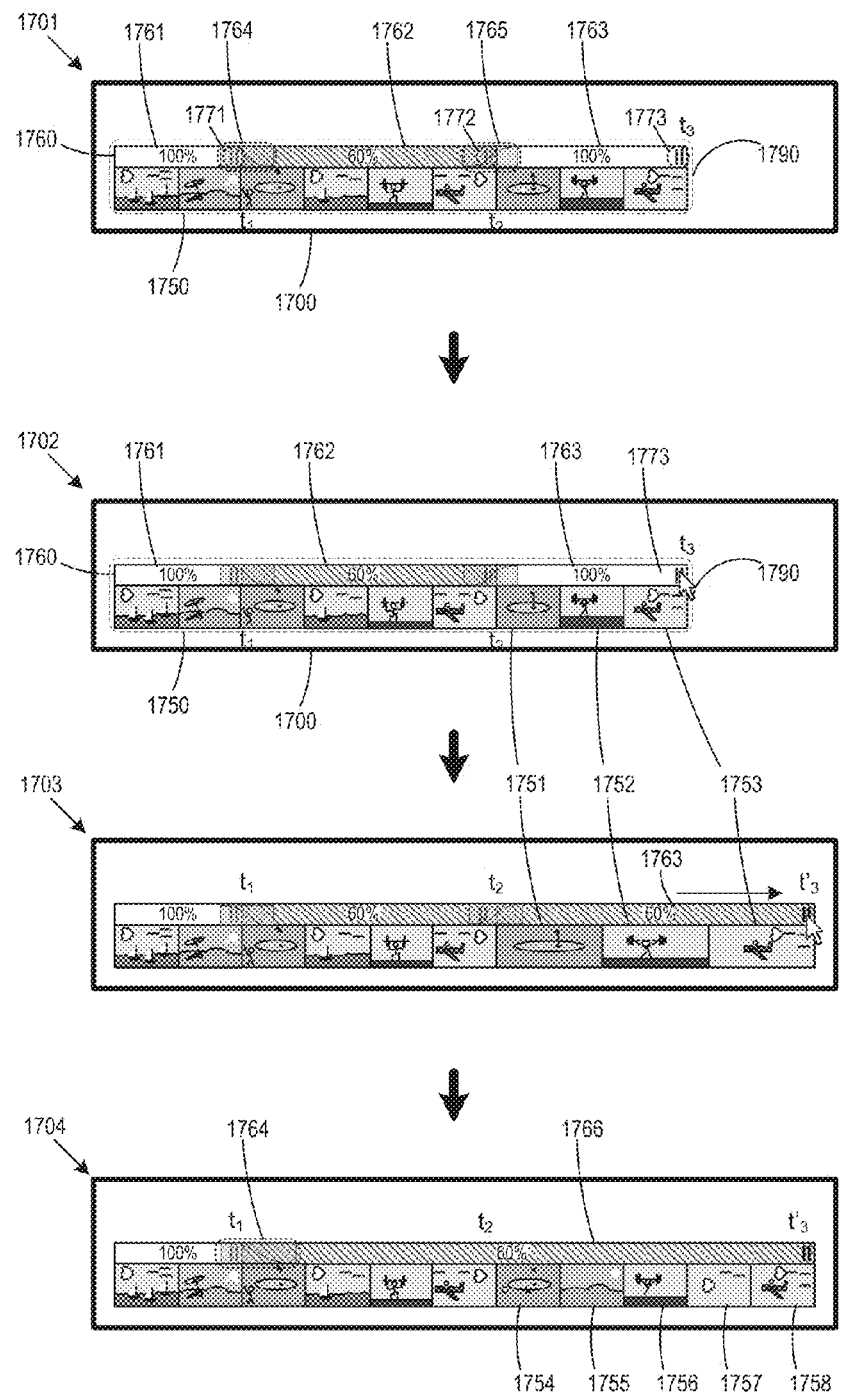
FIGS. 17a-b illustrate an example speed effect adjustment operation of a media clip that has been partitioned by an earlier preset retiming operation.
Figure 17B:
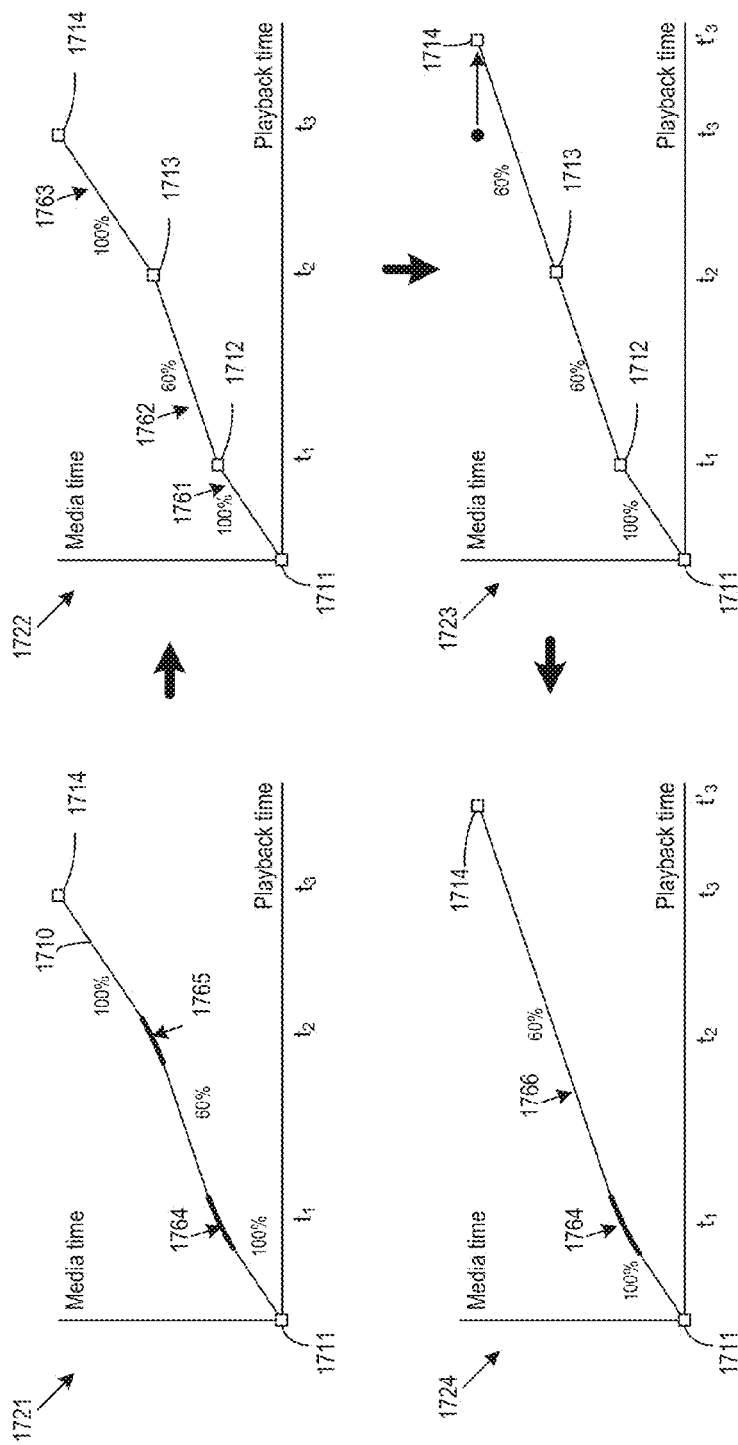

FIGS. 17*a-b* illustrate an example speed effect adjustment operation of a media clip that has been partitioned by an earlier preset retiming operation. The example speed effect adjustment operation results in elimination of a discontinuity and a transition interval.

FIG. 17*a* illustrates a timeline 1700 of a GUI similar to the GUI 400 of a media editing application. Within the timeline 1700 is a representation of a media clip (or a media container) 1750. The representation of the media clip displays a series of thumbnail images sampled at regular intervals of the playback time from the images in the media clip 1750. The representation of the media clip 1750 also displays an effects bar 1760 that indicates the playback speed of the media content in the container. The effects bar is partitioned into three sections 1761-1763 by one or more previous preset speed effect operations such as the "slower" operation discussed earlier by reference to FIGS. 4-5. Each section of the effect bar 1760 displays the playback speed of that section. Each section also includes an adjustment handle. Specifically, the section 1761 has an adjustment handle 1771, the section 1762 has an adjustment handle 1772, and the section 1763 has an adjustment handle 1773.

FIG. 17*a* illustrates the example speed effect adjustment operation by user manipulation in four stages 1701-1704 of the timeline 1700. FIG. 17*a* will be described by reference to FIG. 17*b*, which illustrates the corresponding stages 1721-1724 of a playback curve 1710 that is associated with the media clip 1750.

The first stage 1701 in FIG. 17*a* shows the media clip 1750 and the speed effects bar 1760 before user adjustment of speed effect. The stage 1701 corresponds to the playback curve stage 1721 of FIG. 17*b*. The display of transition interval 1764 and 1765 in the effects bar 1760 indicates that the playback curve 1710 of the media clip has been smoothed in accordance with the specified transition intervals.

The section 1762 is at 60% speed, while the sections 1761 and 1763 remain at 100% speed. The section 1761 ends at playback time $t_1$, the section 1762 ends at playback time $t_2$ while the section 1763 ends at playback time $t_3$. The speed effects bar also includes sections for transition intervals 1764 and 1765. The transition interval 1764 is located around (or over) $t_1$ and is between the 100% speed section 1761 and the 60% speed section 1762. The transition interval 1765 is located around (or over) $t_2$ and is between the 60% speed section 1762 and the 100% speed section 1763. As illustrated in the corresponding stage 1721 of FIG. 17*b*, which illustrates the playback curve 1710 before user adjustments, the playback curve 1710 has been smoothed, particularly within the transition intervals 1764 and 1765.

The graphical representations of the transition intervals 1764 and 1765 are transparently superimposed over the effects bar 1760 such that the boundaries between the speed display sections as well as the adjustment handles of each speed section are still visible beneath the transition intervals. In this example, the graphical transition interval 1765 is transparently superimposed over the boundary between the 60% speed section 1762 and the 100% speed section 1763 such that the boundary between the two speed sections is visible and so is the adjustment handle 1772 for the section 1762. As a result, the user is still able to access the adjustment handle 1772 to adjust the speed section 1762.

The second stage 1702 in FIG. 17*a* shows the speed effects bar 1760 at the start of the user adjustment process. The stage 1702 corresponds to the playback curve stage 1722 of FIG. 17*b*. The second stage 1702 also shows a cursor placed over the adjustment handle 1773 of the section 1763 for performing a click and drag operation.

The corresponding playback curve stage 1722 of FIG. 17*b* shows the four keyframes 1711-1714 at playback times 0, $t_1$, $t_2$ and $t_3$. The keyframe 1711 anchors the start of the playback curve, while the keyframe 1714 anchors the end of the playback curve. The keyframes 1712 and 1713 are discontinuity keyframes that mark the change in speed from 100% speed, to 60% speed, and back to 100% speed. The manipulation of an adjustment handle (such as 1773) corresponds to the movement of one of the keyframes (such as 1714) of the playback curve 1710.

The third stage 1723 in FIG. 17*a* shows the user adjustment of speed effect by the click and drag operation. The stage 1703 correspond to the playback curve stage 1723 of FIG. 17*b*. As illustrated, the user has clicked and dragged the adjustment handle 1773 toward the right by using the cursor, which causes the section 1763 to expand from $t_3$ to $t'_3$. The expansion of the section 1763 in playback time, as illustrated in stage 1723 of FIG. 17*b*, causes the keyframe 1714 to move to the right (later in time), which also slows down the playback speed of the section 1763. In this case, the playback speed of the section 1763 slows down to 60% because of the movement of the keyframe 1714.

Since the click and drag operation expand the playback time of the section 1763, some embodiments visually animate the expansion of the section of the media clip under the effects bar section 1763. In some embodiments, the graphical expansion of a speed effect section is accompanied by graphical stretching of thumbnail images in that section. As illustrated, the thumbnails 1751-1753 have been graphically stretched along with the section 1763.

The fourth stage 1704 in FIG. 17*a* shows the media clip after the speed effect adjustment. The stage 1704 correspond to the playback curve stage 1724 of FIG. 17*b*. The playback speed of section 1763 has been reduced to 60% of normal speed. In place of the three stretched thumbnails 1751-1753, there are five new thumbnails 1754-1758 that display a sequence of images corresponding to the new 60% playback speed. Since the section 1763 is now at the same playback speed as the section 1764, some embodiments merge the two sections as one single section 1766 that starts from the playback time $t_1$ to the playback time $t_3'$ at playback speed 60%. Consequently, the discontinuity keyframe 1713 is deleted and so is the transition interval 1765. Since the speed discontinuity at $t_1$ remains, the discontinuity keyframe 1712 remains (though not shown), and the transition interval 1764 also remains.

In some embodiments, the start and end of transition intervals would not change after a user adjustment of a section of the media clip. In some embodiments, the user adjustment of a speed section triggers an automatic adjustment of the start and end of the transition intervals, because some embodiments determine initial start and end of the transition intervals based on the durations of the adjoining speed sections as discussed above by reference to FIG. 14.

Some of these embodiments perform a new curve smoothing operation that is constrained by the adjusted transition intervals and the adjusted speed sections. In this example, for embodiments that automatically adjust the start and end of transition intervals based on the duration of adjoining speed sections, a new curve smoothing operation will be performed based on the new duration of the transition interval 1764. However, since the speed sections adjoining the transition interval 1764 have not changed speed (the playback section 1761 is still at 100% and the playback section 1766 is still at 60%), some embodiments will not perform a new curve smoothing operation if the start and end of the transition interval 1764 does not change.

Figure 18A:
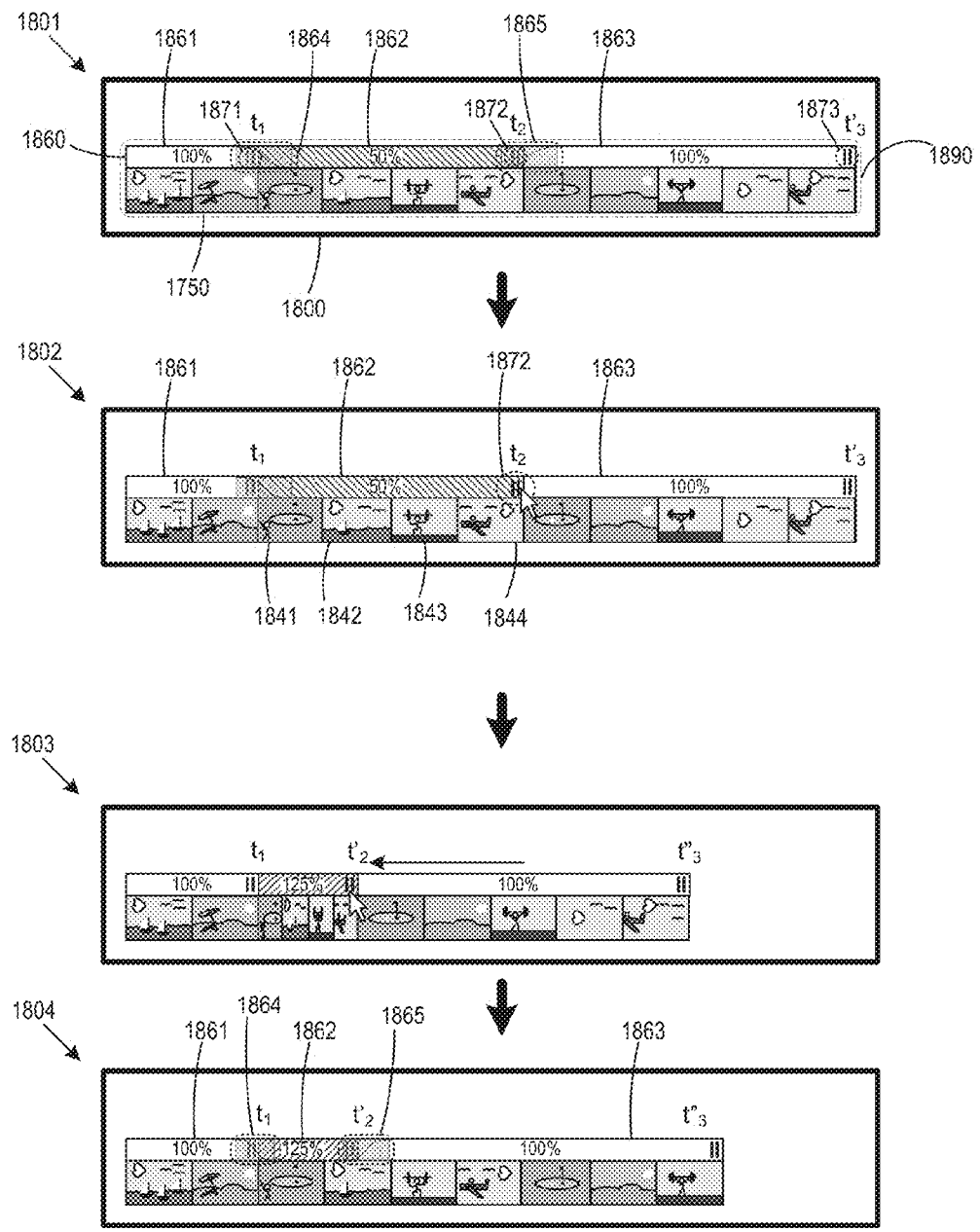
FIGS. 18a-b illustrates an example of a user adjustment of speed effect that shrinks a section of the effects bar.
Figure 18B:
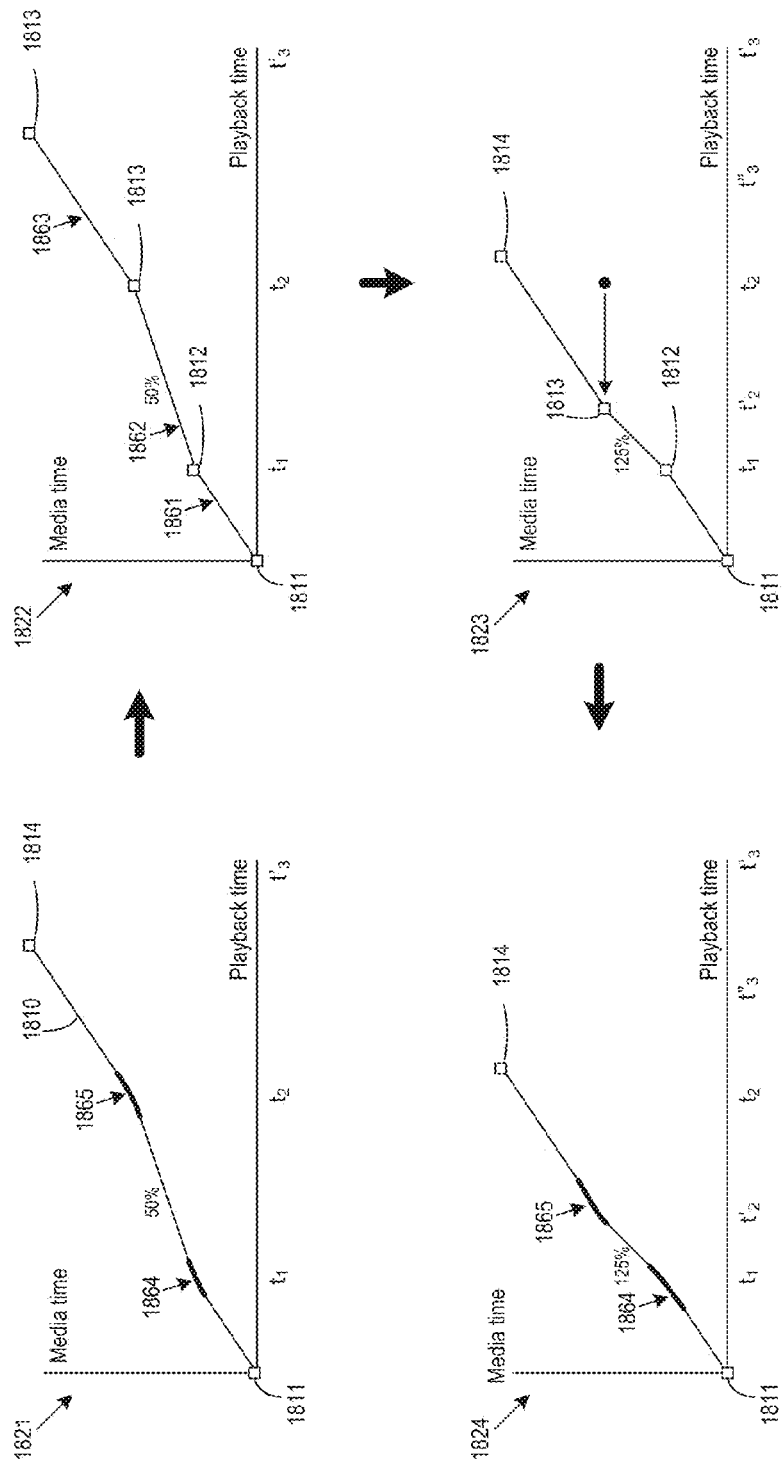

FIG. 17*a-b* illustrates an example of a user adjustment of speed effects that expands a section of the effects bar (and the playback curve). FIGS. 18*a-b*, on the other hand, illustrates an example of a user adjustment of speed effect that shrinks a section of the effects bar.

FIG. 18*a* illustrates a timeline 1800 that is similar to the timeline 1700. Within the timeline 1800 is a representation of a media clip (or a media container) 1850. The representation of the media clip 1850 displays a series of thumbnail images sampled at regular intervals of the playback time from the images in the media clip 1850. The media clip 1850 also displays an effects bar 1860 that indicates the playback speed of the media content in the media container. The effects bar is partitioned into three sections 1861-1863 by one or more previous preset speed effect operations such as the "slower" operation discussed earlier by reference to FIGS. 4-5. Each section of the effect bar 1860 displays the playback speed of that section. Each section also includes an adjustment handle. Specifically, the section 1861 has an adjustment handle 1871, the section 1862 has an adjustment handle 1872, and the section 1863 has an adjustment handle 1873.

FIG. 18*a* illustrates the example speed effect adjustment operation by user manipulation in four stages 1801-1804 of the timeline 1800. FIG. 18*a* will be described by reference to FIG. 18*b*, which illustrates corresponding stages 1821-1824 of a playback curve 1810 for the media clip.

The first stage 1801 in FIG. 18*a* shows the media clip 1850 and the speed effects bar 1860 before user adjustment of speed effect. The stage 1801 corresponds to the playback curve stage 1821 of FIG. 18*b*, which illustrates the playback curve 1810 before user adjustments. The display of transition interval 1864 and 1865 in the effects bar 1860 indicates that the playback curve 1810 of the media clip has been smoothed in accordance with the specified transition intervals.

The section 1862 is at 50% speed while sections 1861 and 1863 remain at 100% speed. The section 1861 ends at playback time $t_1$, the section 1862 ends at playback time $t_2$ while the section 1863 ends at playback time $t_3$. The speed effects bar also includes sections for transition intervals 1864 and 1865. The transition interval 1864 is located around (or over) $t_1$ and is between the 100% speed section 1861 and the 50% speed section 1862. The transition interval 1865 is located around (or over) $t_2$ and is between the 50% speed section 1862 and the 100% speed section 1863. As illustrated in corresponding stage 1821 of FIG. 18*b*, the playback curve 1810 has been smoothed, particularly within the transition intervals 1864 and 1865.

The graphical representations of the transition intervals 1864 and 1865 are transparently superimposed over the effects bar 1860 such that the boundaries between the speed display sections as well as the adjustment handles of each speed section are still visible beneath the transition intervals. For example, the transition interval 1865 is transparently superimposed over the boundary between the 50% speed section 1862 and the 100% speed section 1863 such that the boundary between the two speed sections is visible and so is the adjustment handle 1872 for the section 1862. As a result, the user is still able to access the adjustment handle 1872 to adjust the speed section 1862.

The second stage 1802 in FIG. 18*a* shows the speed effects bar 1860 at the start of the user adjustment process. The stage 1802 corresponds to the playback curve stage 1822 of FIG. 18*b*. The second stage 1802 also shows a cursor placed over the handle 1872 of the section 1862 for performing a click and drag operation. As mentioned above, even though the handle 1872 and the right boundary of the sections 1862 are both beneath the representation of the transition interval 1865, the user can still access the handle 1872 for adjusting the section 1862.

The corresponding playback curve stage 1822 of FIG. 18*b* shows the four keyframes 1811-1814 at playback times 0, $t_1$, $t_2$ and $t_3$. The keyframes 1812 and 1813 are discontinuity keyframes that mark the change in speed from 100% speed, to 50% speed, and back to 100% speed. The keyframe 1811 anchors the start of the playback curve, while the keyframe 1814 anchors the end of the playback curve. The adjustment of a handle (such as 1872) corresponds to the movement of one of the keyframes (such as 1813) of the playback curve 1810.

The third stage 1823 in FIG. 18*a* shows the user adjustment of speed effect by the click and drag operation. The stage 1803 correspond to the playback curve stage 1823 of FIG. 18*b*. As illustrated, the user has clicked and dragged the adjustment handle 1872 toward the left, which causes the section 1862 to shrink from $t_2$ to $t'_2$. The shrinking of the section 1862 in playback time, as illustrated in stage 1823 of FIG. 18*b*, causes the keyframe 1813 to move to the left (earlier in time), which also accelerates the playback speed of the section 1862. In this case, the playback speed of the section 1862 accelerates to 125% because of the movement of the keyframe 1813 from user's click and drag operation.

Since the user has used the handle 1872 to shrink the playback time of the section 1862, some embodiments visually animate the compression of the section of the media clip under the effects bar section 1862. In some embodiments, the graphical expansion of a speed effect section is accompanied by graphical compression of thumbnail images in that section. As illustrated, the thumbnails 1841-1844 have been graphically compressed along with the section 1862.

The fourth stage 1804 in FIG. 18*a* shows the media clip after the speed effect adjustment. The stage 1804 corresponds to the playback curve stage 1824 of FIG. 18*b*. The playback speed of section 1862 has been increased to 125% of normal speed. In place of the four compressed thumbnails 1841-1844, the media clip has been resampled to generate a set of new thumbnails that display a sequence of images corresponding to the new 125% playback speed.

Since the user adjustment operation of the section 1862 from 50% speed to 125% speed has not caused the speed section 1862 to be at the same speed with its adjacent neighboring sections (1861 and 1863), the discontinuity keyframes 1812 and 1813 would not be deleted. In some embodiments, the start and end of the transition intervals would not change after a user adjustment of another section of the media clip. In some embodiments, the user adjustment of the speed sections triggers an automatic adjustment of the start and end of the transition intervals (because some embodiments determines initial start and end of the transition intervals based on the durations of the adjoining speed sections as discussed above by reference to FIG. 14.)

Some of these embodiments then perform a new curve smoothing operation that is constrained by the adjusted transition intervals and the adjusted speed sections. In this example, the playback curve within the transition intervals 1864 and 1865 will have to be smoothed again based on (i) the new playback speeds of the adjoining speed sections 1861-1863, and (ii) the updated start and end of the transition intervals 1864 and 1865, which in some embodiments changes according to the durations of the adjoining speed sections.

In the examples of FIGS. 17-18, the transition intervals are illustrated as being transparently superimposed over the effects bar such that the boundaries of the speed sections are still visible to the user and the user still have the access to the adjustment handles of each speed sections. One of ordinary skill would realize that are many other possible ways of graphically representing transition intervals in the effects bar that allows the user to discern the boundaries of speed sections as well as to adjust the speed sections for performing retiming operations. For example, in some embodiments, the transition intervals are not transparent and the true boundaries between the different speed sections are not immediately visible to the user (such in the effects bar 160 of FIG. 1). However, the user in some embodiments can select an adjustment UI item for opening a contextual menu item that provide user access to the true boundaries of the different speed sections. Or alternatively, the selection of the adjustment UI item would bring the true boundaries between the different speed sections to the foreground over the transition intervals so to allow the user to adjust each speed effect section at the sections' true boundaries.

Figure 19A:
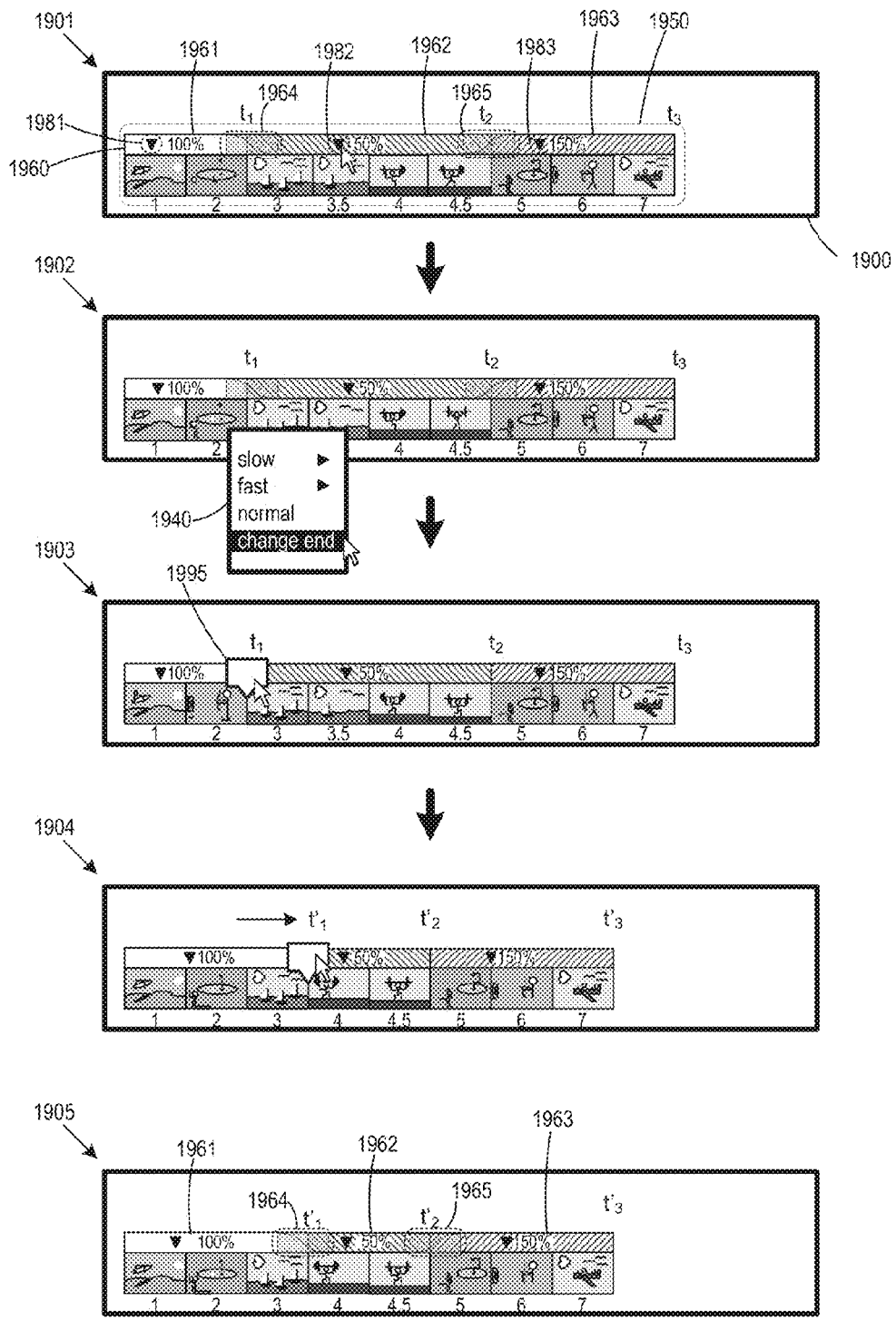
FIGS. 19a-b illustrates an example range adjustment operation of a media clip that has been partitioned by an earlier preset retiming operation.
Figure 19B:
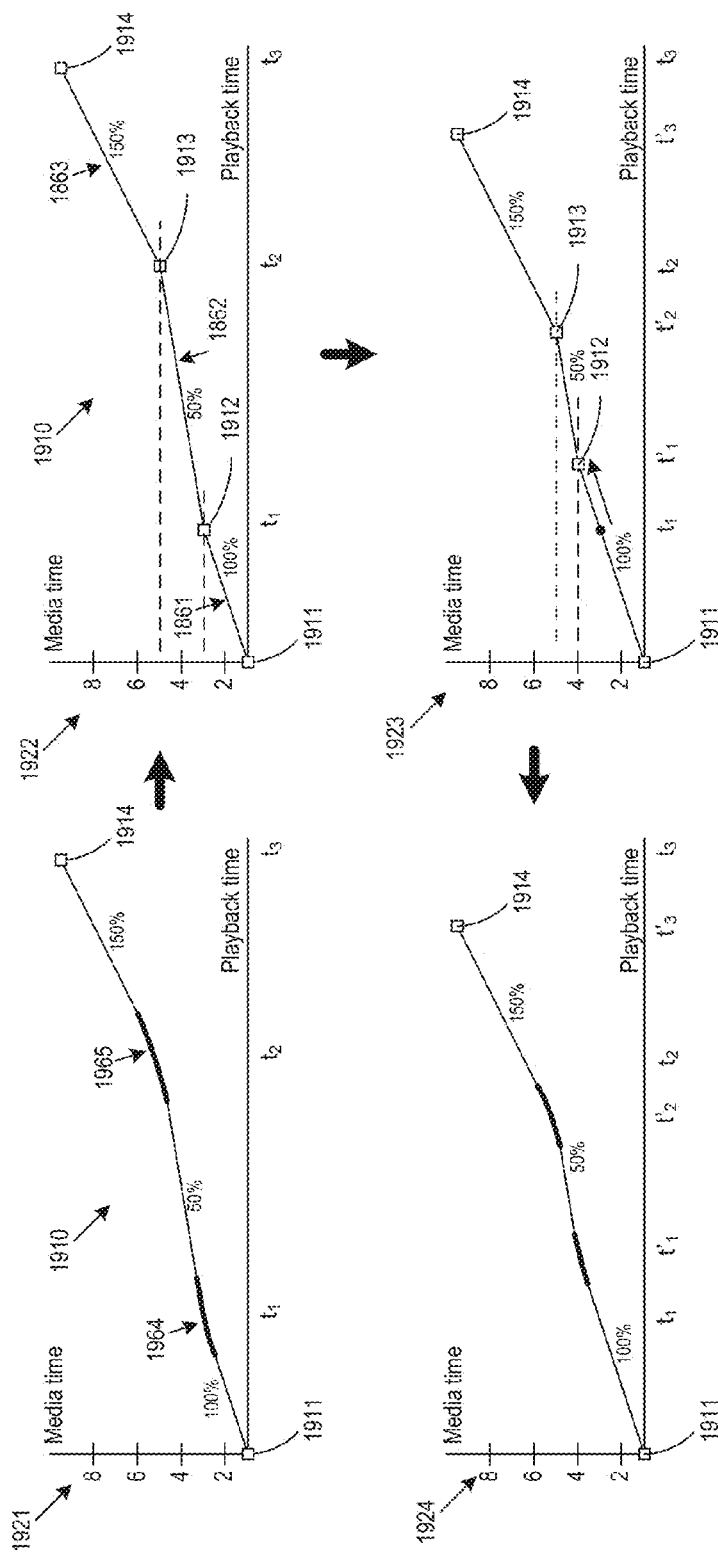

In addition to adjusting playback speed of individual sections of the effects bar of a media clip, a user can also adjust the range of each individual section. FIGS. 19a-b illustrate an example range adjustment operation of a media clip that has been partitioned by an earlier preset retiming operation.

FIG. 19a illustrates a timeline 1900 of a GUI that is similar to the GUI 400 of a media editing application. Within the timeline 1900 is a representation of a media clip (or media container) 1950. The representation of the media clip 1950 displays a series of thumbnail images sampled at regular intervals of the playback time from the media clip 1950. The representation of the media clip 1950 also displays an effects bar 1960 that indicates the playback speed of the media content in the media container. The effects bar is partitioned into three sections 1961-1963 by one or more previous preset speed effect operations such as the "slower" or "faster" retiming operations discussed earlier by reference to FIGS. 4-5. In addition to displaying the playback speed, each of the speed effect bar sections 1961-1963 also includes an adjustment UI item (UI items 1981-1983 for the sections 1961-1963 respectively). Each of the adjustment UI items is for opening a contextual menu item.

FIG. 19a illustrates the example range adjustment operation by user manipulation in five stages 1901-1905. FIG. 19a will be described by reference to FIG. 19b, which illustrates corresponding stages 1921-1924 of a playback curve 1910 for the media clip 1950.

The first stage 1901 shows the media clip 1950 before the user range adjustment. The stage 1901 corresponds to the playback curve stage 1921 of FIG. 19b. The effects bar 1960 shows that the section 1961 is at 100% speed, the section 1962 is at 50% speed, and the section 1963 is at 150% of normal speed. The section 1961 ends at playback time $t_1$, the section 1962 ends at playback time $t_2$ while the section 1963 ends at playback time $t_3$. The speed effects bar 1960 also displays transition intervals 1964 and 1965. The transition interval 1964 is located around (or over) $t_1$ and is between the 100% speed section 1961 and the 50% speed section 1962. The transition interval 1965 is located around (or over) $t_2$ and is between the 50% speed section 1962 and the 150% speed section 1963. The stage 1901 also shows a cursor being placed over an adjustment UI item 1982 in the effects bar section 1962 to allow user adjustment of speed effects. As illustrated in corresponding playback curve stage 1921 of FIG. 19b, which illustrates the playback curve 1910 before user adjustments, the playback curve 1910 has been smoothed, particularly within the transition intervals 1964 and 1965.

The second stage 1902 in FIG. 19a shows the speed effects bar 1960 at the start of the user adjustment process. The stage 1902 corresponds to the playback curve stage 1922 of FIG. 19b. As illustrated, the user has selected the adjustment UI item 1982, which opens up a contextual menu 1940 that allows user access to other commands that are available for adjusting the section 1962. As illustrated, the contextual menu 1940 includes commands such as "slow", "fast", "normal" and "change end" that are specific to the section 1961. The command "slow" slows the playback speed of the section 1961. The command "faster" accelerates the playback speed of the section 1961. The command "normal" reset the playback speed of the section 1961 to 100% of normal speed. One of ordinary skill in the art would recognize that these commands are similar to the preset "slower" and "faster" operations as illustrate above by reference to FIGS. 4-5. However, unlike the preset commands which apply to a selected range as discussed above in section I, these contextual commands apply only to the specific section from which the contextual command is invoked. The "change end" command is also a contextual command applicable only to the section 1961. It changes the position of the end of the section 1961 and the start of the section 1962 in media time. In other words, the "change end" command shifts the border between the sections 1961 and 1962 such that some media content that were once in section 1962 becomes part of the section 1961 (or vice versa).

The different speed sections of the media clip 1950 are anchored by keyframes on the playback curve 1910. As illustrated in the corresponding stage 1922 of FIG. 19b, there are four such keyframes 1911-1914 for the playback curve 1910. The keyframes 1912 and 1913 are discontinuity keyframes that mark the change in speed from 100% speed to 50% speed at times $t_1$, and from 50% speed to 150% speed at time $t_2$. The keyframe 1911 anchors the start of the playback curve 1910 at time 0, while the keyframe 1914 anchors the end of the playback curve 1910 at times $t_3$.

The third stage 1903 shows the appearance of a "change end" tool UI item 1995 after the invocation of the "change end command". The "change end" tool UI item 1995 is situated at the border (at $t_1$) between the sections 1961 and 1962 so the user can manipulate the UI item 1995 to shift the border between the two sections. In some embodiments, the UI item 1995 includes a miniature preview display area for displaying a video image that is being pointed to by the UI item 1995. This is so the user can precisely place the border by observing the content being pointed to by the UI item 1995. In some embodiments, the GUI includes a separate preview display area for displaying a video image that is being pointed to by the UI item 1995 (such as the preview display area 420 of GUI 400 in FIG. 4). The third stage 1903 also shows the cursor 1990 placed over the "change end" tool UI item 1995 and ready to perform a range adjustment operation.

The fourth stage 1904 shows the effect of the manipulation of the "change end" tool UI item 1995. The stage 1904 corresponds to the playback curve stage 1923 of FIG. 19*b*. As illustrated, the user has dragged the UI item 1995 from $t_1$ to $t'_1$, which correspond to a movement of the keyframe 1912 to the right (later in time). Unlike the adjustment for speed in which a keyframe moves horizontally to change the slope of one of the sections and thereby changing its speed, the keyframe 1912 here moves along the existing playback curve so to preserve the playback speed of each of the sections.

However, since the section 1961 has a different playback speed (100%) than the section 1962 (50%), the shift of the border between the section 1961 and the section 1962 made by the "change end" operation causes all media content after $t'_1$ to shift. Consequently, the keyframe 1912 has shifted from $t_1$ to $t'_1$ by extending the 100% speed section (section 1961), which in turn causes the 50% section of the playback curve 1910 to start later at $t'_1$. The end of the 50% section (section 1962) must still end at the same media time as before (i.e., 5), which occurs at an earlier playback time $t'_2$, causing the 150% section (section 1963) and the keyframes 1913 and 1914 to shift earlier in playback time (from $t_2$ and $t_3$ to $t'_2$ and $t'_3$, respectively).

The fifth and final stage 1905 in FIG. 19*a* shows the curve smoothing operation after the range adjustment operation. The stage 1905 corresponds to the playback curve stage 1924 of FIG. 19*b*. The effects bar 1960 once again shows the transition intervals 1964 and 1965. Since the range adjustment operation does not actually change playback speeds but instead changes only the range and duration of individual sections, some embodiments would not perform a new curve smoothing operation unless the start and the end of the transition intervals have also changed. In some embodiments, the start and end of the transition intervals would not change after a user adjustment of another section of the media clip. In some embodiments, the user adjustment of the speed sections triggers an automatic adjustment of the start and end of the transition intervals (because some embodiments determines initial start and end of the transition intervals based on the durations of the adjoining speed sections as discussed above by reference to FIG. 14.)

FIGS. 19*a-b* illustrates an example range adjustment operation by invoking a command that adjusts the end of a particular section of a media clip (or the media clip's effects bar) thus shifting the border between the particular section and an immediately subsequent sections. One of ordinary skill in the art would recognize that such a command is functionally equivalent to a command that changes the start of the particular section, which adjusts the border between the particular section and an immediately preceding section. Some of these embodiments include both "change end" and "change start" commands in the contextual menu of the section.

Figure 20:
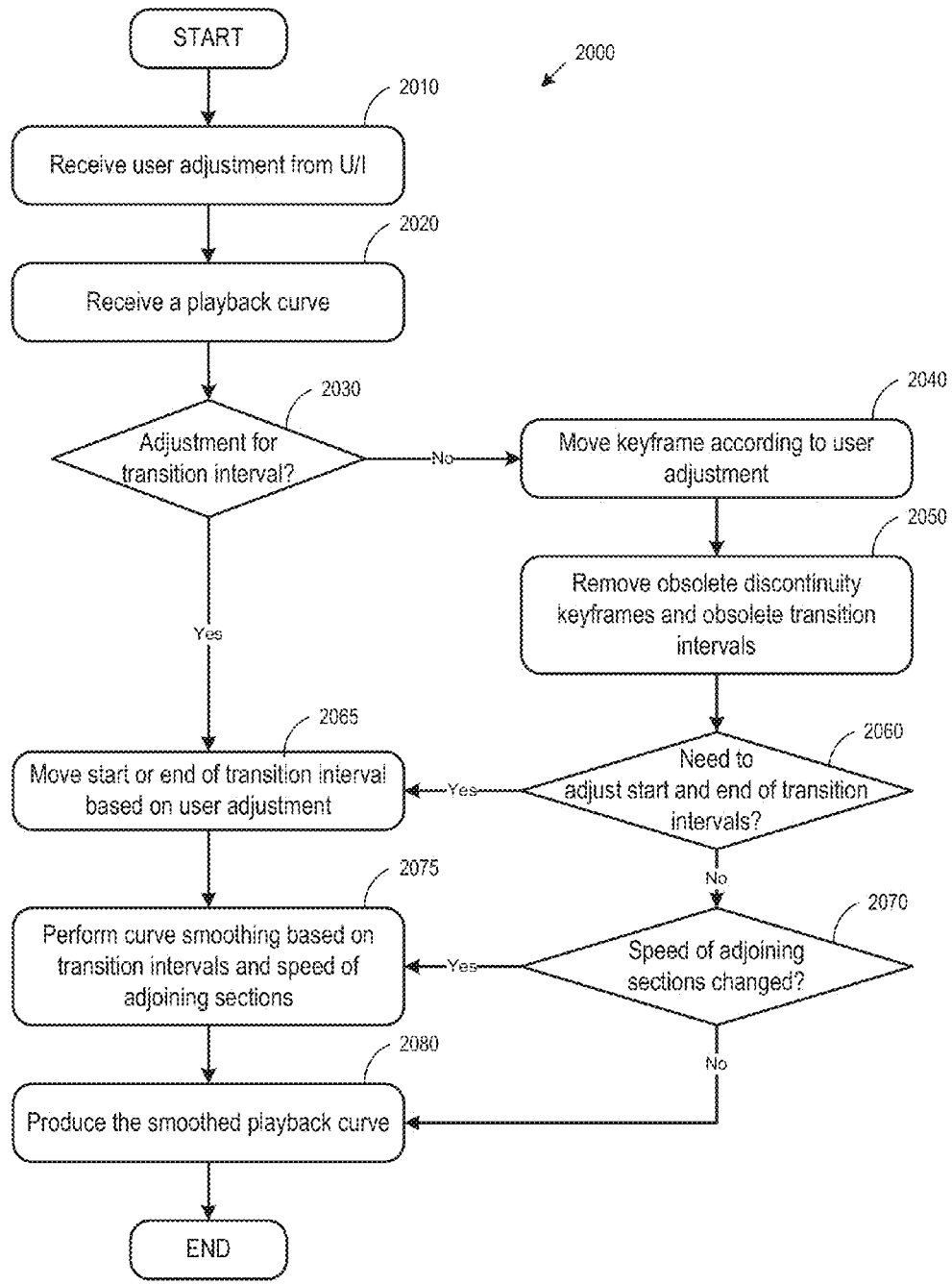
FIG. 20 conceptually illustrates a process for performing a user adjustment of the media clip.

For some embodiments of the invention, FIG. 20 conceptually illustrates a process 2000 for performing a user adjustment of the media clip. The process 2000 also performs a curve smoothing operation after the user adjustment has been made. The process 2000 starts after the media editing application has performed a retiming operation that partitions the media clip into two or more sections with different playback speeds.

The process receives (at 2010) a specification for the user adjustment. The specification of the adjustment can be a user manipulation in a GUI that changes the playback speed of a particular section of media clip as discussed above by reference to FIGS. 17-18, a user manipulation that changes the range of a particular section of the media clip as discussed above by reference to FIGS. 19*a-b*, or a user manipulation that changes the start and/or the end of a transition interval as discussed above by reference to FIGS. 1-2.

Next, the process receives (at 2020) the playback curve of the media clip. This playback curve is the result of previous retiming operations, which can include both present retiming operations and user adjustment operations. In some embodiments, a playback curve includes specifications for start and end of the media clip, as well as one or more keyframes that mark the borders between different sections. In some embodiments, the playback curve also includes specifications for transition intervals. These transition intervals are used to generate smoothed curves when the media clip is being played back according to the playback curve. In some embodiments, the playback curve is retrieved from storage, which stores the playback curve in data structures that will be further discussed by reference to FIG. 24 below.

The process next determines (at 2030) whether the adjustment is for a transition interval or for a section of the media clip that has a specified playback speed. For example, section 1962 is a section of the media clip that has a specified playback speed of 50%, while the section 1964 is a transition interval between playback speeds of 100% and 50%. If the adjustment is for a section of the media clip with a specified playback speed such as described above by reference to FIGS. 17-19, the process proceeds to 2040. If the adjustment is for a transition interval as described above by reference to FIGS. 1-2, the process proceeds to 2065.

At 2040, the process moves key frames according to the received user adjustment. In some embodiments, the adjustment of a playback curve is accomplished by moving keyframes that anchors the start and/or end of different sections of the media clip to different positions in the media time/playback time space. FIGS. 17*b* and 18*b* above illustrates the movement of keyframes when adjusting the playback speed of a section of the media clip, while FIG. 19*b* above illustrates the movement of keyframes when adjusting the range of a section of the media clip.

The process next removes (at 2050) obsolete discontinuity keyframes and transition intervals. As discussed above by reference to FIGS. 17*a-b*, user adjustment of the playback curve can sometimes cause the playback speed of adjacent sections divided by a discontinuity keyframe to become the same. In these instances, the speed discontinuity marked by the discontinuity keyframe no longer exists, and the discontinuity keyframe is no longer necessary. Some embodiments hence remove the unnecessary discontinuity keyframes. Since each transition interval is associated with a discontinuity in some embodiments, a transition interval that is associated with a removed discontinuity is also removed from the playback curve.

The process next determines (at 2060) whether the user adjustment of the media clip makes it is necessary to adjust the start and end of transition intervals. In some embodiments, the automatic setting of the start and end of a transition interval takes place only when the transition interval is first created. All subsequent adjustment of the transition interval is done by the user, even if the duration and/or the playback speed of the sections before and after the discontinuity has been changed by the user. On the other hand, some embodiments do perform automatic adjustment of transition intervals after each user adjustment. As mentioned earlier, in some embodiments, the start and end of the transition intervals are initially set according to the duration of the sections before and after the discontinuity. Some of these embodiments would reset the start and end of the transition intervals based on the new durations of the sections adjoining the discontinuity (e.g., by setting the start (and end) of the transition interval to a particular fraction of the duration of the section before (and after) the discontinuity.) If the process 2000 determines that it is not necessary to adjust start and end of transition intervals (e.g., because the duration of adjoining section has not changed), the process proceeds to 2070. Otherwise, the process proceeds to 2065 to move the start and end of the transition interval.

At 2065, the process 2000 moves the start and the end of the transition interval. The new destination of the start and end of the transition interval can be directly specified by the user as described above by reference to FIGS. 1-2. The new destination can also be specified by the process 2000, which in some embodiments specifies new positions for the start and end for the transition interval based on changes that were made to the sections before and after the discontinuity. Having moved the start and end of the transition interval, the process proceeds to 2075 to perform curve smoothing based on the transition interval.

At 2070, the process determines whether the playback speeds before and after the discontinuity has changed. Since the smoothed curve is constrained by the transition intervals as well as by the playback speeds of section adjoining the discontinuity, the process 2000 will have to perform new curve smoothing operation if any of these constraints has changed. Therefore, if the playback speed of the adjoining sections has been altered by the user adjustment, the process proceeds to 2075 to create a new smoothed curve that fits the new constraints. Otherwise, the process proceeds to 2080 to produce the smoothed playback curve.

At 2075, the process performs the curve smoothing operation to create a new smoothed curve for the transition interval. The new curve is constrained by the keyframes anchoring the start and end of transition intervals. The new curve is also constrained by the playback speed of the section before and after the discontinuity. After creating the smoothed curve for the transition interval, the process proceeds to 2080.

The process produces (at 2080) the smoothed playback curve for either storage or playback. For storage, the process 2000 in some embodiments stores the playback curve according to a data structure described below by reference to FIG. 24. After producing the smoothed playback curve, the process 2000 ends.

IV. Mapping of Playback Curves

A. Interpolation

The playback curves as discussed above in Sections I-III map instants in playback time to instants in media time. In some embodiments, the mapped media time is then used to fetch a frame from the source media clip. However, not all media time instants mapped by the playback curve has a video frame that is specified to be displayed at that precise moment. For example, a playback curve may specify a media time that is temporally half way between two video frames in the original media clip. In these instances, it can be unclear as to which video frame should the media editing application fetch for display. In such cases, some embodiments produce an interpolated frame based on other frames in the video clip that are in the vicinity of the media time.

Figure 21:
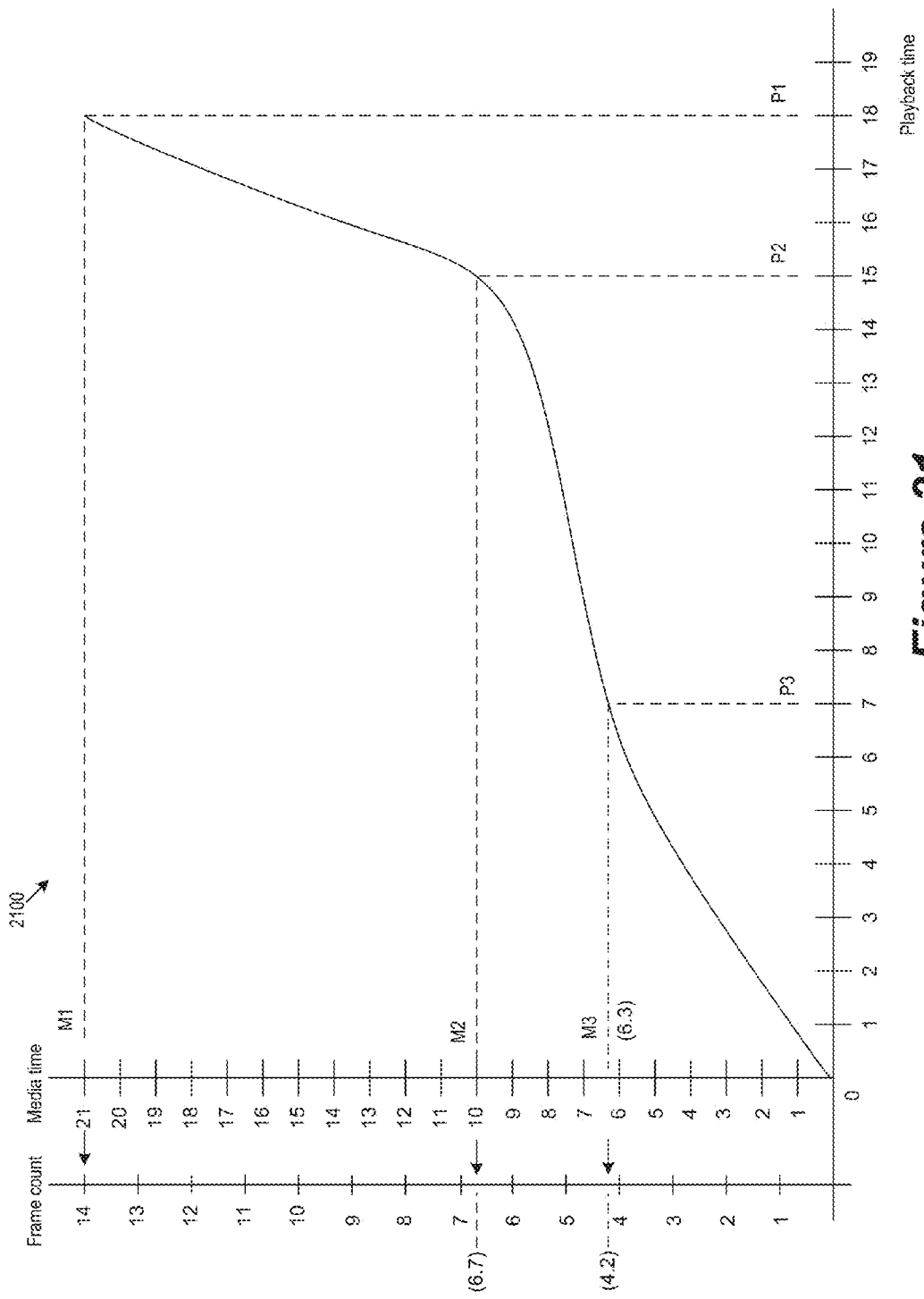
FIG. 21 illustrates the mapping of a playback curve from playback time to media time and then to actual video frames in the source of the media content.

For some embodiments, FIG. 21 illustrates the mapping of a playback curve from playback time to media time and then to actual video frames in the source of the media content. FIG. 21 illustrates an example playback curve 2100 that maps playback time (x-axis) to media time (y-axis). FIG. 21 also illustrates frame count scale 2110 that shows the mapping from media time to an actual video frame in a source media clip. In some embodiments, each integer unit of playback time corresponds to one playback video frame, such that the playback time N corresponds to the Nth playback video frame.

As illustrated, the playback curve 2100 maps the playback time instant P1 (at playback time 18 or playback video frame 18) to the media time instant M1 (media time 21), which precisely or very nearly maps to frame count 14 on the frame count scale 2110. Not all playback video frames (or integer playback times) map precisely onto an actual video frame in the source media clip. For example, the playback time instant P2 (at playback time 15) maps to media time instant M2 (media time 10) and then to a position 6.7 in the frame count scale 2100 that is positioned between source video frames 6 and 7. Likewise the playback time instant P3 (at playback time 7) maps to media time instant M3 (media time 6.3), which maps to a position 4.2 in the frame count scale 2100 which is positioned between the source video frame 4 and 5.

In some embodiments, a playback time instant that maps to a media time instant sufficiently close to an actual video frame (on the frame count scale) does not require an interpolated frame. In some of these embodiments, the difference in media time between the position of the actual video frame and the mapped playback position is compared against a threshold. If the difference is within such a threshold, interpolation will not be performed and the actual video frame (the nearest frame to the mapped playback position) is fetched directly for playback.

For a playback time instant that does not map to a media time instant sufficiently close to an actual video frame, some embodiments generate an interpolated frame. In some other embodiments, interpolation is always performed, even if a playback time instant maps exactly on to an actual video frame in the source media content.

Some embodiments perform interpolation by using the nearest neighboring video frame in the source media content as the interpolated frame. For example, for playback frame 7 (P3) that maps on to position 4.2 in the frame count scale (M3), the actual frame 4 in the source media content will be used as the interpolated frame and be displayed during playback.

Some embodiments perform interpolation by blending video frames. In some of these embodiments, frames neighboring the mapped playback position are blended together to produce the interpolated frame. In some embodiments, frame blending is performed by applying a weighting factor to each of the blended source frames according to the temporal distance between the blended source frame and the mapped playback position. In the example of FIG. 21, for playback frame 15 (P2) that maps to position 6.7, some embodiments produce the interpolated frame by blending source frames 6 and 7 and by applying a weighting factor of 0.7 to frame 7 and a weighting factor of 0.3 to frame 6.

Some embodiments perform interpolation by optical flow. Optic flow is the pattern of apparent motion of objects, surfaces, and edges in a visual scene caused by the relative motion between an observer (an eye or a camera) and the scene. Sequences of ordered images allow the estimation of motion as either instantaneous image velocities or discrete image displacements. Some embodiments create the interpolated frame by estimating motions of pixels using ordered images of frames neighboring the mapped playback position.

Figure 22:
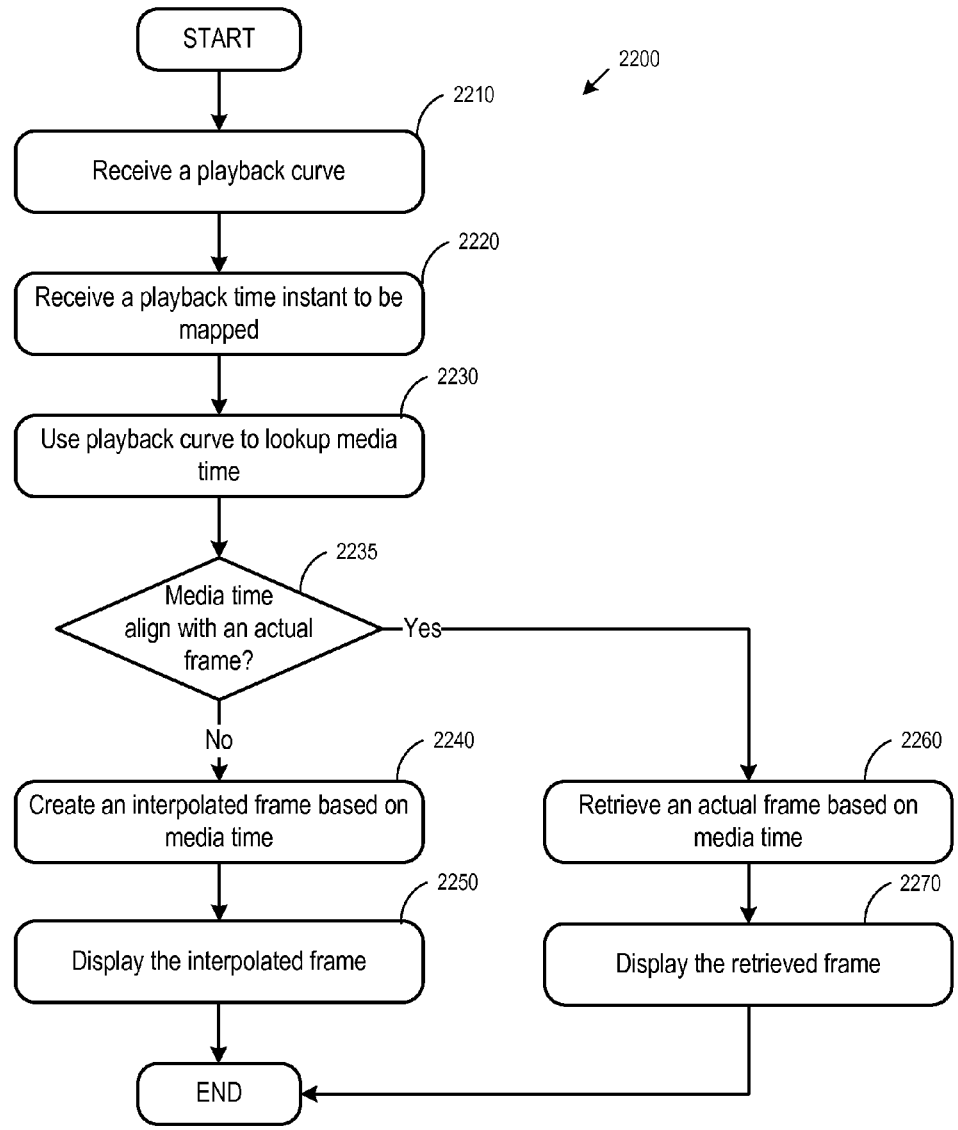
FIG. 22 conceptually illustrates a process for mapping playback times to actual or interpolated video frames.

For some embodiments, FIG. 22 conceptually illustrates a process 2200 for mapping playback times to actual or interpolated video frames. The process receives (at 2210) a playback curve associated with a media clip that maps instants of playback time to instants in media time. The process next receives (at 2220) a playback time instant to be mapped. In some embodiments, the process 2200 receives such a playback time instant whenever a video frame needs to be fetched from a source media clip, such as when the GUI 400 of FIG. 4 is producing a preview image on the preview display area 420, or when the GUI 400 of FIG. 4 is producing a thumbnail image in a media clip, or when the media editing application is directed by the user to output the product of the composite presentation being constructed in the timeline of the GUI.

The process 2200 next uses (at 2230) the playback curve to look up a media time that corresponds to the received playback time. The process determines (at 2235) whether the media time is sufficiently aligned with an actual frame. If the media time being looked up is sufficiently aligned with an actual frame, the process 2200 proceeds to 2260 to retrieve the actual frame for display. Otherwise the process proceeds to 2240. In some embodiments, the process always proceeds to 2240 and create an interpolated frame regardless of whether the media time is sufficiently aligned with the actual frame.

At 2240, the process creates an interpolated frame based on the media time. The mapping (or look up) of media time and the creation of interpolated frame are described above by reference to FIG. 21. After creating the interpolated frame, the process displays (at 2250) or delivers the interpolated frame. After delivering or displaying the interpolated frame, the process 2200 ends.

At 2260, the process retrieves an actual frame based on the mapped media time. The process 2200 then displays (at 2270) or deliver the retrieved frame. After displaying or delivering the retrieved frame, the process 2200 ends.

B. Audio Mapping

In some embodiments, each speed effect or retiming operation performed on video content is accompanied by a corresponding speed effect or retiming operation on audio content. A preset retiming operation performed on a selected section of a media clip applies to both video and audio of the selected section of the media clip. In some embodiments that use a same playback curve for both audio and video, every alteration or adjustment to the playback curve (such as retiming or curve smoothing) applies to both video and audio in order to keep audio and video in sync. Each playback time instant is mapped to a media time instant using the playback curve for both video and audio. The slope of the playback curve at each of the playback time instants is used to determine the instantaneous audio playback speed.

In some embodiments, retiming operation affects the playback speed of audio but not the pitch of audio. Some embodiments use common audio pitch preservation techniques to ensure that changes in playback speed would not affect the pitch of audio during playback.

V. Software Architecture

Figure 23:
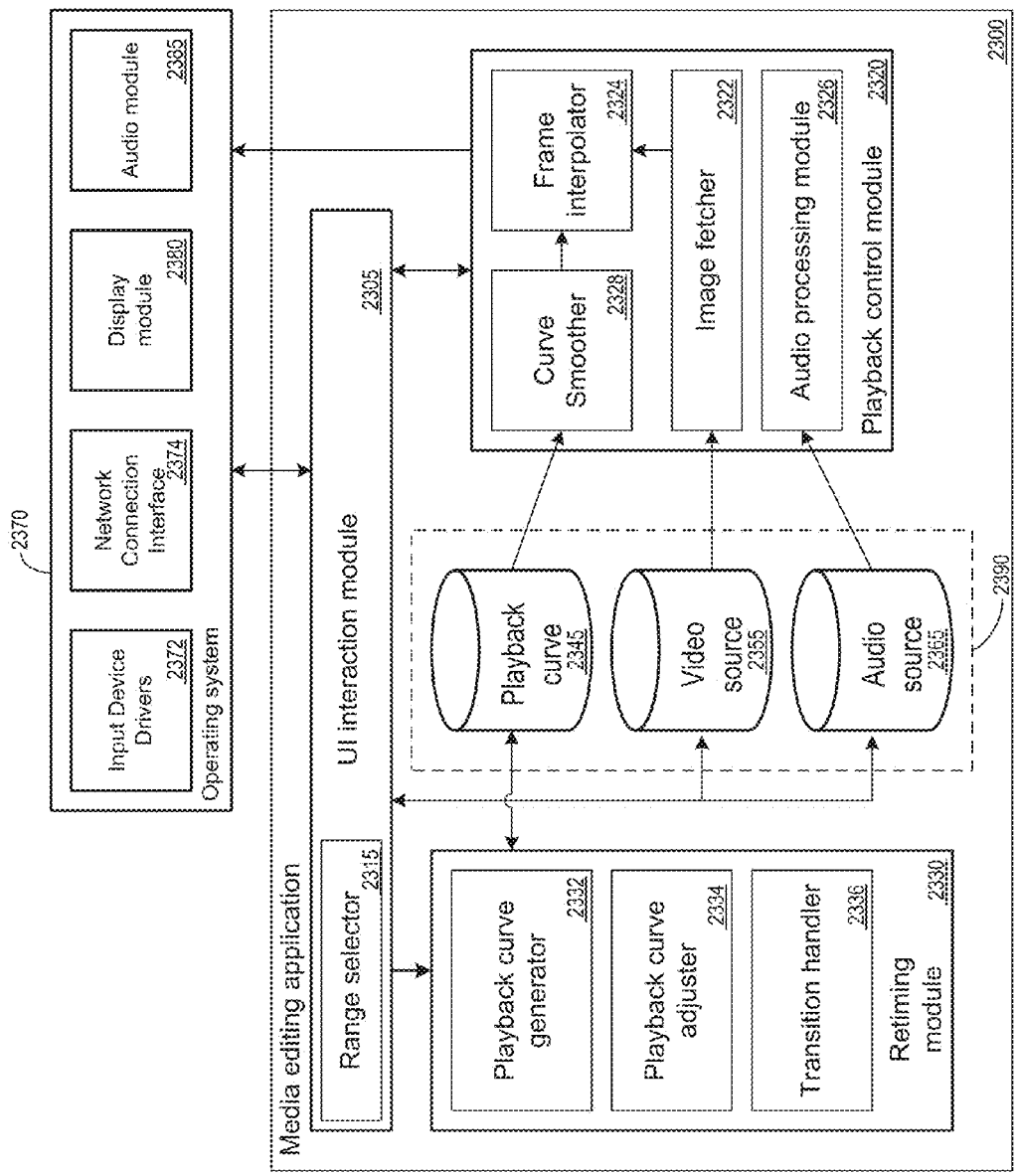
FIG. 23 conceptually illustrates the software architecture of a media editing application of some embodiments.

In some embodiments, the processes described above are implemented as software running on a particular machine, such as a computer or a handheld device, or stored in a computer readable medium. FIG. 23 conceptually illustrates the software architecture of a media editing application 2300 of some embodiments. In some embodiments, the media editing application is a stand-alone application or is integrated into another application, while in other embodiments the application might be implemented within an operating system. Furthermore, in some embodiments, the application is provided as part of a server-based solution. In some of these embodiments, the application is provided via a thin client. That is, the application runs on a server while a user interacts with the application via a separate machine that is remote from the server. In other such embodiments, the application is provided via a thick client. That is, the application is distributed from the server to the client machine and runs on the client machine.

The media editing application 2300 includes a user interface (UI) interaction module 2305, a retiming module 2330, and a playback control module 2320. The media editing application 2300 also includes playback curve storage 2345, video source storage 2355, and audio source storage 2365. In some embodiments, storages 2345, 2355, and 2365 are all stored in one physical storage 2390. In other embodiments, the storages are in separate physical storages, or two of the storages are in one physical storage, while the third storage is in a different physical storage. For instance, the video source storage 2355 and the audio source storage 2365 will often not be separated in different physical storages.

FIG. 23 also illustrates an operating system 2370 that includes input device driver(s) 2372, a network connection interface(s) 2374, a display module 2380 and an audio module 2385. In some embodiments, as illustrated, the input device drivers 2372, the network connection interfaces 2374, the display module 2380 and the audio module 2385 are part of the operating system 2370, even when the media editing application 2300 is an application separate from the operating system.

The input device drivers 2372 may include drivers for translating signals from a keyboard, mouse, touchpad, drawing tablet, touchscreen, etc. A user interacts with one or more of these input devices, which send signals to their corresponding device driver. The device driver then translates the signals into user input data that is provided to the UI interaction module 2305.

The media editing application 2300 of some embodiments includes a graphical user interface that provides users with numerous ways to perform different sets of operations and functionalities. In some embodiments, these operations and functionalities are performed based on different commands that are received from users through different input devices (e.g., keyboard, trackpad, touchpad, mouse, etc.). For example, the present application illustrates the use of a cursor in the graphical user interface to control (e.g., select, move) objects in the graphical user interface. However, in some embodiments, objects in the graphical user interface can also be controlled or manipulated through other controls, such as touch control. In some embodiments, touch control is implemented through an input device that can detect the presence and location of touch on a display of the input device. An example of a device with such functionality is a touch screen device (e.g., as incorporated into a smart phone, a tablet computer, etc.). In some embodiments with touch control, a user directly manipulates objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments.

The display module 2380 translates the output of a user interface for a display device. That is, the display module 2380 receives signals (e.g., from the UI interaction module 2305) describing what should be displayed and translates these signals into pixel information that is sent to the display device. The display device may be an LCD, plasma screen, CRT monitor, touchscreen, etc. In some embodiments, the display module 2380 also receives signals from the playback control module 2320 for displaying video images from a composite presentation that the media editing application is composing.

The audio module 2385 translates the output of a user interface for a sound producing device that translates digital audio signals into actual sounds. In some embodiment, the audio module 2385 also receives digital audio signals from the playback control module for playing sound produced from a composite presentation that the media editing application is composing.

The network connection interface 2374 enable the device on which the media editing application 2300 operates to communicate with other devices (e.g., a storage device located elsewhere in the network that stores the raw audio data) through one or more networks. The networks may include wireless voice and data networks such as GSM and UMTS, 802.11 networks, wired networks such as Ethernet connections, etc.

The UI interaction module 2305 of the media editing application 2300 interprets the user input data received from the input device drivers 2372 and passes it to various modules, including the retiming module 2330 and the playback control module 2320. The UI interaction module also manages the display of the UI, and outputs this display information to the display module 2380. This UI display information may be based on information from the playback control module 2320 or directly from the video source storage 2355 and audio source storage 2365. In some embodiments, the UI interaction module 2305 includes a range selector module 2315 for processing user selection of a range in a media clip for retiming operation.

Figure 24:
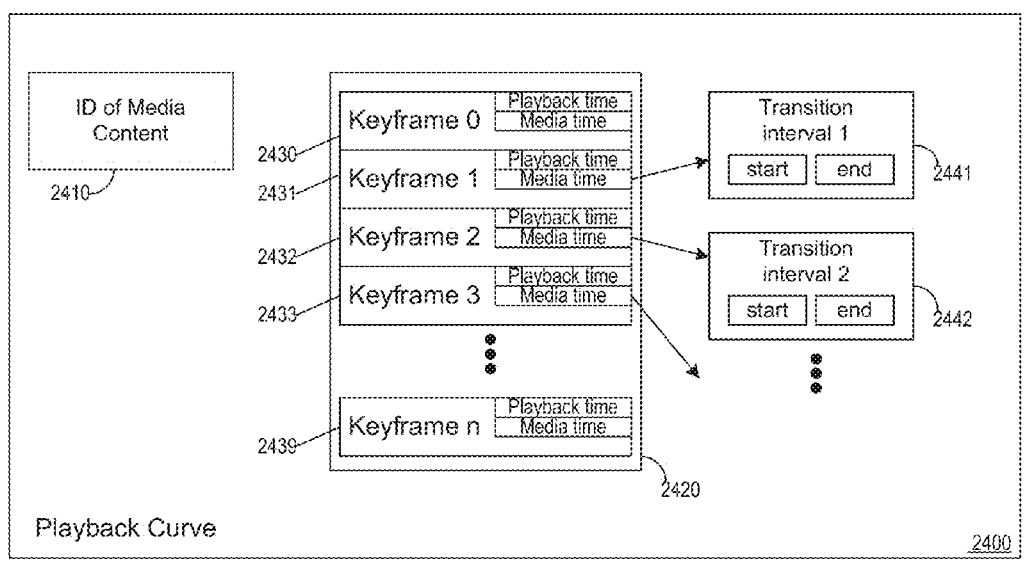
FIG. 24 conceptually illustrates a data structure for a playback curve.

The playback curve storage 2345 receives and stores playback curves generated and adjusted by the retiming module 2330. In some embodiments, the playback curves are stored in data structures that include specification for transition intervals. FIG. 24 below provides an example data structure of a playback curve. The playback curves stored can be accessed for further adjustment by the retiming module 2330, or be retrieved for controlling the timing of media clip playback by the playback control module 2320. The video source storage 2355 receives and stores video data from the UI interaction module 2305 or the operating system 2370. The audio source storage 2365 likewise receives and stores audio data from the UI interaction module and the operating system 2370.

The retiming module (or retiming engine) 2330 generates and adjusts playback curves. In some embodiments, the retiming module generates a new playback curve and stores it in the playback curve storage 2345 whenever a new media clip or composite presentation is created. The retiming module also receives retiming commands and associated parameters from the UI interaction module 2305. The retiming module includes a playback curve generator 2332, a playback curve adjuster 2334, and a transition handler 2336. The playback curve generator 2332 generates the new playback curves for controlling the timing of new media clips. The playback curve adjuster 2334 manipulates keyframes in the playback curve based on user command received from the UI interaction module 2305. These received user commands can be for retiming operations applied to a particular selected range, or an adjustment operations that changes the speed or range of individual sections of the media clips. The playback curve adjuster 2334 can move, insert, or remove keyframes in the playback curves. The transition handler 2336 inserts transition intervals into the playback curves. It also sets the start and end of the transition intervals by analyzing keyframes in the playback curve (e.g., to determine the duration of different sections of the media clip).

The playback control module 2320 includes an image fetcher 2322, a frame interpolator 2324, an audio processing module 2326, and a curve smoother 2328. The curve smoother 2328 retrieves data structures of playback curves from the playback curve storage 2345 and creates smoothed curves based on speeds around discontinuities and on the transition intervals. The frame interpolator 2324 uses the smoothed curve supplied by the curve smoother 2328 to determines which video frame to fetch from the video source 2355 at any given point in playback time. The image fetcher 2322 retrieves the images required by the frame interpolator 2324 from the video source storage 2355. The frame interpolator 2324 then produces the interpolated frame for display based on the smoothed curve and the retrieved images as described above by reference to FIG. 21. The audio processing module 2326 produces audio for the audio module 2385 in the operating system 2370 based on audio data retrieved from the audio source storage 2365 and the smoothed playback curve from the curve smoother 2328.

While many of the features have been described as being performed by one module, one of ordinary skill in the art will recognize that the functions described herein might be split up into multiple modules. Similarly, functions described as being performed by multiple different modules might be performed by a single module in some embodiments. For example, the functions of the playback curve generator 2332, the playback curve adjuster 2334, and the transition handler 2336 can be performed by one larger retiming module 2330, and the functions performed by the curve smoother 2328, the frame interpolator 2324, and the image fetcher 2322 can be performed by one larger playback control module 2320.

For some embodiments, FIG. 24 conceptually illustrates a data structure for a playback curve. The data structure is stored in a storage such as the playback curve storage 2345. As illustrated, the playback curve data structure 2400 includes an ID of media content 2410 and a list of keyframes 2420.

The ID of media content 2410 identifies or provides links to the media content (media clip or the composite presentation) whose playback timing is controlled by the playback curve represented by the data structure 2400.

The list of keyframes 2420 includes several keyframes, each keyframe includes a playback-time/media-time pair for specifying a particular point in the media clip (i.e., a specific media time) that is to be played back at a particular playback time. In some embodiments, the list of keyframe 2420 is a linked list that allows the insertion into and deletion from the list.

In some embodiments, the list of keyframes includes at least a start key frame 2430 (keyframe 0) and end key frame 2439 (keyframe n). The start keyframe 2430 anchors the start of the playback curve, while the end keyframe 2439 anchors the end of the playback curve. Between the keyframe 0 and the keyframe n are discontinuity keyframes 2431-2433 (key frames 1-3). Each discontinuity keyframe specifies a discontinuity in playback speed. In other words, each discontinuity keyframe anchors the end of one section of playback curve at a first speed and the also the start of another section of the playback curve at a second, different speed.

The playback curve data structure 2400 further includes several transition intervals 2441-2442. Each transition interval is linked to a discontinuity keyframe. As illustrated, the transition interval 2441 is linked to the discontinuity keyframe 2431, and the transition interval 2442 is linked to the discontinuity keyframe 2432. Each transition interval specifies the start and the end of the transition interval. In some embodiments, the start and end of the transition interval is specified in terms of playback time.

VI. Media Editing Application

Figure 25:
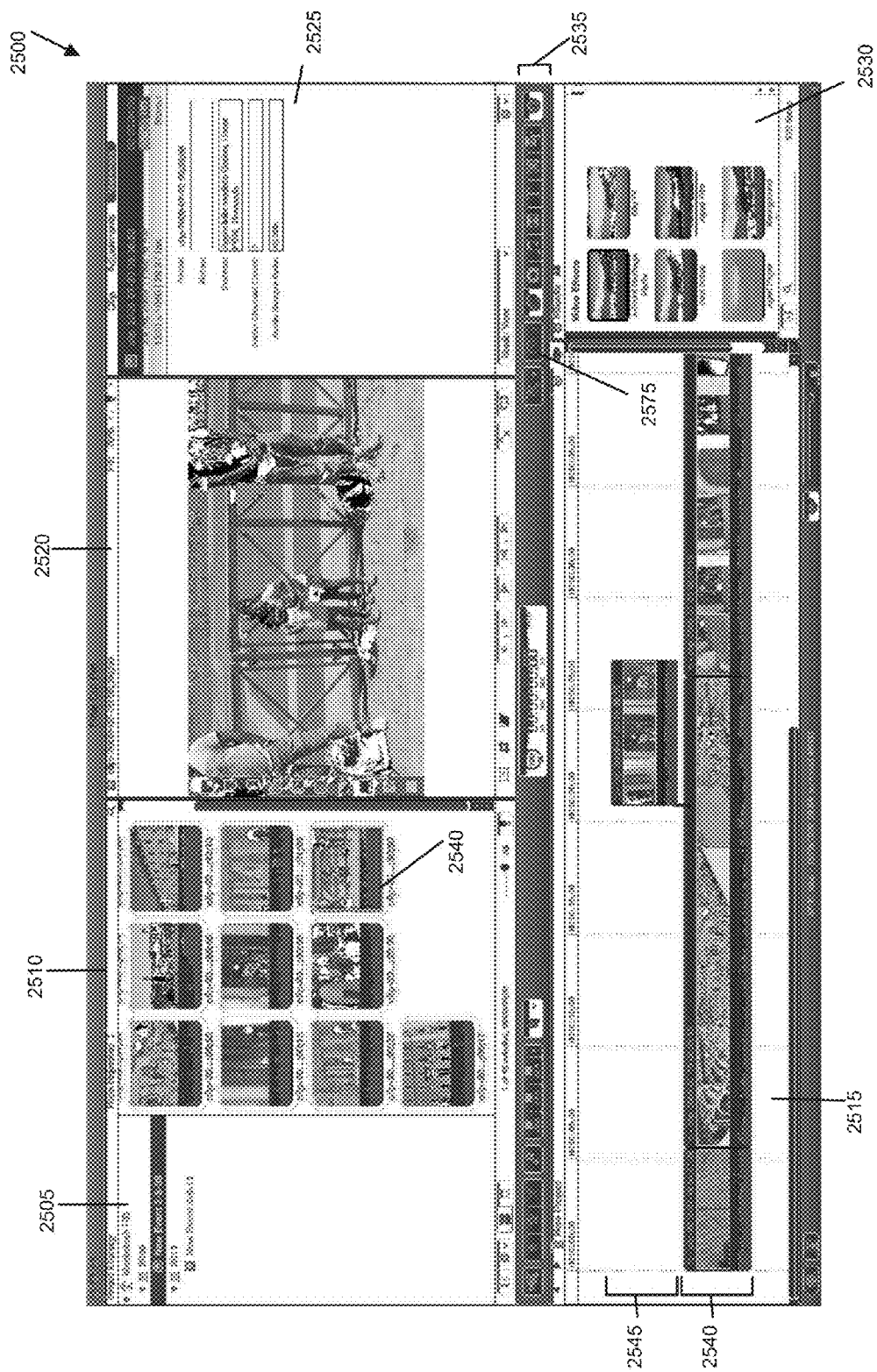
FIG. 25 illustrates an example graphical user interface ("GUI") of a media-editing application.

A more detailed view of a media editing application with features discussed above in Sections I is illustrated in FIG. 25. FIG. 25 illustrates a graphical user interface (GUI) 2500 of a media-editing application of some embodiments. One of ordinary skill will recognize that the graphical user interface 2500 is only one of many possible GUIs for such a media-editing application. In fact, the GUI 2500 includes several display areas which may be adjusted in size, opened or closed, replaced with other display areas, etc. The GUI 2500 includes a clip library 2505, a clip browser 2510, a timeline 2515, a preview display area 2520, an inspector display area 2525, an additional media display area 2530, and a toolbar 2535.

The clip library 2505 includes a set of folders through which a user accesses media clips that have been imported into the media-editing application. Some embodiments organize the media clips according to the device (e.g., physical storage device such as an internal or external hard drive, virtual storage device such as a hard drive partition, etc.) on which the media represented by the clips are stored. Some embodiments also enable the user to organize the media clips based on the date the media represented by the clips was created (e.g., recorded by a camera). As shown, the clip library 2505 includes media clips from both 2009 and 2011.

Within a storage device and/or date, users may group the media clips into "events", or organized folders of media clips. For instance, a user might give the events descriptive names that indicate what media is stored in the event (e.g., the "New Event 2-8-09" event shown in clip library 2505 might be renamed "European Vacation" as a descriptor of the content). In some embodiments, the media files corresponding to these clips are stored in a file storage structure that mirrors the folders shown in the clip library.

Within the clip library, some embodiments enable a user to perform various clip management actions. These clip management actions may include moving clips between events, creating new events, merging two events together, duplicating events (which, in some embodiments, creates a duplicate copy of the media to which the clips in the event correspond), deleting events, etc. In addition, some embodiments allow a user to create sub-folders of an event. These sub-folders may include media clips filtered based on tags (e.g., keyword tags). For instance, in the "New Event 2-8-09" event, all media clips showing children might be tagged by the user with a "kids" keyword, and then these particular media clips could be displayed in a sub-folder of the wedding event that filters clips in this event to only display media clips tagged with the "kids" keyword.

The clip browser 2510 allows the user to view clips from a selected folder (e.g., an event, a sub-folder, etc.) of the clip library 2505. As shown in this example, the folder "New Event 2-8-11 3" is selected in the clip library 2505, and the clips belonging to that folder are displayed in the clip browser 2510. Some embodiments display the clips as thumbnail filmstrips, as shown in this example. By moving a cursor (or a finger on a touchscreen) over one of the thumbnails (e.g., with a mouse, a touchpad, a touchscreen, etc.), the user can skim through the clip. That is, when the user places the cursor at a particular horizontal location within the thumbnail filmstrip, the media-editing application associates that horizontal location with a time in the associated media file, and displays the image from the media file for that time. In addition, the user can command the application to play back the media file in the thumbnail filmstrip.

In addition, the thumbnails for the clips in the browser display an audio waveform underneath the clip that represents the audio of the media file. In some embodiments, as a user skims through or plays back the thumbnail filmstrip, the audio plays as well.

Many of the features of the clip browser are user-modifiable. For instance, in some embodiments, the user can modify one or more of the thumbnail size, the percentage of the thumbnail occupied by the audio waveform, whether audio plays back when the user skims through the media files, etc. In addition, some embodiments enable the user to view the clips in the clip browser in a list view. In this view, the clips are presented as a list (e.g., with clip name, duration, etc.). Some embodiments also display a selected clip from the list in a filmstrip view at the top of the browser so that the user can skim through or playback the selected clip.

The timeline 2515 provides a visual representation of a composite presentation (or project) being created by the user of the media-editing application. Specifically, it displays one or more geometric shapes that represent one or more media clips that are part of the composite presentation. The timeline 2515 of some embodiments includes a primary lane 2540 (also called a "spine", "primary compositing lane", or "central compositing lane") as well as one or more secondary lanes 2545 (also called "anchor lanes"). The spine represents a primary sequence of media which, in some embodiments, does not have any gaps. The clips in the anchor lanes are anchored to a particular position along the spine (or along a different anchor lane). Anchor lanes may be used for compositing (e.g., removing portions of one video and showing a different video in those portions), B-roll cuts (i.e., cutting away from the primary video to a different video whose clip is in the anchor lane), audio clips, or other composite presentation techniques.

The user can add media clips from the clip browser 2510 into the timeline 2515 in order to add the clip to a presentation represented in the timeline. Within the timeline, the user can perform further edits to the media clips (e.g., move the clips around, split the clips, trim the clips, apply effects to the clips, etc.). The length (i.e., horizontal expanse) of a clip in the timeline is a function of the length of media represented by the clip. As the timeline is broken into increments of time, a media clip occupies a particular length of time in the timeline. As shown, in some embodiments the clips within the timeline are shown as a series of images. The number of images displayed for a clip varies depending on the length of the clip in the timeline, as well as the size of the clips (as the aspect ratio of each image will stay constant).

As with the clips in the clip browser, the user can skim through the timeline or play back the timeline (either a portion of the timeline or the entire timeline). In some embodiments, the playback (or skimming) is not shown in the timeline clips, but rather in the preview display area 2520.

The preview display area 2520 (also referred to as a "viewer") displays images from media files that the user is skimming through, playing back, or editing. These images may be from a composite presentation in the timeline 2515 or from a media clip in the clip browser 2510. In this example, the user has been skimming through the beginning of clip 2540, and therefore an image from the start of this media file is displayed in the preview display area 2520. As shown, some embodiments will display the images as large as possible within the display area while maintaining the aspect ratio of the image.

The inspector display area 2525 displays detailed properties about a selected item and allows a user to modify some or all of these properties. The selected item might be a clip, a composite presentation, an effect, etc. In this case, the clip that is shown in the preview display area 2520 is also selected, and thus the inspector displays information about media clip 2540. This information includes duration, file format, file location, frame rate, date created, audio information, etc. about the selected media clip. In some embodiments, different information is displayed depending on the type of item selected.

The additional media display area 2530 displays various types of additional media, such as video effects, transitions, still images, titles, audio effects, standard audio clips, etc. In some embodiments, the set of effects is represented by a set of selectable UI items, each selectable UI item representing a particular effect. In some embodiments, each selectable UI item also includes a thumbnail image with the particular effect applied. The display area 2530 is currently displaying a set of effects for the user to apply to a clip. In this example, only two effects are shown in the display area (the keyer effect and the luma keyer effect, because the user has typed the word "keyer" into a search box for the effects display area).

The toolbar 2535 includes various selectable items for editing, modifying what is displayed in one or more display areas, etc. The right side of the toolbar includes various selectable items for modifying what type of media is displayed in the additional media display area 2530. The illustrated toolbar 2535 includes items for video effects, visual transitions between media clips, photos, titles, generators and backgrounds, etc. In addition, the toolbar 2535 includes an inspector selectable item that causes the display of the inspector display area 2525 as well as items for applying a retiming operation to a portion of the timeline, adjusting color, and other functions. In some embodiments, selecting the retiming tool activation item 2575 invokes a speed effects menu that includes one or more selectable retiming operation presets.

The left side of the toolbar 2535 includes selectable items for media management and editing. Selectable items are provided for adding clips from the clip browser 2510 to the timeline 2515. In some embodiments, different selectable items may be used to add a clip to the end of the spine, add a clip at a selected point in the spine (e.g., at the location of a playhead), add an anchored clip at the selected point, perform various trim operations on the media clips in the timeline, etc. The media management tools of some embodiments allow a user to mark selected clips as favorites, among other options.

One or ordinary skill will also recognize that the set of display areas shown in the GUI 2500 is one of many possible configurations for the GUI of some embodiments. For instance, in some embodiments, the presence or absence of many of the display areas can be toggled through the GUI (e.g., the inspector display area 2525, additional media display area 2530, and clip library 2505). In addition, some embodiments allow the user to modify the size of the various display areas within the UI. For instance, when the additional media display area 2530 is removed, the timeline 2515 can increase in size to include that area. Similarly, the preview display area 2520 increases in size when the inspector display area 2525 is removed.

VII. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 26:
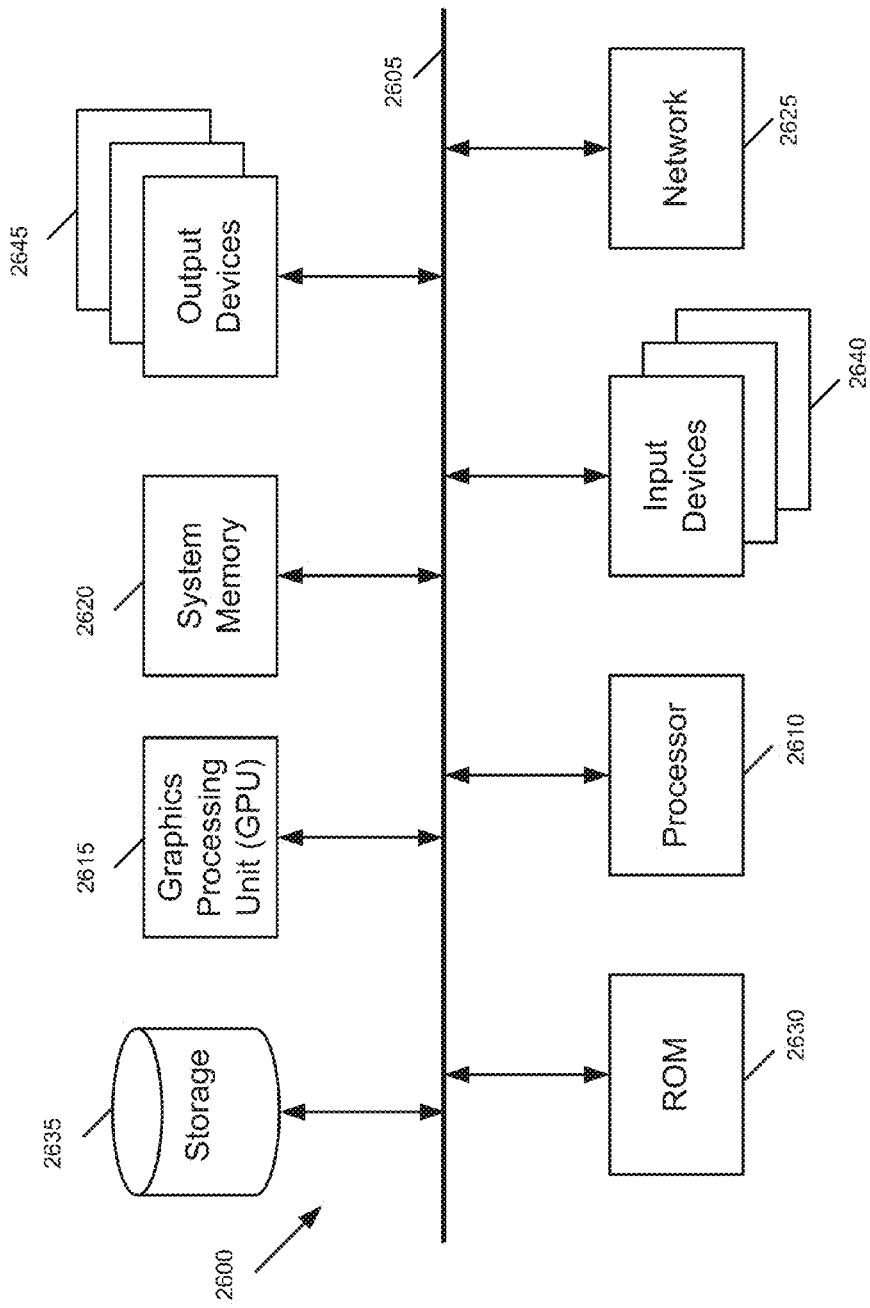
FIG. 26 conceptually illustrates a computer system with which some embodiments of the invention are implemented.

FIG. 26 conceptually illustrates an electronic system 2600 with which some embodiments of the invention are implemented. The electronic system 2600 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 2600 includes a bus 2605, processing unit(s) 2610, a graphics processing unit (GPU) 2615, a system memory 2620, a network 2625, a read-only memory 2630, a permanent storage device 2635, input devices 2640, and output devices 2645.

The bus 2605 collectively represents all system, peripheral, and chipset buses that communicatively connect the numerous internal devices of the electronic system 2600. For instance, the bus 2605 communicatively connects the processing unit(s) 2610 with the read-only memory 2630, the GPU 2615, the system memory 2620, and the permanent storage device 2635.

From these various memory units, the processing unit(s) 2610 retrieves instructions to execute and data to process in order to execute the processes of the invention. The processing unit(s) may be a single processor or a multi-core processor in different embodiments. Some instructions are passed to and executed by the GPU 2615. The GPU 2615 can offload various computations or complement the image processing provided by the processing unit(s) 2610. In some embodiments, such functionality can be provided using CoreImage's kernel shading language.

The read-only-memory (ROM) 2630 stores static data and instructions that are needed by the processing unit(s) 2610 and other modules of the electronic system. The permanent storage device 2635, on the other hand, is a read-and-write memory device. This device is a non-volatile memory unit that stores instructions and data even when the electronic system 2600 is off. Some embodiments of the invention use a mass-storage device (such as a magnetic or optical disk and its corresponding disk drive) as the permanent storage device 2635.

Other embodiments use a removable storage device (such as a floppy disk, flash memory device, etc., and its corresponding disk drive) as the permanent storage device. Like the permanent storage device 2635, the system memory 2620 is a read-and-write memory device. However, unlike storage device 2635, the system memory 2620 is a volatile read-and-write memory, such a random access memory. The system memory 2620 stores some of the instructions and data that the processor needs at runtime. In some embodiments, the invention's processes are stored in the system memory 2620, the permanent storage device 2635, and/or the read-only memory 2630. For example, the various memory units include instructions for processing multimedia clips in accordance with some embodiments. From these various memory units, the processing unit(s) 2610 retrieves instructions to execute and data to process in order to execute the processes of some embodiments.

The bus 2605 also connects to the input and output devices 2640 and 2645. The input devices 2640 enable the user to communicate information and select commands to the electronic system. The input devices 2640 include alphanumeric keyboards and pointing devices (also called "cursor control devices"), cameras (e.g., webcams), microphones or similar devices for receiving voice commands, etc. The output devices 2645 display images generated by the electronic system or otherwise output data. The output devices 2645 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 26, bus 2605 also couples electronic system 2600 to a network 2625 through a network adapter (not shown). In this manner, the computer can be a part of a network of computers (such as a local area network ("LAN"), a wide area network ("WAN"), or an Intranet, or a network of networks, such as the Internet. Any or all components of electronic system 2600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 3, 13, 16, 20 and 22) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method for creating a multimedia presentation, the method comprising:
   receiving a media clip for the multimedia presentation, the media clip comprising a first section having a first playback speed and a second section having a second playback speed, the first section transitioning to the second section at a user-defined point of discontinuity;
   defining a transition interval encompassing the user-defined point of discontinuity, wherein the start of the transition interval is after the start of the first section and the end of the transition interval is before the end of the second section;
   presenting the transition interval in a graphical user interface (GUI), wherein boundaries of the transition interval are presented as a plurality of user-selectable items for adjusting a duration of the transition interval; and
   playing back the media clip according to a curve that is constrained by the transition interval, the first playback speed, and the second playback speed.

2. The method of claim 1, wherein the curve transitions gradually from the first playback speed at the start of the transition interval to the second playback speed at the end of the transition interval.

3. The method of claim 1, wherein the curve is a playback curve for specifying a playback timing of the media clip.

4. The method of claim 1 further comprising defining a discontinuity keyframe at the user-defined point of discontinuity.

5. The method of claim 4, wherein the curve is not constrained to go through the discontinuity keyframe.

6. The method of claim 1 further comprising:
   selecting a portion of the media clip; and
   retiming the selected portion of the media clip from the first playback speed to the second playback speed, wherein the selected portion is the second section and an unselected portion is the first section.

7. A method of defining a media editing application for creating multimedia presentations, the method comprising:
defining a range selector for user-selecting a portion of a media clip in a multimedia presentation by a user;
defining a retiming engine for applying a retiming operation that changes a playback timing of the media clip from a first playback speed to a second playback speed at a first transition point that is at an intersection of the selected portion and an unselected portion; and
defining a transition engine for determining a playback speed of the media clip around the first transition point by defining second and third transition points, the second transition point earlier than the first transition point by a fraction of the duration of the selected portion and the third transition point later than the first transition point by a fraction of the duration of the unselected portion.

8. The method of claim 7, wherein the playback speed of the media clip gradually changes from the first playback speed at the second transition point to the second playback speed at the third transition point without overshooting the second playback speed before the third transition point.

9. The method of claim 7, wherein the playback speed of the media clip at the second transition point is the first playback speed.

10. The method of claim 9, wherein the playback speed of the media clip at third transition point is the second playback speed.

11. The method of claim 10, wherein the playback speed of the media clip at the first transition point is between the first playback speed and the second playback speed.

12. The method of claim 7, wherein the transition engine determines the playback speed of the media clip by defining a playback curve that specifies a relationship between content of the media clip and the playback timing of the media clip.

13. The method of claim 7, wherein the retiming engine applies a retiming operation by defining a keyframe associated with the first transition point, wherein the keyframe defines a particular point in the content of the media clip that is played back at a particular playback time.

14. A system comprising: a set of processing units for executing sets of instructions; and a non-transitory machine readable medium storing a media editing application for execution by at least one of the processing units, the media editing application comprising sets of instructions for: editing a playback curve of a media clip of a multimedia presentation for specifying playback timing of the media clip, wherein editing the playback curve comprises changing a playback speed of a section of the playback curve; introducing a transition interval at a user-adjustable point of discontinuity between a first section with a first playback speed and a second section with a second playback speed, wherein the playback speed of the media clip gradually changes without any discontinuity from the first playback speed at a start of the transition interval to the second playback speed at an end of the transition interval without crossing the second playback speed before the end of the transition interval; and playing back the media clip according to the edited playback curve and the transition interval.

15. The system of claim 14, wherein introducing the transition interval comprises determining a first fraction of a duration of the first section and a second fraction of a duration of the second section.

16. The system of claim 14 further comprising a storage for storing the playback curve, wherein a data structure of the playback curve stores the start point and the end point for the transition interval.

17. The system of claim 16, wherein the data structure stores a plurality of keyframes, each keyframe defining a particular point in the content of the media clip that is played back at a particular playback time.

18. The system of claim 14, wherein playing back the media clip according to the edited playback curve comprises creating a smoothed playback curve, the smoothed playback curve comprising a Bezier curve that is constrained at the first playback speed at the start of the transition interval and at the second playback speed at the end of the transition interval.

19. The system of claim 18, wherein the user-adjustable point of discontinuity is a keyframe that anchors the end of the first section and the start of the second section, wherein the playback curve is not constrained to go through the keyframe.

20. A non-transitory computer readable medium storing a computer program for execution by one or more processing units, the computer program comprising sets of instructions for:
receiving a media clip that changes playback timing from a first playback speed to a second playback speed at a first transition point between a first media clip section and a second media clip section;
introducing a transition interval that is defined by a second transition point and a third transition point, the second transition point earlier than the first transition point and the third transition point later than the first transition point in the media clip, wherein the second and third transition points are user-selectable items that are adjustable within a graphical user interface (GUI); and
determining the playback speed of the media clip around the first transition point based on a playback time of the second and third transition points.

21. The non-transitory computer readable medium of claim 20, wherein the program further comprises a set of instructions for displaying a speed indicator for indicating the playback speed of the media clip.

22. The non-transitory computer readable medium of claim 21, wherein the speed indicator is partitioned into a plurality of sections based on transitions of playback speeds in the media clip.

23. The non-transitory computer readable medium of claim 22, wherein one of the plurality of sections is a transition section that starts at the second transition point and ends at the third transition point.

24. The non-transitory computer readable medium of claim 23, where the transition section is associated with said user-selectable items.

25. The non-transitory computer readable medium of claim 20, wherein the second transition point is initially defined to be earlier than the first transition point by a fraction of the duration of the first media clip section and the third transition point is initially defined to be later than the first transition point in the media clip by a fraction of the duration of the second media clip section.

26. The non-transitory computer readable medium of claim 20, wherein the playback speed of the media clip gradually changes from the first playback speed at the second transition point to the second playback speed at the third transition point.

27. The non-transitory computer readable medium of claim 20, wherein the set of instructions for determining the playback speed of the media clip comprises a set of instructions for defining a playback curve that specifies a relationship between the content of the media clip and the playback timing of the media clip.

* * * * *